United States Patent
Ström et al.

(10) Patent No.: US 11,064,210 B2
(45) Date of Patent: Jul. 13, 2021

(54) PRE-PROCESSING OF HDR VIDEO INVOLVING CHROMA ADJUSTMENT

(71) Applicant: Telefonaktiebolaget LM Ericsson (publ), Stockholm (SE)

(72) Inventors: Jacob Ström, Stockholm (SE); Kenneth Andersson, Gävle (SE); Per Hermansson, Årsta (SE); Jonatan Samuelsson, Enskede (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 125 days.

(21) Appl. No.: 16/339,117

(22) PCT Filed: Jul. 17, 2017

(86) PCT No.: PCT/SE2017/050786
§ 371 (c)(1),
(2) Date: Apr. 3, 2019

(87) PCT Pub. No.: WO2018/067052
PCT Pub. Date: Apr. 12, 2018

(65) Prior Publication Data
US 2019/0246123 A1    Aug. 8, 2019

Related U.S. Application Data

(60) Provisional application No. 62/403,826, filed on Oct. 4, 2016.

(51) Int. Cl.
*H04N 19/186* (2014.01)
*H04N 19/117* (2014.01)
(Continued)

(52) U.S. Cl.
CPC ............. *H04N 19/186* (2014.11); *H04N 9/68* (2013.01); *H04N 9/77* (2013.01); *H04N 19/117* (2014.11);
(Continued)

(58) Field of Classification Search
CPC .. H04N 19/117; H04N 19/182; H04N 19/186; H04N 19/85; H04N 19/86; H04N 9/68; H04N 9/77
(Continued)

(56) References Cited

U.S. PATENT DOCUMENTS

2009/0123089 A1    5/2009   Karlov et al.
2016/0330457 A1*  11/2016   Ye ......................... H04N 19/187
2017/0118489 A1*   4/2017   Berbecel ................ H04N 19/61

FOREIGN PATENT DOCUMENTS

WO    2016130066 A1    8/2016
WO    2016186547 A1    11/2016

OTHER PUBLICATIONS

Tourapis et al.(Enhanced Luma Adjust,ment Methods, JCTVC-W0052, ITU-T SG 16 WP 3 and ISO/1EC JTC 1/SC 29AVG 11 23rd Meeting: San Diego, USA, Feb. 19-26, 2016) (Year: 2016).*

(Continued)

*Primary Examiner* — William C Vaughn, Jr.
*Assistant Examiner* — Naod W Belai
(74) *Attorney, Agent, or Firm* — Coats & Bennett, PLLC

(57) ABSTRACT

A processing for a first pixel in a picture comprises obtaining a lower limit of a first color component of the first pixel in a first color space based on a distance between a color of the first pixel and a first distorted version of the color in a second color space. An upper limit of the first color component in the first color 5 space is obtained based on a distance between the color and a second distorted version of the color in the second color space. A filtered value is obtained of the (Continued)

first color component and which is equal to or larger than the lower limit and equal to or lower than the upper limit. The processing results in filtered values that are cheaper to encode but that are visibly undistinguishable from the original colors of the pixels.

28 Claims, 16 Drawing Sheets

(51) Int. Cl.
    *H04N 9/68*     (2006.01)
    *H04N 9/77*     (2006.01)
    *H04N 19/182*     (2014.01)
    *H04N 19/86*     (2014.01)
    *H04N 19/85*     (2014.01)

(52) U.S. Cl.
    CPC ........... *H04N 19/182* (2014.11); *H04N 19/86* (2014.11); *H04N 19/85* (2014.11)

(58) Field of Classification Search
    USPC .................................................... 375/240.29
    See application file for complete search history.

(56) References Cited

OTHER PUBLICATIONS

Singer, A. et al., "Mbps Experimental Acoustic Through-Tissue Communications: MEAT-COMMS", 2016 IEEE 17th International Workshop on Signal Processing Advances in Wireless Communications (SPAWC), Jul. 3, 2016, pp. 1-4, IEEE.
Spelmezan, D. et al., "SkinHaptics: Ultrasound Focused in the Hand Creates Tactile Sensations", Haptics Symposium, Apr. 8, 2016, pp. 98-105, IEEE.
Kim. S-C. et al., "Transferring Data from Smartwatch to Smartphone through Mechanical Wave Propagation", article in Sensors 2015, ISSN 1424-8220, Jul. 17, 2015, pp. 1-13, obtained from internet: https://www.mdpi.com/1424-8220/15/9/21394.
SMPTE, "High Dynamic Range Electro-Optical Transfer Function of Mastering Reference Displays", SMPTE standard, SMPTE ST 2084:2014, May 11, 2016, pp. 1-14, The Society of Motion Picture and Television Engineers.
Rusanovskyy, D. et al., "HDR/WCG CfE response", Meeting presentation, Qualcomm, Apple, MovieLabs and NGCodec, m36256, m36614, Mar. 22, 2019.
Rusanovskyy, D. et al., "Single layer non-normative (category 3a) NCL and CL responses to the Call for Evidence on HDR/WCG", ISO/IEC JTC1/SC29/WG11 M 36256, Jun. 1, 2015, pp. 1-10, Warsaw, Poland.
Dolby Laboratories, "Versatile Color Space for Large Color Volumes", Applied Vision Science Group, Feb. 24, 2016, pp. 1-33.
Pyltarz, J. et al., "Overview of ICtCp", Joint Collaborative Team on Video Coding (JCT-VC) of ITU-T SG 16 WP 3 and ISO/IEC JTC 1/SC 29/WG 11, 23rd Meeting: San Diego, USA, Feb. 19, 2016, pp. 1-6, Document: JCTVC-W0050.
Strom, J. , "Investigation of HDR Color Subsampling", ISO/IEC JTC1/SC29/WG11 MPEG2014/M35841, Feb. 1, 2015, pp. 1-8, International Organization for Standardisation.
Chou, C-H. et al., "Colour image compression based on the measure of just noticeable colour difference", IET Image Processing, vol. 2, No. 6 Feb. 19, 2008, pp. 304-322, The Institution of Engineering and Technology.
Tourapis, A. et al., "Enhanced Luma Adjustment Methods", Joint Collaborative Team on Video Coding (JCT-VC) of ITU-T SG 16 WP 3 and ISO/IEC JTC 1/SC 291WG 11, 23rd Meeting: San Diego, USA, Feb. 19, 2016, pp. 1-5, Document JCTVC-W0052.
Norkin, A., "Fast algorithm for HDR color conversion", 2016 Data Compression Conference, Mar. 30, 2016, pp. 486-495, IEEE.
Strom, J. et al., "AhG on HDR and WCG: Chroma Adjustment for HDR Video", Joint Collaborative Team on Video Coding (JCT-VC) of ITU-T SG 16 WP 3 and ISO/IEC JTC 1/SC 291WG 11, 26th Meeting: Geneva, CH, Jan. 12, 2017, pp. 1-10, Document: JCTVC-Z0022.
Lee, S. et al., "CE2-related: Report of LUMAATF with luma-driven chroma scaling (LCS)", ISO/IEC JTC1/SC29/WG11 MPEG2015/M37245, Oct. 1, 2015, pp. 1-5, Geneva, Switzerland.
Lu, T. et al., "Compression Efficiency Improvement over HEVC Main 10 Profile for HDR and WCG Content", 2016 Data Compression Conference, Mar. 30, 2016, pp 279-288, IEEE.
Strom, J., "Ericsson's response to SfE for HDR and WCG", ISO/IEC JTC1/SC29/WG11 MPEG2014/m36184, Feb. 1, 2015, pp. 1-11, Geneva, Switzerland.

\* cited by examiner

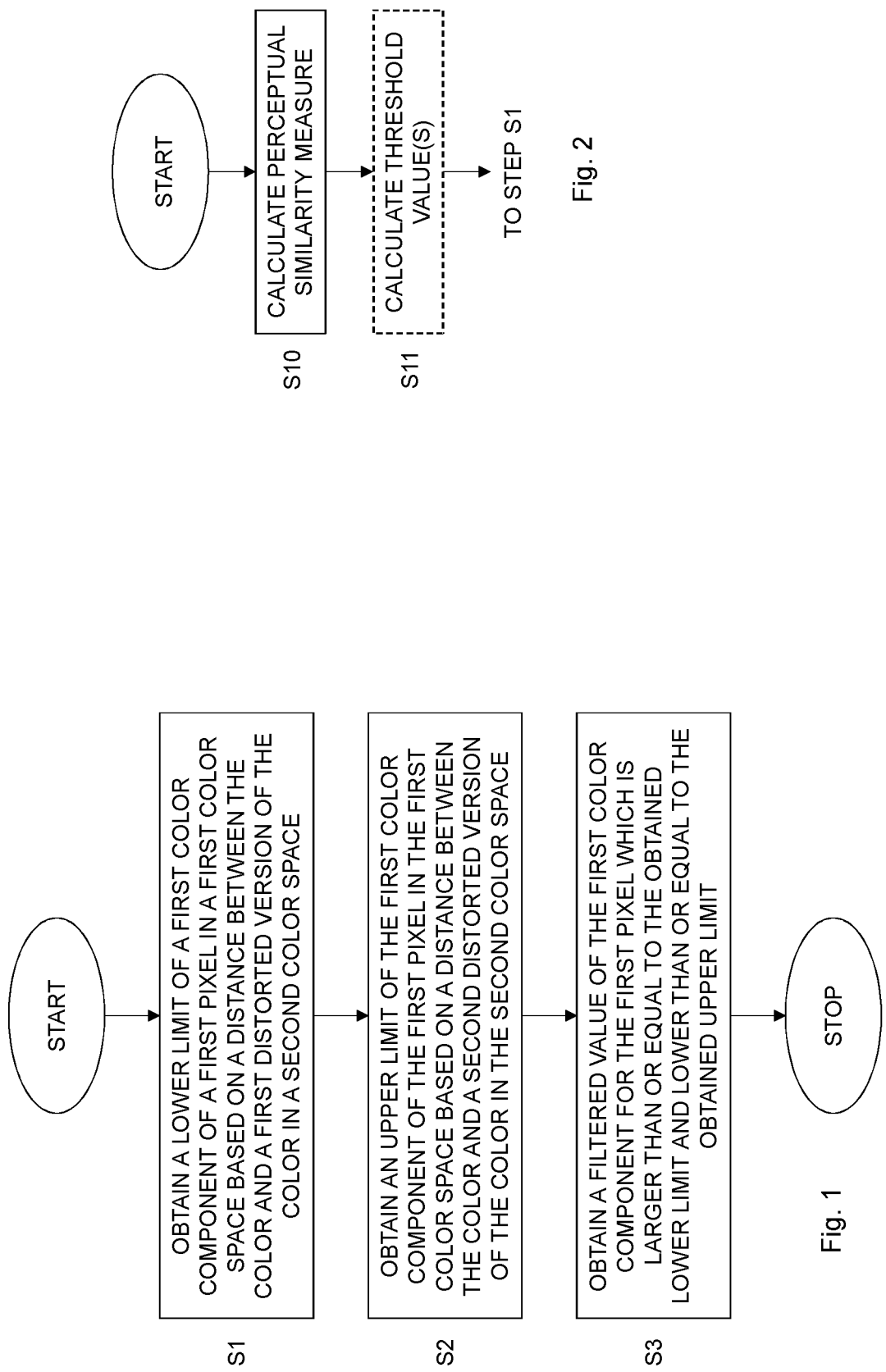

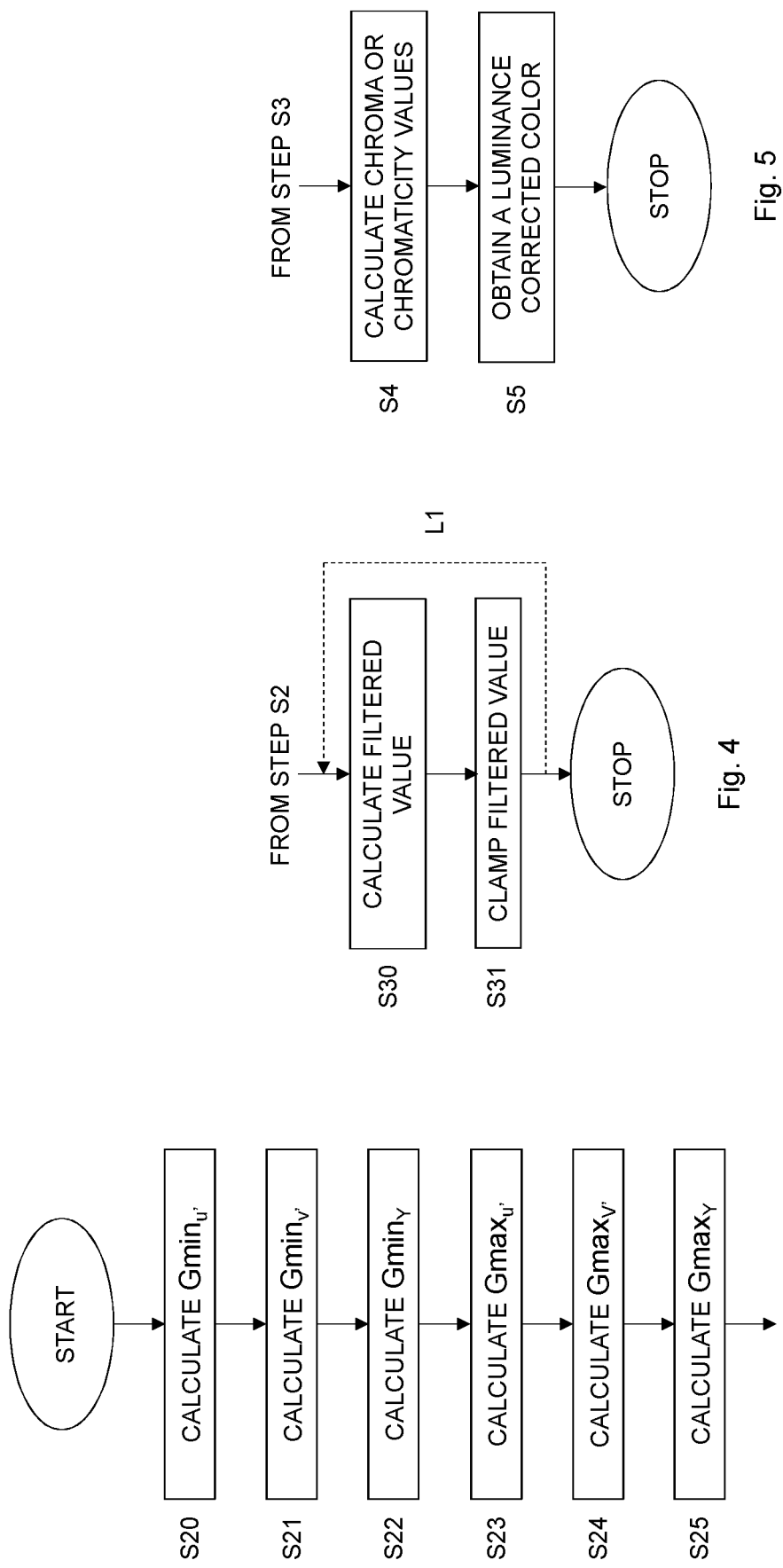

PRE-PROCESSING OF HDR VIDEO INVOLVING CHROMA ADJUSTMENT

TECHNICAL FIELD

The present embodiments generally relate to video coding, and in particular to processing of pixels in connection to video coding to improve chroma values of pixels.

BACKGROUND

In the art of video coding, a combination of a nonlinear transfer function, 4:2:0 subsampling and non-constant luminance (Y) can give rise to severe artifacts in saturated colors. An example is described in an MPEG contribution [1], where changes between two colors of similar luminance can result in a reconstructed image with very different luminances.

In video coding, a luma value Y' is different from the luminance value Y. The luma value Y' is together with the chroma values Cb' and Cr' first converted to R'G'B' through a linear color transform, then to RGB (R=red, G=green, B=blue) via a nonlinear transfer function, and finally to XYZ via a color transform. The resulting Y is the luminance, and will be different from the luma value Y'.

One way to get around the problem of severe artifacts in saturated colors is to not use luma (Y') and chroma (Cb' and Cr') for encoding, but instead some other representation. However, there are indications that color representations other than Y'Cb'Cr' do not compress well. As an example, MPEG tried YdZdX but the compression efficiency was not competitive against Y'Cb'Cr'. There is also a lot of legacy equipment using Y'Cb'Cr', and for that reason it may be desirable to keep using Y'Cb'Cr'.

Furthermore, many systems already use Y'Cb'Cr' or R'G'B' for the last step of the signal to the display. As an example, the High-Definition Multimedia Interface (HDMI) standard has recently adopted the use of Y'Cb'Cr' 4:2:0 using ST 2084 [2] for transmission of images from the set-top box to the TV as specified in CEA-861.3 [3]. This means that even if the encoding is done in some other representation, after decoding it still needs to be converted to Y'Cb'Cr' 4:2:0, which will give rise to artifacts. Doing this conversion correctly, such as using luma adjustment disclosed in [4], can be quite complex when compared to the rest of the decoding chain, whereas doing the same thing in the encoder is, relatively speaking, not so expensive. This is due to the fact that encoding is typically so much more complex than decoding. It is therefore better to do a high-quality conversion to Y'Cb'Cr' already in the encoder. Due to these reasons it is advantageous to be able to use the Y'Cb'Cr' representation for encoding of High Dynamic Range (HDR) data.

Another solution to the problem is to use a transfer function with lower steepness, i.e., less nonlinear, such as BT.1886 [5]. However, the problem with this approach is that many bits would be required for representing each pixel component in order to avoid banding. Such artifacts may also for Standard Dynamic Range (SDR) when using a less nonlinear transfer function.

For these reasons, the best prior art is typically to use non-constant luminance Y'Cb'Cr' in combination with luma adjustment to transmit the data. Luma adjustment is described in [4], where the luma value Y' in every pixel is adjusted so that the resulting luminance Y is closer to its correct value. It is therefore possible to compensate for the fact that some of the luminance is also carried in the chroma components Cb' and Cr'.

After having corrected the luma value Y' using luma adjustment, it is possible to obtain the desired luminance Y. However, if Cb' and Cr' vary considerably, a quite large correction in Y' may be necessary. This variation in Cb', Cr' and the resulting variation in Y' may be expensive to encode, since signals with high variance is typically costlier to encode than smooth signals in terms of bit rate.

SUMMARY

It is a general objective to provide a processing of pixels in connection to video coding to improve chroma values of pixels.

This and other objectives are met by embodiments as disclosed herein.

An aspect of the embodiments relates to a method for processing a first pixel in a picture. The first pixel has a color that is represented in a first color space. The method comprises obtaining a lower limit of a first color component of the first pixel in the first color space based on a distance between the color and a first distorted version of the color in a second color space. The method also comprises obtaining an upper limit of the first color component of the first pixel in the first color space based on a distance between the color and a second distorted version of the color in the second color space. The method further comprises obtaining a filtered value of the first color component for the first pixel which is larger than or equal to the obtained lower limit and lower than or equal to the obtained upper limit.

Another aspect of the embodiments relates to a device for processing a first pixel in a picture. The first pixel has a color that is represented in a first color space. The device is configured to obtain a lower limit of a first color component of the first pixel in the first color space based on a distance between the color and a first distorted version of the color in a second color space. The device is also configured to obtain an upper limit of the first color component of the first pixel in the first color space based on a distance between the color and a second distorted version of the color in the second color space. The device is further configured to obtain a filtered value of the first color component for the first pixel which is larger than or equal to the obtained lower limit and lower than or equal to the obtained upper limit.

A further aspect of the embodiments relates to a device for processing a first pixel in a picture according to yet another embodiment. The first pixel has a color that is represented in a first color space. The device comprises a lower limit obtaining module for obtaining a lower limit of a first color component of the first pixel in the first color space based on a distance between the color and a first distorted version of the color in a second color space. The device also comprises an upper limit obtaining module for obtaining an upper limit of the first color component of the first pixel in the first color space based on a distance between the color and a second distorted version of the color in the second color space. The device further comprises a filtered value obtaining module for obtaining a filtered value of the first color component for the first pixel which is larger than or equal to the obtained lower limit and lower than or equal to the obtained upper limit.

Yet another aspect of the embodiments relates to a device for encoding a first pixel having a color in a first color space in a picture. The device comprises a processor and a memory comprising instructions executable by the processor. The processor is operative to obtain a lower limit of a first color component of the first pixel in the first color space based on a distance between the color and a first distorted version of the color in a second color space. The processor is also operative to obtain an upper limit of the first color component of the first pixel in the first color space based on a distance between the color and a second distorted version of the color in the second color space. The processor is further operative to obtain a filtered value of the first color component for the first pixel which is larger than or equal to the obtained lower limit and lower than or equal to the obtained upper limit. The processor is additionally operative to calculate a luma component value and chroma component values for the first pixel based on a smoothed value of the color in the first color space comprising a value of the first color component in the color in the first color space replaced by the filtered value of the first color component. The processor is also operative to encode the luma component value and subsampled chroma component values.

Yet another aspect of the embodiments relates to a computer program comprising instructions, which when executed by a processor, cause the processor to obtain a lower limit of a first color component of a first pixel in a first color space in a picture based on a distance between the color and a first distorted version of the color in a second color space. The processor is also caused to obtain an upper limit of the first color component of the first pixel in the first color space based on a distance between the color and a second distorted version of the color in the second color space. The processor is further caused to obtain a filtered value of the first color component for the first pixel which is larger than or equal to the obtained lower limit and lower than or equal to the obtained upper limit.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The processing of the embodiments changes at least one color component of at least one pixel so that the color of the pixel is cheaper to encode and/or result in reduced artifacts while keeping the change sufficiently small so that it is not visible for the human visual system.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method for processing a first pixel according to an embodiment;

FIG. 2 is a flow chart illustrating additional, optional steps of the method shown in FIG. 1;

FIG. 3 is a flow chart illustrating additional, optional steps of the method shown in FIG. 1;

FIG. 4 is a flow chart illustrating an embodiment of step S3 in FIG. 1;

FIG. 5 is a flow chart illustrating additional, optional steps of the method shown in FIG. 1;

DETAILED DESCRIPTION

Figure 6:
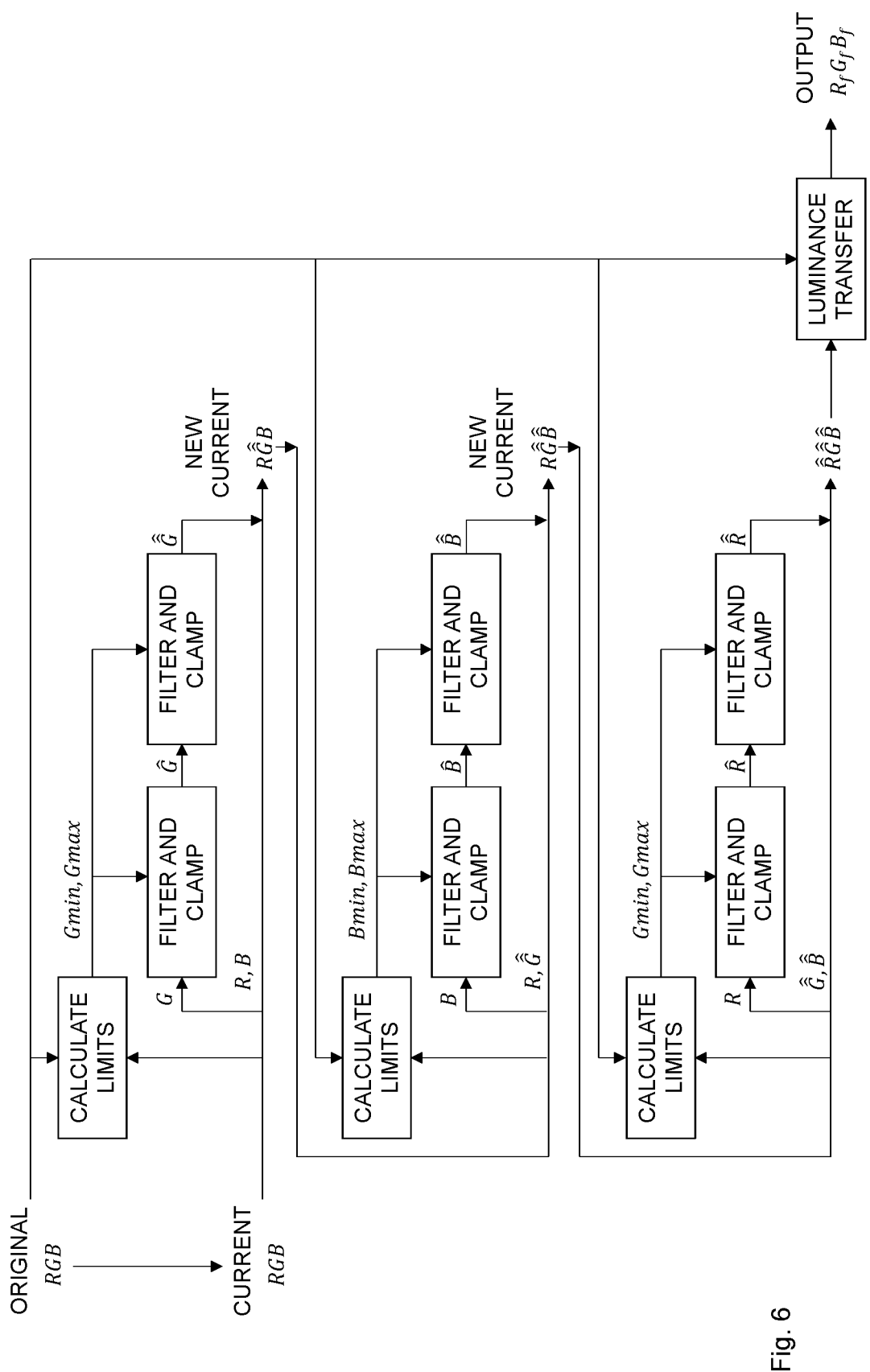
FIG. 6 is a schematic overview of a processing of a first pixel according to an embodiment.

Throughout the drawings, the same reference numbers are used for similar or corresponding elements.

The present embodiments generally relate to video coding, and in particular to processing of pixels in connection to video coding to improve chroma values of pixels.

In the art of video coding and as mentioned in the background section, luma (Y') and chroma (Cb' and Cr') are used to represent the original colors in the pictures of a video sequence. In such a case, luma adjustment as described in [4] may be used to adjust the luminance and thereby compensate for artifacts introduced by the usage of a highly non-linear transfer function, 4:2:0 subsampling and non-constant luminance.

After luma adjustment, the luminance will be consistent between pictures, also denoted frames herein, of the video sequence. Accordingly, the luma signal will typically also be more consistent across frames than prior to luma adjustment. However, the luma signal may still vary substantially from frame to frame in problem areas. This complicates the prediction between frames. Also, even if the luma signal is more consistent across frames after luma adjustment than before luma adjustment, the chroma channels, which are not changed by luma adjustment, can differ substantially from frame to frame in problem areas. This means that it will sometimes be hard to predict the Cb' or Cr' component in one frame from the Cb' or Cr' component in a nearby frame of the video sequence, even if the colors appear similar to the human eye.

The above mentioned problem can be solved by finding a way of filtering the data that is invisible to the human visual system, yet which provides a benefit in terms of compression or encoding efficiency and/or artifact reduction. This is achieved according to an embodiment by changing the value of at least one color component, such as red (R), green (G) and/or blue (B) component, of a pixel so that it is as similar as possible to the color components of neighboring pixels while keeping the change sufficiently small so that it is not visible.

This may be done by changing the color in, for instance, a linear domain or color space, while keeping track of how big the changes are in a more perceptually relevant domain, such as the Yu'v' domain or color space (CIELUV). Only changes that are small enough for the resulting color to be regarded as equivalent to the original color are preferably allowed.

A color space or domain is the type and number of colors that originate from the combinations of color components of a color model. A color model is an abstract configuration describing the way colors can be represented as tuples of numbers, i.e., color components. The color components have several distinguishing features such as the component type, e.g., hue, and its unit, e.g., degrees or percentage, or the type of scale, e.g., linear or nonlinear, and its intended number of values referred to as the color depth or bit depth.

Non-limiting, but illustrative, color spaces that are commonly used for pixels in pictures and videos include the red, green, blue (RGB) color space, the luma, chroma blue and chroma red (Y'Cb'Cr', sometimes denoted Y'CbCr, Y'CBCR or Y'CB'CR') color space, the luminance and chrominances (XYZ) color space, the luminance and chromaticity (Yu'v' or Yxy) color spaces, etc.

FIG. 1 is a flow chart illustrating a method for processing a first pixel according to an embodiment. The first pixel is present in a picture and has a color that is represented in a first color space. The method comprises obtaining, in step S1, a lower limit of a first color component of the first pixel in the first color space based on a distance between the color and a first distorted version of the color in a second color space. Correspondingly, step S2 comprises obtaining an upper limit of the first color component of the first pixel in the first color space based on a distance between the color and a second distorted version of the color in the second color space.

Steps S1 and S2 can be performed serially in any order, i.e., step S1 followed by step S2, or step S2 followed by step S1. Alternatively, steps S1 and S2 can be performed at least partly in parallel.

A following step S3 comprises obtaining a filtered value of the first color component for the first pixel which is larger than or equal to the obtained lower limit and lower than or equal to the obtained upper limit.

Hence, the method for processing the first pixel described above and illustrated in FIG. 1 obtains lower and upper limits of a first color component of a first pixel in the picture in a first color space. The lower limit then represents the lowest value that the first color component can assume in the first color space and still achieve a color for the first pixel that is visually interpreted as the same as the original, unfiltered color of the first pixel. Correspondingly, the upper limit is the largest value that the first color component can assume in the first color space without any visual change in color for the first color. For instance, assume that the original, unfiltered color of the first pixel is represented as RGB and the first color component is a green component (G) in the RGB color space. Furthermore, assume that Gmin represents the lower limit of the first color component and Gmax represents the upper limit of the first color component. Then, any color $RG_{smooth}B$, wherein $Gmin \leq G_{smooth} \leq Gmax$, will appear undistinguishable to the original color RGB for the human visual system. This means that the modification of the first color component in step S3 can produce any filtered value $G_{smooth}$ for the first color component as long as this filtered value $G_{smooth}$ is equal to or larger than the lower limit Gmin but equal to or smaller than the upper limit Gmax.

A reason for replacing the value G of the first color component of the first pixel with the filtered value $G_{smooth}$ is that the filtered value might be more efficiently encoded and compressed as compared to the original value, i.e., requiring fewer bits to encode, and/or reduce any artifacts in the picture following encoding and decoding.

For instance, the modification involving replacing original values of color components of pixels in a picture with filtered values that are within respectively obtained lower and upper limits according to the embodiment may reduce invisible differences between colors of the pixels to improve the compression efficiency and/or reduce artifacts.

In an embodiment, the first distorted version of the color is equal to the color in the first color space except in the first color component. Correspondingly, in this embodiment, the second distorted version of the color is equal to the color in the first color space except in the second color component.

For instance, assume that the (original) color of the first pixel is RGB. Then the first distorted version of the color could be represented as $RG_1B$ whereas the second distorted version of the color is $RG_2B$. The distance between the color and the first distorted version thereof in the second color space could then be represented as $f(RGB)-f(RG_1B)$ or $f(RG_1B)-f(RGB)$, or more generally as $|f(RGB)-f(RG_1B)|$. In this case, f( ) represents a color transformation from the first color space into the second color space. The lower limit of the first color component of the first pixel Gmin is then obtained based on this distance, such as $Gmin=g(|f(RGB)-f(RG_1B)|)$ for some function g( ). Correspondingly, the distance between the color and the second distorted version thereof, i.e., $f(RGB)-f(RG_2B)$ or $f(RG_2B)-f(RGB)$, or more generally as $|f(RGB)-f(RG_2B)|$, and the upper limit of the first color component of the first pixel Gmax is obtained based on this distance, such as $Gmax=h(|f(RGB)-f(RG_2B)|)$ for some function h( ).

Thus, the lower and upper limits of a color component in a first color space are obtained, such as determined or calculated, based on respective distances between the color and distorted versions of the color in a second color space that is different from the first color space.

In an embodiment, step S1 of FIG. 1 comprises obtaining the lower limit of the first color component of the first pixel in the first color space based on a distance between chromaticity values of the color and the first distorted version of the color in a luminance and chromaticity color space. Correspondingly, step S2 comprises obtaining the upper limit of the first color component of the first pixel in the first color space based on a distance between chromaticity values of the color and the second distorted version of the color in the luminance and chromaticity color space.

In an embodiment, the luminance and chromaticity color space is the Yu'v' color space, in which Y denotes luminance and u'v' denote chromaticity values. In another embodiment, the luminance and chromaticity color space is the Yxy color space, in which Y denotes the luminance and xy denote the chromaticity values.

In this embodiment, $|u'-u'_1|=|f_1(RGB)-f_1(RG_1B)|$ and $|v'-v'_1|=|f_2(RGB)-f_2(RG_1B)|$ (or $|x-x_1|=|f_3(RGB)-f_3(RG_1B)|$ and $|y-y_1|=|f_4(RGB)-f_4(RG_1B)|$)) and $|u'-u'_2|=|f_1(RGB)-f_1(RG_2B)|$ and $|v'-v'_2|=|f_2(RGB)-f_2(RG_2B)|$ (or $|x-x_2|=|f_3(RGB)-f_3(RG_2B)|$ and $|y-y_2|=|f_4(RGB)-f_4(RG_2B)|$), wherein u', v', x or y without subscript represents the chromaticity value of the color of the first pixel, u', v', x or y with subscript 1 represents the chromaticity value of the first distorted version of the color and u', v', x or y with subscript 2 represents the chromaticity value of the second distorted version of the color. In this embodiment, Gmin=g($|u'-u'_1|$) (or using v', x or y instead of u') and Gmax=h($|u'-u'_2|$) (or using v', x or y instead of u').

In another embodiment, step S1 comprises obtaining the lower limit of the first color component of the first color component of the first pixel in the first color space based on a distance between u' or x chromaticity values of the color and the first distorted version of the color in the luminance and chromaticity color space and a distance between v' or y chromaticity values of the color and the first distorted version of the color in the luminance and chromaticity color space. Hence, in this embodiment Gmin=g($|u'-u'_1|,|v'-v'_1|$) (or using x and y instead of u' and v'). Correspondingly, step S2 comprises obtaining the upper limit of the first color component of the first color component of the first pixel in the first color space based on a distance between u' or x chromaticity values of the color and the second distorted version of the color in the luminance and chromaticity color space and a distance between v' or y chromaticity values of the color and the second distorted version of the color in the luminance and chromaticity color space. Hence, in this embodiment Gmax=h($|u'-u'_2|,|v'-v'_2|$) (or using x and y instead of u' and v').

In other embodiments, step S1 comprises obtaining the lower limit of the first color component of the first color component of the first pixel in the first color space based on 1) a distance between Y luminance values of the color and the first distorted version of the color in the luminance and chromaticity color space and 2) a distance between (u', v', x, y, u'v', or xy) chromaticity values of the color and the first distorted version of the color in the luminance and chromaticity color space. Step S2 then preferably comprises obtaining the lower limit of the first color component of the first color component of the first pixel in the first color space based on 1) a distance between Y luminance values of the color and the second distorted version of the color in the luminance and chromaticity color space and 2) a distance between (u', v', x, y, u'v', or xy) chromaticity values of the color and the second distorted version of the color in the luminance and chromaticity color space.

Instead of basing the upper and lower limit of the distance in luminance components, i.e., $Y-Y_{1/2}$, $Y_{1/2}-Y$ or $|Y-Y_{1/2}|$, the upper and lower limits of the first color component could be based on a difference between the inverse of a transfer function of the luminance values of the color and the first or second distorted version of the color, i.e., $tf^{-1}(Y)-tf^{-1}(Y_{1/2})$, $tf^{-1}(Y_{1/2})-tf^{-1}(Y)$ or $|tf^{-1}(Y)-tf^{-1}(Y_{1/2})|$, wherein $tf^{-1}(\ )$ is the inverse of the transfer function, preferably the PQ EOTF.

For instance, Gmin=g($|u'-u'_1|, |v'-v'_1|, |tf^{-1}(Y)-tf^{-1}(Y_1)|$) and Gmax=h($|u'-u'_2|, |v'-v'_2|, |tf^{-1}(Y)-tf^{-1}(Y_2)|$).

In an embodiment, step S1 comprises obtaining the lower limit of the first color component as a smallest value of the first color component that results in a perceptual similarity measure that is below a first threshold value. The perceptual similarity measure is based on the distance between the color and the first distorted version of the color in the second color space. Correspondingly, step S2 comprises obtaining the upper limit of the first color component as a largest value of the first color component that results in a perceptual similarity measure that is below a second threshold value. The perceptual similarity measure is based on the distance between the color and the second distorted version of the color in the second color space.

Thus, the lowest limit is the limit for how low the first color component can become without breaking the perceptual similarity measure sm{ }. Hence, sm{RGB, $RG_{smooth}B$}≤$\phi_1$ if $G_{smooth}$≥$G_{min}$ and sm{RGB, $RG_{smooth}B$}$\phi_1$ if $G_{smooth}$<$G_{min}$ where $\phi_1$ denotes the first threshold value. Correspondingly, the upper limit is the limit for how high the first color component can become without breaking the perceptual similarity measure, i.e., sm{RGB, $RG_{smooth}B$}$\phi_2$ if $G_{smooth}$≤$G_{max}$ and sm{RGB, $RG_{smooth}B$}>$\phi_2$ if $G_{smooth}$>$G_{max}$ where $\phi_2$ denotes the second threshold value.

In a particular embodiment, the first and second threshold values are equal, i.e., $\phi_1=\phi_2=\phi$.

In an embodiment, the method comprises an additional step S10 as shown in FIG. 2. This step S10 comprises calculating the perceptual similarity measures that are then compared to the first and the second threshold value or to the single threshold value. In embodiment, the method also comprises calculating at least one of the first threshold value and the second threshold value, or the single threshold value, based on the color of the first pixel in step S4.

The concept of calculating similarity measures could also be extended to the case of basing the upper and lower limits on the chromaticity values or chromaticity and luminance values of the color and the first and second distorted version of the color. For instance, perceptual similarity measures could be calculated for the chromaticity values u' and v', $sm_u${RGB, $RG_{smooth}B$} and $sm_v${RGB, $RG_{smooth}B$}, and for the luminance value Y, $sm_Y${RGB, $RG_{smooth}B$}.

In such an embodiment, the same threshold value could be used for all perceptual similarity measures, $sm_{u'}$, $sm_{v'}$, $sm_Y$, the same threshold value could be used for the perceptual similarity measures for the chromaticity values and another threshold value could be used for the perceptual similarity measure for the luminance values, or different threshold values could be used for all perceptual similarity measures.

An example of a suitable threshold value to be used at least for the perceptual similarity measures $sm_{u'}$, $sm_{v'}$ is 0.5/410. An example of suitable threshold values to be used for the perceptual similarity measure $sm_Y$ is 0.5/1023 or 0.5/876.

In an embodiment, step S1 of FIG. 1 comprises obtaining a lower limit of a green component of the first pixel in a red, green and blue color space based on the distance between the color and the first distorted version of the color in a luminance and chromaticity color space. Correspondingly, in this embodiment step S2 comprises obtaining an upper limit of the green component of the first pixel in the red, green and blue color space based on the distance between the color and the second distorted version of the color in the luminance and chromaticity color space. Step S3 then preferably comprises obtaining a filtered value of the green component for the first pixel which is larger than or equal to the obtained lower limit and lower than or equal to the obtained upper limit.

In alternative embodiments of steps S1-S2, lower and upper limits are determined for a red component of the first pixel in the red, green and blue color space or for a blue component of the first pixel in the red, green and blue color space. Correspondingly, in these alternative embodiments filtered values of the red or blue component for the first pixel are obtained in step S3.

The pixels, also denoted samples in the art, in pictures of a video sequence typically have the pixel values, also denoted sample values in the art, in terms of red, green and blue components. Thus, the upper and lower limits obtained in steps S1 and S2 are preferably upper and lower limits of at least one of the color components in the red, green and blue color space. Correspondingly, the modification or filtering that results in a filtered value is then preferably performed on at least one of the red, green and blue component.

Although the limits are determined in the red, green and blue color space a more perceptually relevant color space is used to keep track of how big changes in at least one of the red, green and blue component are possible and still result in a filtered color in the red, green and blue color space that is regarded as equivalent to the original color for the first pixel, i.e., any differences between the filtered color and the original color are not distinguishable for the human visual system. The perceptually relevant color space is preferably a luminance and chromaticity color space, such as the Yu'v' or Yxy color space.

Generally, it is not possible to see a difference between two colors if the change in chromaticity as measured in the u'v' representation is smaller than a threshold value of 0.5/410. Thus, the u'v' components can be quantized to 8 or 9 bits without any visual degradation. Since the u'v' can vary between 0 and 0.62, quantizing to 8 bits is equivalent of multiplying by 255/0.62=410 and rounding. The maximum rounding error is therefore 0.5/410, and such a small difference in either u' or v' should thus not be possible to see. Correspondingly, as a general rule of thumb it is not possible to see any difference between two colors if the luminance Y difference of the two colors is smaller than half a quantization step after the inverse of the transfer function PQ EOTF (SMPTE ST 2084 [2]) has been employed. The range for the $tf^{-1}(Y)$ is typically [64, 940]. Thus, the threshold value would then be 0.5/(940−64)=0.5/876. If, however, the full 10 bit range is allowed, the threshold value would instead be 0.5/1023.

In a particular embodiment, step S1 comprises calculating the lower limit of the green component as a maximum of $Gmin_{u'}$, $Gmin_{v'}$ and $Gmin_Y$. In this particular embodiment, $Gmin_{u'}$ represents a smallest green component that results in a change in a chromaticity component u' that is smaller than a u' threshold, preferably 0.5/410. $Gmin_{v'}$ represents a smallest green component value that results in a change in a chromaticity component v' that is smaller than a v' threshold, preferably 0.5/410. $Gmin_Y$ represents a smallest green component value that results in a change in a luminance component Y that is smaller than a Y threshold, preferably 0.5/876 or 0.5/1023 if the comparison is made by first taking the inverse of the transfer function of the two luminance components to be compared.

In this particular embodiment, step S2 comprises calculating the upper limit of the green component as a minimum of $Gmax_{u'}$, $Gmax_{v'}$ and $Gmax_Y$. In this particular embodiment, $Gmax_{u'}$ represents a largest green component value that results in a change in a chromaticity component u' that is smaller than the u' threshold. $Gmax_{v'}$ represents a largest green component value that results in a change in a chromaticity component v' that is smaller than the v' threshold. $Gmax_Y$ represents a largest green component value that results in a change in a luminance component Y that is smaller than the Y threshold.

Hence, in this particular embodiment $Gmin=\max(Gmin_{u'}, Gmin_{v'}, Gmin_Y)$ and $Gmax=\min(Gmax_{u'}, Gmax_{v'}, Gmax_Y)$.

In other embodiments of steps S1 and S2, the lower and upper limits of the red component or the blue component as calculated in a similar way as presented above for the green component.

FIG. 3 is a flow chart illustrating additional, optional steps of the method shown in FIG. 1 according to an embodiment. These steps include calculating $Gmin_{u'}$ in step S20, calculating $Gmin_{v'}$ in step S21, calculating $Gmin_Y$ in step S22, calculating $Gmax_{u'}$ in step S23, calculating $Gmax_{v'}$ in step S24 and calculating $Gmax_Y$ in step S25. The method then continues to step S1 in FIG. 1. Steps S20 to S25 can be performed serially in any order or at least partly in parallel.

In an embodiment, step S20 comprises calculating $Gmin_{u'}=G+$minimum of $\delta G_1$ and $\delta G_2$. In this embodiment, $\delta G_1=(4(X+t_{11}\delta R+t_{13}\delta B))-(u'-\Delta u')(D+K_1\delta R-K_3\delta B))/((u'-\Delta u')K_2-4t_{12})$ and $\delta G_2=(4(X+t_{11}\delta R+t_{13}\delta B)-(u'+\Delta u')(D+K_1\delta R-K_3\delta B))/((u'+\Delta u')K_2-4t_{12})$. $\delta R$ is zero or represents a difference between an original value of a red component of the first pixel and a filtered value of the red component and $\delta B$ is zero or represents a difference between an original value of a blue component of the first pixel and a filtered value of the blue component. X, Y, Z represent a value of an X component, a value of an Y component and a value of a Z component of the first pixel in an XYZ color space. u' represents a value of a u' chromaticity component of the first pixel and $\Delta u'$ represents a distance between a chromaticity component u' of the first pixel and a chromaticity component u' of the first distorted version and the second distorted version of the first pixel.

$$D = X + 15Y + 3Z, K_1 = t_{11} + 15t_{21} + 3t_{31},$$

$$K_2 = t_{12} + 15t_{22} + 3t_{32}, K_3 = t_{13} + 15t_{23} + 3t_{33} \text{ and}$$

$$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R \\ G \\ B \end{bmatrix}.$$

In this embodiment, step S21 comprises calculating $Gmin_{v'}=G+$minimum of $\delta G_3$ and $\delta G_4$. $\delta G_3=(9(X+t_{21}\delta R+t_{23}\delta B)-(v'-\Delta v')(D+K_1\delta R-K_3\delta B))/((v'-\Delta v')K_2-9t_{22})$ and $\delta G_4=(9(X+t_{21}\delta R+t_{23}\delta B)-(v'+\Delta v')(D+K_1\delta R-K_3\delta B))/((v'+\Delta v')K_2-9t_{22})$. v' represents a value of a v' chromaticity component of said the first pixel and Δv' represents a distance between a chromaticity component v' of the first pixel and a chromaticity component v' of the first distorted version and the second distorted version of the first pixel.

Step S22 comprises calculating $Gmin_y=G+(tf(tf^{-1}(Y)-\phi_2)-Y_h)/w_G$. In this embodiment, $tf()$ represents a transfer function, $tf^{-1}()$ represents an inverse of the transfer function, $\phi_2$ is a threshold value, $Y_h=w_R(R+\delta R)+w_G G+w_B(B+\delta B)$ and $w_R$, $w_G$, $w_B$ represent color weights.

Finally, step S23 comprises calculating $Gmax_{u'}=G+$maximum of $\delta G_1$ and $\delta G_2$, step S24 comprises calculating $Gmax_{v'}=G+$maximum of $\delta G_3$ and $\delta G_4$ and step S25 comprises calculating $Gmax_y=G+(tf(tf^{-1}(Y)+\phi_2)-Y_h)/w_G$.

The above presented embodiments can also be applied to the red and blue components instead of the green component.

In an embodiment, only one of the color components of the first pixel are processed according to the embodiments, i.e., replaced by a filtered value limited by the obtained lower and upper limits. This color component could then be the green component, the red component or the blue component of the first pixel.

In other embodiments, two color components of the first pixel are processed according to the embodiments, such as the red and green components, the green and blue components or the red and blue components, or all three color components of the first pixel are processed according to the embodiments.

In these embodiments, the parameters δR and δB (or δR and δG, or δB and δG) are zero for the first color component of the first pixel. Thus, in a particular embodiments steps S20-S25 and steps S1-S3 are preferably performed first for the first color component of the first pixel to obtain a filtered value of this first color component. In this first cycle or iteration of steps S20-S25 and S1-S3, the above mentioned δ parameters are zero. However, in a second cycle or iteration when steps S20-S25 and S1-S3 are performed for a second color component of the first pixel, the δ parameter for the first color component represents a difference between an original value of the first color component of the first pixel and the filtered value obtained in step S3 for the first color component. The other δ parameter is then zero. Correspondingly, in a third cycle or iteration of steps S20-S25 and S1-S3, the δ parameter for the first color component represents a difference between an original value of the first color component of the first pixel and the filtered value obtained in step S3 for the first color component during the first cycle or iteration and the δ parameter for the second color component represents a difference between an original value of the second color component of the first pixel and the filtered value obtained in step S3 for the second color component during the second cycle or iteration.

FIG. 4 is a flow chart illustrating an embodiment of step S3 in FIG. 1. The method continues from step S2 in FIG. 1. A next step S30 comprises calculating a filtered value of the first color component for the first pixel based on respective values of the first color component for the first pixel and neighboring pixels in the picture. The following step S31 comprises clamping the filtered value calculated in step S30 between the obtained lower limit and the obtained upper limit so that the filtered value is larger than or equal to the obtained lower limit and lower than or equal to the obtained upper limit.

Thus, in an embodiment, the filtered value of the first color component for the first pixel is calculated based on the value of this first color component for the first pixel and respective values of the first color component of neighboring pixels in the picture, preferably neighboring and adjacent pixels in the picture.

The relevant neighboring or adjacent pixels could be selected according to various embodiments. In a first embodiment, the neighboring pixels include the pixels directly above, below, to the right and to the left of the first pixel in the picture. This first embodiment thereby corresponds to a plus shaped filter aperture centered at the first pixel. In a second embodiment, the filter aperture has a rectangular aperture or a quadratic aperture. For instance, a 3×3 filter aperture could be used centered at the first pixel. Such a filter aperture thereby encompasses neighboring pixels above to the left, directly above, above to the right, directly to the left, directly to the right, below to the left, directly below and below to the right of the first pixel in the first picture.

In an embodiment, step S30 comprises calculating the filtered value of the first color component for the first pixel as an average of respective values of the first color component for the pixel and neighboring pixels, preferably neighboring pixels directly above, below, to the right and to the left of the first pixel in the picture.

This corresponds to finite impulse response (FIR) filtering the first color component in both the horizontal and vertical direction. For instance, a 5-tap box filter {1, 1, 1, 1, 1}/5 could be used.

Thus, in this embodiment the filtered value is calculated as the average value of the first color component for the pixels encompassed by the filter aperture. In a preferred embodiment, the filter aperture is a plus shaped filter aperture. However, the calculation of the average value of the first color component could also be applied to other filter apertures than plus shaped filter apertures.

Instead of average value, weighted averages could be used, in which case the weights could differ for at least two of the pixels encompassed by the filter aperture. For instance, a first weight could be used for the first pixel whereas a second, different weight is user for the neighboring pixels. Alternatively, a bilateral filter could be used to obtain the filtered value. A further alternative is to output the media value as the filtered value.

The clamping performed in step S31 thereby uses the clamping function clamp (x,a,b), which sets the value to a if x<a and to b if x>b and x otherwise. Thus, the clamping guarantees that the filtered value is within the lower and upper limits.

In an embodiment, step S1 in FIG. 1 comprises obtaining, for each pixel of the first pixel and the neighboring pixels in the picture, a respective lower limit of the first color component in the first color space based on a respective distance between a respective color of the pixel and a respective first distorted version of the respective color in the second color space. Step S2 comprises obtaining, for each pixel of the first pixel and the neighboring pixels in the picture, a respective upper limit of the first color component in the first color space based on a respective distance between a respective color of the pixel and a respective second distorted version of the respective color in the second color space. In this embodiment, step S3 comprises steps S30 and S31 as shown in FIG. 4. Step S30 comprises, in this embodiment, calculating, for each pixel of the first pixel and the neighboring pixels in the picture, a respective filtered value of the first color component based on respective values of the first color component for the first pixel and the neighboring pixels in the picture. Step S31 comprises clamping, for each pixel of the first pixel and the neighboring pixels in the picture, the respective filtered value between the respective obtained lower limit and the respective obtained upper limit so that the respective filtered value is larger than or equal to the respective obtained lower limit and lower than or equal to the respective upper limit.

Hence, in this embodiment, not only the first pixel but also the neighboring pixels in the picture are filtered to obtain a respective filtered value. In fact, the processing of the embodiments is advantageously applied to all pixels or at least a subset thereof in the picture. In such a case, respective upper and lower limits are obtained for each pixel to be processed and preferably for each color component to be filtered for each pixel to be processed.

Thus, it is generally preferred to perform the processing of the embodiments on not only a single pixel in a picture but rather on multiple, i.e., at least two, pixels or indeed all or at least a major portion of all pixels in the picture. In such a case, the filtered color component(s) of each such pixel replaces the original color component(s) of these pixels.

The calculation of filtered value and clamping in steps S30 and S31 could be performed once for the color component(s) to be filtered for the pixel or pixels that are to be processed according to the embodiments. In alternative embodiments, steps S30 and S31 are performed multiple times, which is schematically illustrated by the line L1 in FIG. 4.

Hence, in an embodiment the method comprises repeating calculating the respective filtered value in step S30 and clamping the respective filtered value in step S31 for each pixel of the first pixel and the neighboring pixel using a respective clamped filtered value of the first color component from iteration n-1 of calculating the respective filtered value and clamping the respective filtered value as input to calculating the respective filtered value for iteration n of calculating the respective filtered value and clamping the respective filtered value until N iterations have been reached.

Thus, the filtering of the color component(s) can be evermore refined by repeating steps S30 and S31 at least once. In the first iteration of steps S30 and S31, the filtered value calculated in step S30 is calculated based on, preferably as the average of, the original color component(s) of the first pixel and the neighboring pixels. In the second iteration of steps S30 and S31, the filtered value calculated in step S30 is calculated based on, preferably as the average of, the filtered and clamped color component(s) of the first pixel and the neighboring pixels as obtained after the first iteration. This process can be proceeded with a third or more iterations if desired.

However, although the color components that are used as a basis for calculating the filtered value in step S30 change for each iteration, the same lower and upper limits are preferably used for the pixel in each iteration. Hence, there is no need to recalculate the upper and lower limits for a given pixel at each iteration of steps S30 and S31. Thus, only a single set of upper and lower limits is needed for each color component for each pixel to be processed.

In the above illustrated embodiment, steps S30 and S31 are performed a fixed number of times, such as twice for each color component and each pixel to be processed. Instead of having a fixed, predefined number of iterations, the loop represented by line L1 could be repeated until the difference between a filtered and clamped value in iteration n differs from the filtered and clamped value in iteration n-1 or the original color component value for the first iteration with less than a predefined threshold value. Hence, the loop L1 is stopped once any changes in the filtered and clamped value fall below the predefined threshold value.

Instead of calculating the difference between the filtered and clamped values, the difference could be calculated between the inverse transfer function of the filtered and clamped values.

FIG. 6 is a schematic overview of a processing of a first pixel according to an embodiment. In this embodiment, all color components of the first pixel are filtered starting with the green, followed by the red and blue components. Starting with the green component, for every pixel having an original color in the RGB color space of the picture, lower and upper limits (Gmin, Gmax) are calculated as disclosed herein. The green component G of the first pixel is then filtered and clamped to produce a first filtered value $\hat{G}$ for the green component in the first iteration of steps S30 and S31. The filtering and clamping is then performed, in this embodiment, once more using the same lower and upper limits (Gmin, Gmax) as in the first iteration to output a second filtered value $\hat{\hat{G}}$. The new current color of the first pixel following filtering of the green component is R$\hat{\hat{G}}$B. This process is then repeated for the blue component as second color component. First, the lower and upper limits of the blue component (Bmin, Bmax) are calculated using the original RGB color of the first pixel and the new current color R$\hat{\hat{G}}$B. Hence, in this case $\delta R=0$ and $\delta G=\hat{\hat{G}}-G$. The blue component is then filtered and clamped first once to obtain $\hat{B}$ and then a second time to obtain $\hat{\hat{B}}$. The new current color of the first pixel is then R$\hat{\hat{G}}\hat{\hat{B}}$. Finally, the process is repeated once more for the red component by first calculating the lower and upper limits (Rmin, Rmax) based on the original color RGB of the first pixel and the new current color R$\hat{\hat{G}}\hat{\hat{B}}$ with $\delta B=\hat{\hat{B}}-B$ and $\delta G=\hat{\hat{G}}-G$. The red component is filtered and clamped twice as the other two color components to obtain $\hat{R}$ and then a second time to obtain $\hat{\hat{R}}$ and the final filtered color $\hat{\hat{R}}\hat{\hat{G}}\hat{\hat{B}}$ of the first pixel, also denoted smoothed value herein.

The order at which the color components are processed may differ from what is shown in FIG. 6, such as G, B and R; B, G and R; B, R and G; R, G and B; or R, B and G instead of G, B and R.

In an embodiment, the method comprises additional, optional steps S4 and S5 as illustrated in FIG. 5. Step S4 comprises calculating chroma or chromaticity component values for the first pixel based on a smoothed value of the color in the first color space equal to the color in the first color space but with a respective value of each color component in the color in the first color space replaced by a respective filtered value of the color component.

The following step S5 comprises obtaining a luminance corrected color based on the calculated chroma or chromaticity component values for the first pixel and a luminance component value obtained based on the color in the first color space.

In an embodiment, step S4 comprises calculating Cb' and Cr' chroma values based on the smoothed value of the color. In a particular embodiment, the Cb' and Cr' chroma values are calculated according to the below presented color transformation using the inverse of the transfer function of the smoothed value of the color $\hat{\hat{R}}\hat{\hat{G}}\hat{\hat{B}}$ as input. Note that it is only sufficient to calculate the Cb' and Cr' values from the color transformation and not necessarily also the luma value Y' in step S4.

$$\begin{bmatrix} Y' \\ Cb' \\ Cr' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} tf^{-1}(\hat{R}) \\ tf^{-1}(\hat{G}) \\ tf^{-1}(\hat{B}) \end{bmatrix}$$

In this embodiment, the luminance corrected color for the first pixel is an Y'Cb'Cr' color in the luma and chroma color space. The luma component Y' for the first pixel is then preferably obtained according the luma adjustment disclosed in [4].

In another embodiment, step S4 comprises calculating chromaticity values xy in the Yxy color space from the smoothed color $\hat{R}\hat{G}\hat{B}$. In this embodiment, the original luminance $Y_o$ is preferably calculated from the original RGB color of the first pixel. The chromaticity values xy and the original luminance $Y_o$ are combined to calculate a final luminance corrected color $X_fY_fZ_f$ in the XYZ color space for the first pixel. A final luminance corrected color $R_fG_fB_f$ can then be calculated for the first pixel based on the calculated $X_fY_fZ_f$ color as indicated in FIG. 6.

In the above described calculations the following color transformations may be used:

$$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} \hat{R} \\ \hat{G} \\ \hat{B} \end{bmatrix}$$

$$x = \frac{X}{X+Y+Z}$$

$$y = \frac{Y}{X+Y+Z}$$

$$Y_0 = t_{21}R + t_{22}G + t_{23}G$$

$$X_f = \frac{xY_0}{y}, Y_f = Y_0, Z_f = \frac{(1-x-y)Y_0}{y}$$

$$\begin{bmatrix} R_f \\ G_f \\ B_f \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} X_f \\ Y_f \\ Z_f \end{bmatrix}$$

$a_{11}$-$a_{33}$, $b_{11}$-$b_{33}$, $t_{11}$-$t_{33}$ are constants that depend on the type of color space used, such as BT.709 color space, BT.2020 color space, DCI-P3 color space or BT.601 color space.

For BT.709: $a_{11}$=0.212600, $a_{12}$=0.715200, $a_{13}$=0.072200, $a_{21}$=−0.114572, $a_{22}$=−0.385428, $a_{23}$=0.500000, $a_{31}$=0.500000, $a_{32}$=−0.454153, $a_{33}$=−0.045847; for BT.2020: $a_{11}$=0.262700, $a_{12}$=0.678000, $a_{13}$=0.059300, $a_{21}$=−0.139630, $a_{22}$=−0.360370, $a_{23}$=0.500000, $a_{31}$=0.500000, $a_{32}$=−0.459786, $a_{33}$=−0.040214; for DCI-P3: $a_{11}$=0.2096, $a_{12}$=0.7215, $a_{13}$=0.0690, $a_{21}$=−0.1125, $a_{22}$=−0.3875, $a_{23}$=0.5000, $a_{31}$=0.5000, $a_{32}$=−0.4564, $a_{33}$=−0.0436; and for BT.601: $a_{11}$=0.299000, $a_{12}$=0.587000, $a_{13}$=0.114000, $a_{21}$=−0.168736, $a_{22}$=−0.331264, $a_{23}$=0.500000, $a_{31}$=0.500000, $a_{32}$=−0.418688, $a_{33}$=−0.081312.

For BT.709: $t_{11}$=0.412391, $t_{12}$=0.357584, $t_{13}$=0.180481, $t_{21}$=0.212639, $t_{22}$=0.715169, $t_{23}$=0.072192, $t_{31}$=0.019331, $t_{32}$=0.119195, $t_{33}$=0.950532; for BT.2020: $t_{11}$=0.636958, $t_{12}$=0.144617, $t_{13}$=0.168881, $t_{21}$=0.262700, $t_{22}$=0.677998, $t_{23}$=0.059302, $t_{31}$=0.000000, $t_{32}$=0.028073, $t_{33}$=1.060985; for DCI-P3: $t_{11}$=0.486571, $t_{12}$=0.265668, $t_{13}$=0.198217, $t_{21}$=0.228975, $t_{22}$=0.691739, $t_{23}$=0.079287, $t_{31}$=0.00000, $t_{32}$=0.045113, $t_{33}$=1.043944; and for BT.601: $t_{11}$=0.430554, $t_{12}$=0.341550, $t_{13}$=0.178352, $t_{21}$=0.222004, $t_{22}$=0.706655, $t_{23}$=0.071341, $t_{31}$=0.020182, $t_{32}$=0.129553, $t_{33}$=0.939322.

The values of $b_{11}$-$b_{33}$ can be obtained from the values of $t_{11}$-$t_{33}$.

An aspect of the embodiments defines a method for processing a first pixel in a picture. The first pixel having a color that is represented in a first color space. The method comprises obtaining a lower limit to a first color component of the first pixel in the first color space, based on a distance between the color and a distorted version of the color in a second color space. The distorted version of the color is equal to the color in the first color space except in the first color component. The method also comprises obtaining an upper limit to the first color component of the first pixel in the first color space, based on a distance between the color and a distorted version of the color in the second color space. The distorted version of the color is equal to the color in the first color space except in the first color component. The method further comprises obtaining a filtered value of the first color component for the pixel which is larger than or equal to the obtained lower limit and lower than or equal to the obtained upper limit.

Figure 7:
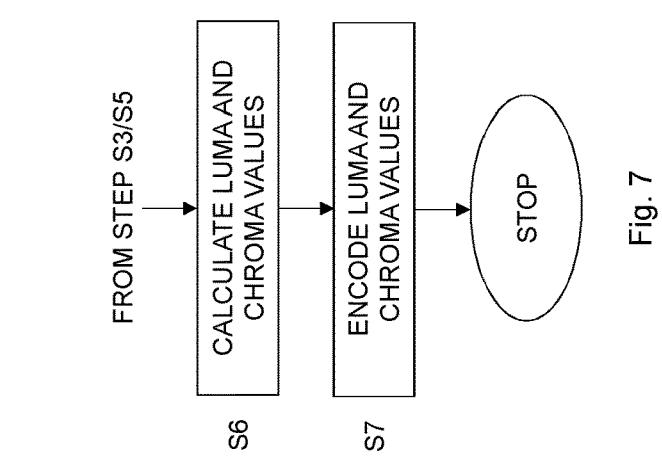
FIG. 7 is a flow chart illustrating a method for encoding a first pixel according to an embodiment.

Another aspect of the embodiments relates to a method for encoding a first pixel having a color in a first color space in a picture. The method comprises processing the first pixel according to any of the embodiments to obtain a filtered value of a first color component of the color in the first color space. The method also comprises, see FIG. 7, calculating a luma component value and chroma component values for the pixel based on a smoothed value of the color in the first color space comprising a value of the first color component in the color in the first color space replaced by the filtered value of the first color component. The method also comprises encoding the luma component value and subsampled chroma component values.

Thus, the smoothed value of the color, such as represented as $R_fG_fB_f$ in the foregoing, is used to calculate a luma Y' value and chroma Cb', Cr' values for the first pixel, such as according to $$\begin{bmatrix} Y' \\ Cb' \\ Cr' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} tf^{-1}(\hat{R}) \\ tf^{-1}(\hat{G}) \\ tf^{-1}(\hat{B}) \end{bmatrix}.$$

The chroma values are preferably subsampled into 4:2:0 or 4:2:2 format. The resulting luma and subsampled chroma values are then input to a video encoder to be encoded. The output of the video encoder is a bitstream representing encoded pictures, preferably of a video sequence.

Thus, the processing of pixels can be used as an additional processing during encoding pixels of pictures, such as in connection with encoding pictures of a video sequence.

The output of the processing, i.e., the smoothed value of the color, is then converted to a Y'Cb'Cr' in the 4:2:0 or 4:2:2 format. The subsampled Y'Cb'Cr' value is then input to a video encoder, such as a H.264 video encoder, a HEVC or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g. a context-adaptive binary arithmetic coding (CABAC) encoder.

Advantageously, by processing a picture or image, according to the present invention, prior to encoding or compression, it is possible to change the picture in a way that is invisible for the human eye but gives considerable differences in its Y'Cb'Cr' representation, making the Y'Cb'Cr' representation smoother as well as more consistent across frames or pictures. This will have a great impact on encoding or compression efficiency.

A problem that may arise according to the prior art is when the upsampling filters for the Cb' and Cr' channels in the video decoder or display are not known for the video encoder. For instance, if the upsampling filters used in the luma adjustment processing [4] differs from those used in the video decoder or display, luma adjustment may not reduce all luminance artifacts fully for that video decoder or display.

The processing according to the embodiments will also lessen these problems associated with possibly mismatching filters in the luma adjustment processing and the video decoder. Since the chroma will be much smoother according to the embodiments, the type of filters used in the upsampling process will matter much less, and any possible artifacts due to possibly mismatching filters will be eliminated or substantially reduced.

Another problem can happen if the tone mapping or other processing in the video decoder or display is not done in a luminance-preserving way. What this means is that two pixels that have the same luminance in the input data may get different luminance when displayed. In that case luminance artifacts may creep back even though luma adjustment [4] has been used. The processing according to the embodiments will reduce artifacts for video decoders or displays that are doing a non-luminance preserving tone mapping or other processing during the decoding or display. The reason for this is that neighboring colors after this processing often not only get the same luminance, but even the same color. This means that any video decoder or display that just maps similar colors to similar colors will give a reasonable picture out. For this reason the creeping back of luminance artifacts due to non-luminance preserving processing in the video decoder or display is eliminated or substantially reduced.

Yet another problem is that while luma adjustment can provide a perfect luminance on uncompressed video data, compression will lower its efficiency, and artifacts may creep back. The reason for this is that luma adjustment makes sure that the luma Y' exactly matches the upsampled chroma Cb' and Cr' so that the resulting luminance is correct. But when the chroma signal changes due to compression, and when the luma signal also changes due to compression, they will no longer match perfectly, making it possible for artifacts to creep back.

The video data after being processed according to the invention will be able to be compressed much harder without luminance artifacts creeping back. The reason for this is that prediction works much better both in luma and chroma. This means that the luma and chroma signals can be preserved much better and hence they are matching each other better, lowering luminance artifacts. The effect can be as large as 10 quantization parameter (QP) steps, i.e., a sequence compressed using the processing proposed in this invention may at a QP of X may look similar or even better to a sequence compressed without this invention at a QP of X-10.

This technique helps not only with compression of 4:2:0 and 4:2:2 material, but also when the video encoder and video decoder operate in 4:4:4. The reason is that the resulting Y'Cb'Cr' 4:4:4 signals will be smoother and also more consistent between frames or pictures, both of which helps compression.

The processing of pixels in pictures, such as of a video sequence, may also be used in other applications besides video encoding. For instance, the embodiments can be used as a processing that is applied before transferring video over an interface, such as HDMI, DisplayPort or Thunderbolt. For example, in HDMI 2.0a the only way to convey 4K resolution at 50 or 60 frames per second (fps) is to use 4:2:0 or 4:2:2 Y'Cb'Cr' subsampling. If the video data is in full chroma sampling format (4:4:4) then a subsampling step must be applied before sending the video data over the HDMI cable. The 4:2:0 or 4:2:2 video data is then transferred over the interface without further compression. By applying the processing of the embodiments, the video quality is improved compared to conventional 4:2:0 or 4:2:2 subsampling without any correction of chroma components.

Various implementation examples and embodiments now follows. Note that even though some of the examples will be for the BT.709 color space [6], the method is intended to work also in other color spaces, such as in the BT.2020 color space [7] and the DCI-P3 color space [8, 9].

Assume that you have a specific color in BT.709:

$$RGB1=(4000,14.984375,0.155762), \qquad (1)$$

and that you convert this first to non-linear coordinates using a non-linear transfer function, such as SMPTE ST 2084 [2], $$R'G'B'1=(0.9026,0.3325,0.0749) \qquad (2)$$

and then further to Y'CbCr $$Y'CbCr1=(0.4351,-0.1941,0.2968), \qquad (3)$$

which after quantization to 10 bits becomes $$Y'CbCr10 \text{ bit1}=(445,338,778). \qquad (4)$$

One would now assume that if we changed the Y'CbCr10 bit representation by one code level, we would get a value that is sufficiently different for our eyes to see a difference. However, consider the value $$Y'CbCr10 \text{ bit2}=(422,315,793). \qquad (5)$$

This differs by much more than one code level from the representation in Equation (4). When unquantized this becomes $$Y'CbCr2=(0.4087,-0.2199,0.3136), \qquad (6)$$

which converts to $$R'G'B'2=(0.9026,0.3031,0.0007) \qquad (7)$$

and further to $$RGB2=(3999.480037,10.432831,0.000022). \qquad (8)$$

The question now is whether RGB1 and RGB2 are different enough to be seen as two different colors by the human visual system. To evaluate this, we convert both colors to the Yu'v' space:

$$Yu'v'1=(860.297966 \ 0.446926 \ 0.523330) \qquad (9)$$

$$Yu'v'2=(857.906674 \ 0.448070 \ 0.523208). \qquad (10)$$

Here the u' and v' coordinates denote chromaticity. The u'v' space is constructed so that a difference in u' or v' should be roughly equally visible no matter what chromaticity the pixel has. As a general rule of thumb, these coordinates can be quantized to 8 or 9 bits without any visual degradation. Since they can vary between 0 and 0.62, quantizing to 8 bits is equivalent of multiplying by (255/0.62)=410 and rounding. The maximum rounding error is therefore 0.5/410, and such a small error in either u' or v' should thus not be possible to see. Multiplying the difference between the u' coordinates with 410 we get $$|(0.448070-0.446926)*410|=|0.4690|=0.4690<0.5, \quad (11)$$

where |x| denotes the absolute value of x. Hence, the change in the u' coordinate should not be visible. Likewise for v' gives $$|(0.523208-0.523330)*410|=|-0.0500|=0.0500<0.5 \quad (12)$$

which means that the difference in v' is not visible either. To see whether the luminance Y differs, as a rule of thumb we cannot tell the difference if it is smaller than half a quantization step after the inverse of the transfer function PQ, i.e., SMPTE ST 2084, has been employed. We now calculate $$tf\_inv(Y1)=tf\_inv(860.297966)=0.735433, \text{ and} \quad (13)$$

$$tf\_inv(Y2)=tf\_inv(857.906674)=0.735130, \quad (14)$$

where tf(x) is the transfer function defined in Equation 4.1 in the SMPTE document [2] and tf_inv(x) or $tf^{-1}(x)$ is the inverse of tf(x). By multiplying the difference between these results by 1023 and comparing against 0.5, we can see whether the difference of tf_inv(Y1) and tf_inv(Y2) is similar to an error when quantized to 10 bits. As we can see, $$|(0.735130-0.735433)*1023|=|-0.3100|=0.3100<0.5. \quad (15)$$

This means that it will not be possible to tell the difference between the two colors in luminance either. Effectively, for the human visual system, these two colors are therefore indistinguishable, or equivalent. Even though the two colors are indistinguishable, they are very different in the Y'CbCr10 bit representation:

$$Y'CbCr10 \text{ bit1}=(445,338,778) \quad (16)$$

$$Y'CbCr10 \text{ bit2}=(422,315,793). \quad (17)$$

Figure 8:
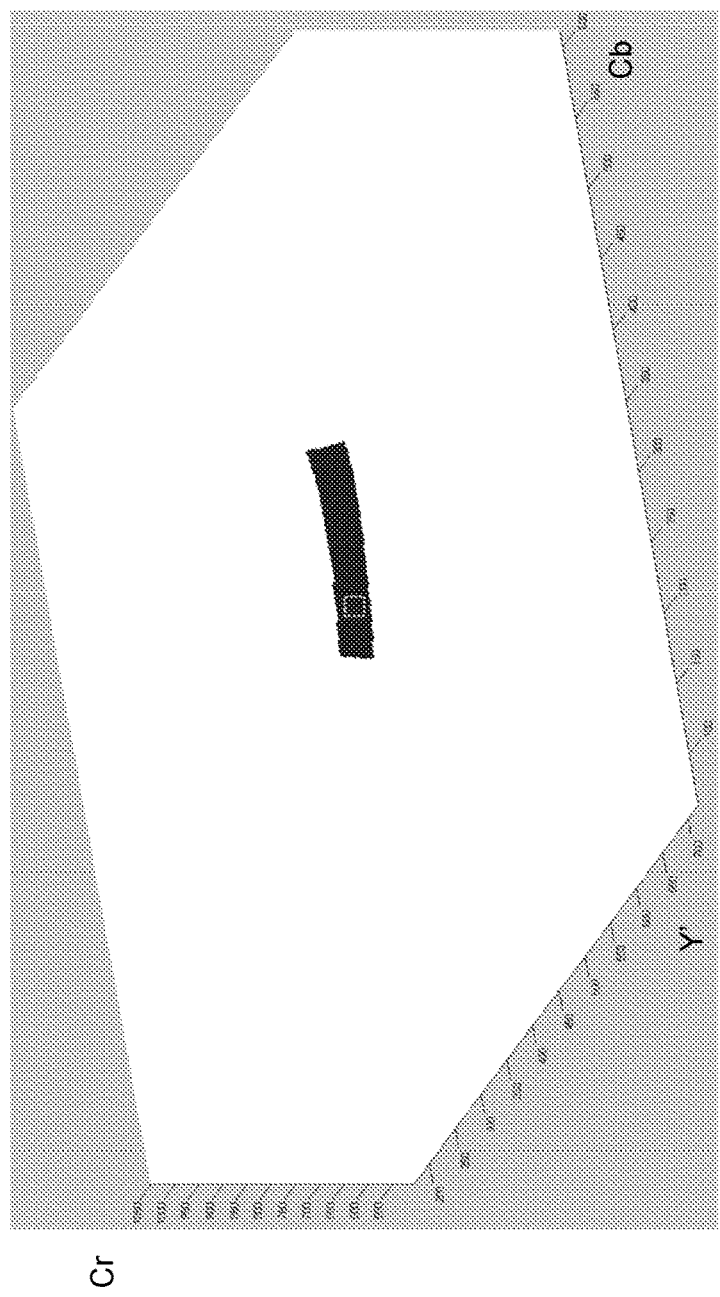
FIG. 8 illustrates all the colors in a 10 bit Y'CbCr10 color space (marked in black) that are equivalent to a given color (marked as a hatched square)

The difference is 23 code levels in both Y' and Cb, and code levels in Cr. However, this does not mean that any change in Cb that is smaller than 23 code levels will generate a color similar to the first—we must also change Y' and Cr in the right direction and the right amount. The 3D plot in FIG. 8 shows all the colors in 10 bit Y'CbCr10 that are equivalent to the first color. Note that the black region, which we can call the equivalency region, spans almost 150 code levels in Cb. The first color is marked with a hatched square.

Figure 9:
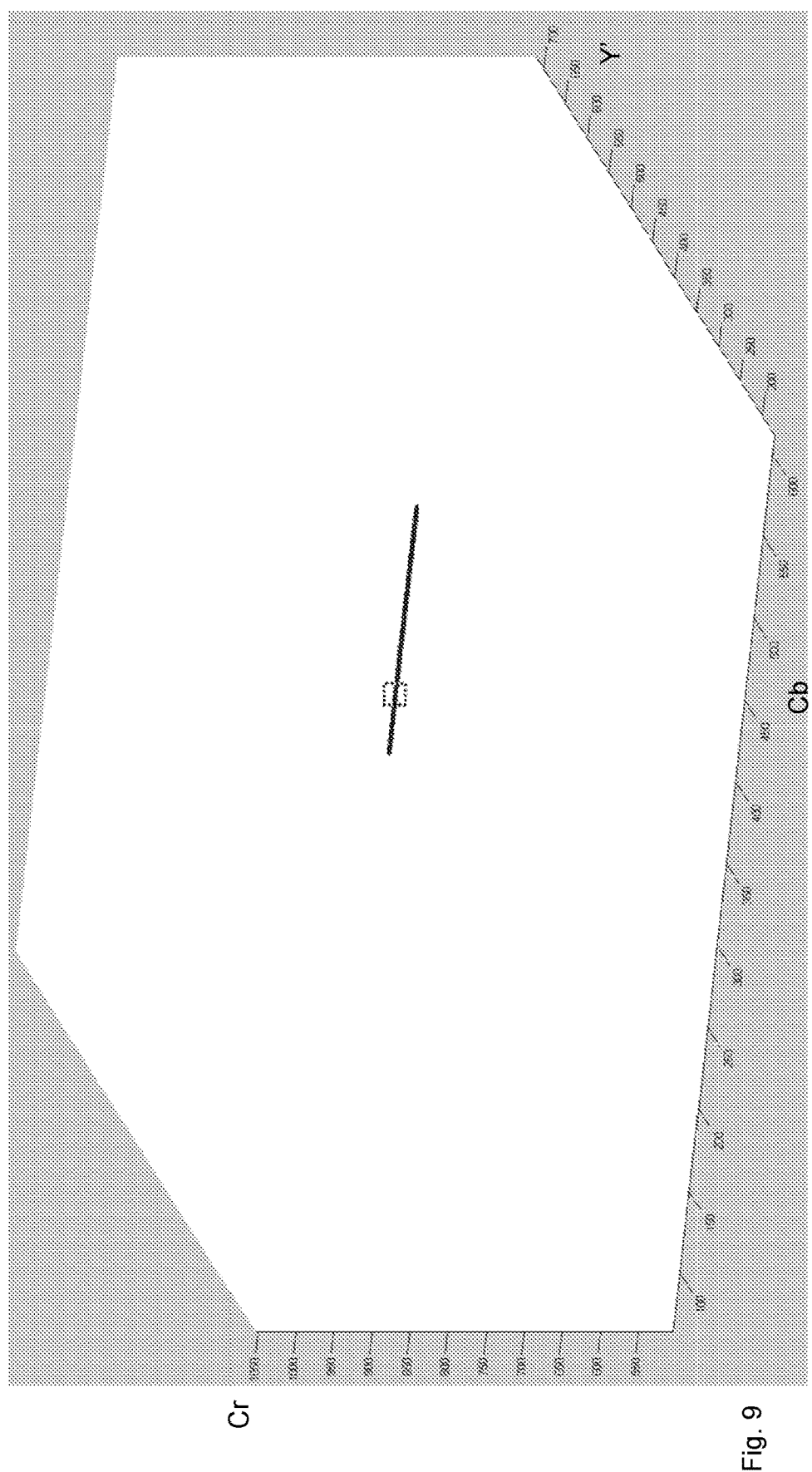
FIG. 9 illustrates the same scenario as the one in FIG. 8 1, but from another viewpoint.

Seen from another angle, we can see that this region of equivalent color, or equivalency region, is very thin in one direction—it is essentially a part of a plane in the 3-dimensional Y'CbCr-space, as shown in FIG. 9.

We therefore see that it is quite important to change Y', Cb and Cr in sync with each other. Changing just one of them will take us outside of the (planar) region, and thus make a visible difference.

Given that the change is biggest in Cb, and given the fact that Cb influences B' the most out of the three components R', G' and B', it is reasonable to assume that it is mostly changes in the blue coordinate in RGB that are responsible for the shape of the equivalency region. The blue value in the original RGB color has a small value (0.155762). It is known that the function tf_inv(x) has a large slope for small values of x. This means that a small change in B will give rise to a large change in B'=tf_inv(x), which in turn will affect Y'CbCr a lot.

Figure 10:
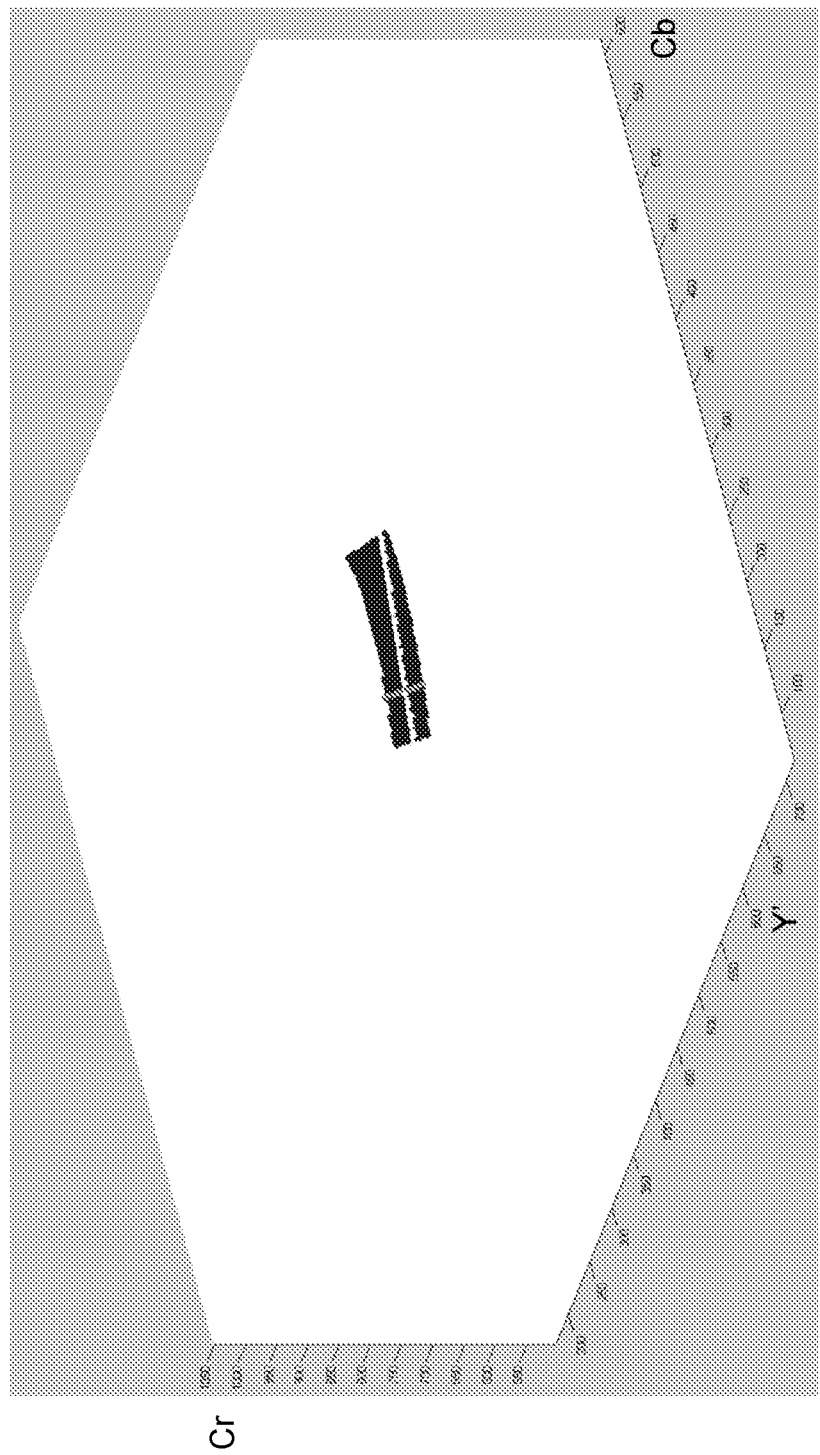
FIG. 10 illustrates all the possibilities for a blue color component that give a color equivalent to a given color.

We can see this by holding the red and green components constant in the color RGB1=(4000, 14.984375, 0.155762), but vary the blue, and plot the values that fall inside the allowed area, the equivalency region, with white in FIG. 10.

Also, keeping the red and blue components constant and varying green, and plotting the values that fall inside the allowed area with green gives the gray line in FIG. 10. It can be seen that changes in blue and green more or less spans the region. Changing red would be going orthogonal to the plane depicted in FIG. 9, and therefore red cannot be changed much without influencing the color as perceived by the human eye.

It makes sense that the green and the blue colors are the ones that we can change without influencing the perception of the color much. For instance, the color (4000, 14.984, 0) is different from the color (4000, 14.984, 0.15), but the difference will not be noticeable, since the red component drowns out the blue. Still, the difference is 65 code levels in B', going from B'=tf(0.0)*(940-64)+64=64 to B'=tf_inv (0.15)*(940-64)+64=128.62. Here we have mapped the value of B' to a value between 64, representing 0.0, and 940, representing 1.0. Therefore, the change in B will influence the R'G'B' representation quite a lot and therefore also the Y'CbCr representation, since Y'CbCr is just a linear mapping away from R'G'B.

Note that this means that if we have noise in the blue component between 0 and 0.15, we will not be able to see the noise, but it will change the Y'CbCr representation quite a bit. Since noise is different from frame to frame, the Y'CbCr representation will change quite a bit from frame to frame, and predicting between two frames may become hard. This noise, which is invisible, will therefore make it harder to compress the video in an efficient manner.

It should also be noted that for some colors, indeed most colors, this effect is not there or at least not as strong. As an example, if we have a perfectly gray color, such as RGB= (290, 290, 290), there will be very few 10-bit Y'CbCr colors that are deemed equivalent to that gray color. Furthermore, a small noise of +/−0.15 in the blue component of such a color will not change the Y'CbCr representation much and thus predicting between frames will not be a problem. For saturated colors though, this problem exists and in the following we will concentrate on such colors for which the problem exists.

The solution presented herein is to make the color of each pixel more similar to that of its neighbor, for instance using filtering. The key insight is that we should never change the color of a pixel so much that it can be seen as a different color by a human observer.

In an embodiment, we only filter one of the components R, G, and B. As an example, we may want to filter the green channel. This may be because it happens to be the most noisy for a particular sequence. Also, it can be seen that the green channel influences the luminance more than the other three color components, at least partly since the weight wG is larger than the weights wR and wB in the equations Y'=wR*R'+wG*G'+wB*B' and Y=wR*R+wG*G+wB*B.

Starting with the original color of a pixel origRGB=(R, G, B), we determine two values Gmin and Gmax. Gmin is determined to be the limit for how low the green component color can become without breaking a perceptual similarity measure sm(RGB1, RGB2):

$$G\text{min is determined such that} \begin{cases} sm[(R, G, B), (R, Gm, B)] < \phi \\ \quad \text{if } Gm > G\text{min} \\ sm[(R, G, B), (R, Gm, B)] > \phi \\ \quad \text{if } Gm < G\text{min} \end{cases} \quad (18)$$

If $sm(RGB1, RGB2) < \phi$ we say that the colors are equivalent, whereas if $sm(RGB1, RGB2) > \phi$, we say that the colors are different. Gmin is therefore the smallest value of G we can use while still regarding the colors as being equivalent, if keeping R and B constant.

An example of $sm(RGB1, RGB2)$ can be $$sm = \max\{|u1' - u2'| * 410, |v1' - v2'| * 410, |tf\_inv(Y1) - tf\_inv(Y2)| * 1023\} \quad (19)$$

where $|x|$ is the absolute value of x, and where $\phi$ is set to $\phi=0.5$. This has the effect of declaring the colors equivalent if their chromaticity does not differ more than the error created when quantizing u' and v' to eight bits. Also, the luminances would not differ more than the error created when quantizing the tf_inv( ) of the luminance to 10 bits. An alternative similarity measure can be $$sm = \max\{|u1' - u2'| * 410, |v1' - v2'| * 410, |tf\_inv(Y1) - tf\_inv(Y2)| * 1023/50)\} \quad (20)$$

where a considerably larger error in luminance is allowed. Since the luminance typically does not change much when adding a tiny value to G if R or B are much bigger than G, another alternative similarity measure can be $$sm = \max\{|u1' - u2'| * 410, |v1' - v2'| * 410\} \quad (20.1)$$

We also determine Gmax in a similar way. Gmax is determined such that $$\begin{cases} sm[(R, G, B), (R, Gm, B)] < \phi \text{ if } Gm > G\text{max} \\ sm[(R, G, B), (R, Gm, B)] > \phi \text{ if } Gm < G\text{max} \end{cases} \quad (21)$$

This means that as long as the green component Gm in the color (R, Gm, B) is between Gmin and Gmax, i.e., $Gm \in$ [Gmin, Gmax], then the color (R, Gm, B) is equivalent to the color (R, G, B) as seen by a human observer.

One way to determine Gmax is to try all possible values of Gm and see which the largest Gm that satisfies the similarity measure is. As an example, one could use the pseudo code

```
for Gm = 0:0.00005:10000
    if( sm[(R, G, B), (R, Gm, B)] < 0.5 )
        Gmax = Gm;
    end;
end;
```

Here, Gm is incremented in steps of 0.00005 since the smallest change allowed in green is $pq\_inv(1/(940-64)) - pq\_inv(0/(940-64)) = 0.000053$. This is $10000/0.00005 = 200000000$ steps, which makes the above pseudocode very slow. Therefore, a better choice may be to step in G' instead:

```
for Gmp = 0:(940-64)
    Gm = tf(Gmp/(940-64))
    if( sm[(R, G, B), (R, Gm, B)] < 0.5 )
        Gpmax = Gmp;
    end;
end;
Gmax = tf(Gpmax);
```

This is only $940-64=876$ steps, which is much better. If we assume that $sm[,]$ is a distance metric, we know that the distance will have a single global minimum, and $sm[(R, Gm, B), (R, G, B)]$ will be monotoneously increasing away from (R, G, B). Therefore, we can use interval halving, also known as binary search, to find Gmin and Gmax, or equivalently, find Gpmin and Gpmax, where Gpmin=tf_inv(Gmin) and Gpmax=tf_inv(Gmax). We know in advance that Gpmax must be between Gp=tf_inv(G) and the largest allowed value of Gp, for instance 1.0. We therefore set the starting interval to [Gp, 1.0]. We can now try a value in the middle of this interval, at GpTest=(Gp+1.0)/2. If this produces a color that is equivalent to (R, G, B), we know that Gpmax must be in the interval [GpTest, 1.0]. Otherwise it must be in the interval [Gp, GpTest]. We can now create a new test value GpTest as the average of the end points of the new interval and iterate. Since the resolution of Gp is in steps of 1/(940-64) it is sufficient with ten step to find a suitable Gpmax. To be on the safe side it is possible to increase this, for instance to twelve iterations. This can be implemented using the following pseudo code:

```
GpLo = (940-64)*tf_inv(G);
GpHi = (940-64);
for qq = 1:12
    GpTest = ((GpLo + GpHi)/2);
    Gtest = tf(GpTest)
    if( sm( [R, G, B], [R, Gtest,B]) < 0.5 )
        GpLo = GpTest;
    else
        GpHi = GpTest;
    end;
end;
GpMax = (GpHi + GpLo)/2;
Gmax = tf(GpMax);
```

It is also possible to set the starting interval to [0.0, 1.0], or in the pseudo code GpLo=0, GpHi=876.

Gmin can now be found in a similar way.

The similarity measures defined above treat errors in u' and v' individually. An error of 0.5/410 in u' and an error of 0 in v' is assumed to be equally good as an error of 0.5/410 in u' and an error of 0.5/410 in v'. An alternate similarity measure would be to take the distance to the correct coordinates in u',v'-space. As an example, we can use $$sm = \max\{410\sqrt{(u1' - u2')^2 + (v1' - v2')^2},\ |tf\_inv(Y1) - tf\_inv(Y2)| * 1023\}. \quad (21.1)$$

This measure would say that an error of 0.5/410 in only one of u', v' would be preferable to the same error in both. Another possibility is to include the luminance into the distance metric;

$$sm = \sqrt{410^2(u1' - u2')^2 + 410^2(v1' - v2')^2 + 1023^2(tf^{-1}(Y1) - tf^{-1}(Y2))^2} \quad (21.2)$$

Another possibility is to avoid the square root. This means that the measure is no longer a metric but it does not matter for the calculations we are interested in here:

$$sm = 410^2(u1' - u2')^2 + \\ 410^2(v1' - v2')^2 + 1023^2(tf^{-1}(Y1) - tf^{-1}(Y2))^2. \quad (21.3)$$

However, one advantage of keeping the error in u' and v' independent as in (19), (20) and (20.1) is that we can calculate it analytically. To see how this is done, it is first noted that u' and v' can be calculated from linear R, G and B in two steps. In the first step we calculate XYZ from RGB, and in the second step we calculate u' v' from XYZ:

$$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R \\ G \\ B \end{bmatrix}. \quad (21.4)$$

As an example, the matrix coefficients for doing this if the RGB color is in BT.2020 is $$T = \begin{bmatrix} t_{11} & t_{12} & t_{13} \\ t_{21} & t_{22} & t_{23} \\ t_{31} & t_{32} & t_{33} \end{bmatrix} = \begin{bmatrix} 0.636958 & 0.144617 & 0.168881 \\ 0.262700 & 0.677998 & 0.059302 \\ 0.000000 & 0.028073 & 1.060985 \end{bmatrix}. \quad (21.5)$$

The second step calculates u' and v' from XYZ:

$$u' = \frac{4X}{X + 15Y + 3Z} \quad (21.6)$$

$$v' = \frac{9Y}{X + 15Y + 3Z} \quad (21.7)$$

We can now see what happens when we add $\Delta G$ to the green component. The first step will then become $$\begin{bmatrix} X_2 \\ Y_2 \\ Z_2 \end{bmatrix} = T \begin{bmatrix} R \\ G + \Delta G \\ B \end{bmatrix} = \\ T \begin{bmatrix} R \\ G \\ B \end{bmatrix} + T \begin{bmatrix} 0 \\ \Delta G \\ 0 \end{bmatrix} = \begin{bmatrix} X \\ Y \\ Z \end{bmatrix} + T \begin{bmatrix} 0 \\ \Delta G \\ 0 \end{bmatrix} = \begin{bmatrix} X \\ Y \\ Z \end{bmatrix} + \begin{bmatrix} t_{12} \\ t_{22} \\ t_{32} \end{bmatrix} \Delta G. \quad (21.8)$$

This means that the new u'-coordinate $u'_2$, which is the result of adding $\Delta G$ to RGB, will become $$u'_2 = \frac{4X_2}{X_2 + 15Y_2 + 3Z_2}. \quad (21.9)$$

Now, if we insert (21.8) into (21.9) and use $\Delta u' = u'_2 - u'$ we get $$u' + \Delta u' = \frac{4(X + t_{12}\Delta G)}{(X + t_{12}\Delta G) + 15(Y + t_{22}\Delta G) + 3(Z + t_{32}\Delta G)}. \quad (21.10)$$

Now gathering all terms containing $\Delta G$ in both the nominator and the denominator we get $$u' + \Delta u' = \frac{4X + 4t_{12}\Delta G}{(X + 15Y + 3Z) + (t_{12} + 15t_{22} + +3t_{32})\Delta G}. \quad (21.11)$$

or $$u' + \Delta u' = \frac{4X + 4t_{12}\Delta G}{D + (t_{12} + 15t_{22} + +3t_{32})\Delta G}. \quad (21.12)$$

where D=X+15Y+3Z, i.e., the denominator of (21.6). Also note that $t_{12}+15t_{22}++3t_{32}$ is a constant, so we can replace it with $K_2$. Multiplying both sides with the denominator gives $$(u'+\Delta u')(D+K_2\Delta G)=4X+4t_{12}\Delta G. \quad (21.13)$$

Gathering terms gives $$(u'+\Delta u')K_2\Delta G - 4t_{12}\Delta G = 4X - (u'+\Delta u')D \quad (21.14)$$

which is equivalent to $$[(u'+\Delta u')K_2 - 4t_{12}]\Delta G = 4X - (u'+\Delta u')D. \quad (21.15)$$

We can now solve for $\Delta G$:

$$\Delta G = \frac{4X - (u' + \Delta u')D}{(u' + \Delta u')K_2 - 4t_{12}}. \quad (21.16)$$

If we want to find the allowed values of $\Delta G$ that will still keep the u' coordinate within the range [u'-$\Delta$u', u'+$\Delta$u'], we can simply calculate the two values $\Delta G_1$ and $\Delta G_2$:

$$\Delta G_1 = \frac{4X - (u' - \Delta u')D}{(u' - \Delta u')K_2 - 4t_{12}} \text{ and} \quad (21.17)$$

$$\Delta G_2 = \frac{4X - (u' + \Delta u')D}{(u' + \Delta u')K_2 - 4t_{12}}. \quad (21.18)$$

The smallest allowed $\Delta G$ is now $\Delta G\text{min}_{u'}=\min\{\Delta G_1, \Delta G_2\}$, and the largest allowed $\Delta G$ is $\Delta G\text{max}_{u'}=\max\{\Delta G_1, \Delta G_2\}$. This means that if we have a color (R, G2, B) where G2 belongs to the interval [G+$\Delta G$min$_{u'}$, G+$\Delta G$max$_{u'}$], then the color (R, G2, B) will have a u' coordinate that differs from the u' coordinate of the original pixel with less than $\Delta u'$.

In the same way, we can start with Equation (21.7) and calculate how far we can move the green component when we subtract and add $\Delta v'$ from v':

$$\Delta G_3 = \frac{9Y - (v' - \Delta v')D}{(v' - \Delta u')K_2 - 9t_{22}} \text{ and} \quad (21.18b)$$

$$\Delta G_4 = \frac{9Y - (v' - \Delta u')D}{(v' + \Delta v')K_2 - 9t_{22}}. \quad (21.18c)$$

Analogously with the case for u', we can now calculate the lowest and highest value for green as determined by the v' variables:

$$\Delta G\min_{v'}=\min\{\Delta G_3, \Delta G_4\}, \text{ and} \quad (21.19)$$

$$\Delta G\max_{v'}=\max\{\Delta G_3, \Delta G_4\}. \quad (21.20)$$

The correct value for Gmin is now $$G\min = G + \max\{\Delta G\min_u, \Delta G\min_v\}, \quad (21.21)$$

$$G\max = G + \min\{\Delta G\max_u, \Delta G\max_v\}. \quad (21.22)$$

We can also find an analytical way of calculating the largest difference in the green component that is allowed while keeping the error in tfi_inv(Y)*1023 smaller than a certain threshold. Assume we have an original color (R, G, B), and we want to know how much we can change this in the green component before it becomes too different to be regarded to be an equivalent color by the human visual system. Let us call the new color $(R_1, G_1, B_1) = (R, G+\Delta G, B)$. The luminance for the original color is $$Y = w_R R + w_G G + w_B B, \quad (21.23)$$

and hence the tfi_inv(Y) for the original equals $$tf^{-1}(Y) = tf^{-1}(w_R R + w_G G + w_B B). \quad (21.24)$$

Likewise, the tf_inv(Y) for the changed color becomes $$tf^{-1}(Y_1) = tf^{-1}(w_R R + w_G (G+\Delta G) + w_B B). \quad (21.25)$$

The constraint in Equation (19) is that $1023|tf^{-1}(Y) - tf^{-1}(Y_1)| < \phi$. We can change the order inside the absolute value $|\cdot|$ giving $1023|tf^{-1}(Y_1) - tf^{-1}(Y)| < \phi$. If we first consider positive values of $\Delta G$, we know that $Y_1$ must be larger than $Y$ and since $tf^{-1}(\cdot)$ is monotonously increasing this means that $tf^{-1}(Y_1)$ is larger than $tf^{-1}(Y)$ and we can remove the absolute value. Replacing $\phi$ with $\phi_2 = \phi/1023$ we can rewrite the condition as $$tf^{-1}(Y_1) - tf^{-1}(Y) < \phi_2. \quad (21.26)$$

We are interested in the place where we are exactly on the border of this condition, so we are more interested in the equality than in the inequality. This can be written $$tf^{-1}(Y_1) = tf^{-1}(Y) + \phi_2. \quad (21.27)$$

Taking $tf(\cdot)$ of both sides gives $$Y_1 = tf(tf^{-1}(Y) + \phi_2), \quad (21.28)$$

which equals $$w_R R + w_G (G+\Delta G) + w_B B = tf(tf^{-1}(Y) + \phi_2), \quad (21.29)$$

which can be written as $$w_G \Delta G = tf(tf^{-1}(Y) + \phi_2) - w_R R - w_G G - w_B B \quad (21.30)$$

and we can therefore solve for $\Delta G$:

$$\Delta G\max_Y = \frac{tf(tf^{-1}(Y) + \phi_2) - Y}{w_G}. \quad (21.31)$$

In the last step we have taken advantage of the fact that $w_R R + w_G G + w_B B = Y$. A similar formula can be derived when $\Delta G$ is negative:

$$\Delta G\min_Y = \frac{tf(tf^{-1}(Y) - \phi_2) - Y}{w_G}. \quad (21.32)$$

We can now change Equations (21.21) and (21.22) to also take these values into consideration:

$$G\min = G + \max\{\Delta G\min_u, \Delta G\min_v, \Delta G\min_Y\}, \text{ and} \quad (21.33)$$

$$G\max = G + \min\{\Delta G\max_u, \Delta G\max_v, \Delta G\max_Y\}. \quad (21.34)$$

This way we have implemented the similarity measure described in Equation (19) rather than the one in Equation (20.1).

After having determined Gmin and Gmax for every pixel in the image, the second step takes place. Here we make the green component in a pixel more similar to its neighbors. Assume that G(x,y) is the linear value of the pixel at position (x,y) in the image. We can then find a smoothed value of G by taking the average of all its 9-neighbors, i.e., its 8-neighbors including itself:

$$G\text{ smooth}(x,y) = (G(x-1,y-1) + G(x-1,y) + G(x-1,y+1) + G(x,y-1) + G(x,y) + G(x,y+1) + G(x+1,y-1) + G(x+1,y) + G(x+1,y+1))/9; \quad (22)$$

Alternative ways of averaging are also possible. One can use a filter that only takes in the neighbors directly above or below using $$G\text{ smooth}(x,y) = (G(x-1,y) + G(x,y-1) + G(x,y) + G(x,y+1) + G(x+1,y))/5. \quad (22.1)$$

It is also possible to have a larger area covering more pixels, for instance a 5×5 area instead of a 3×3 area as in Equation (22):

$$G\text{ smooth}(x,y) = (G(x-2,y-2) + G(x-2,y-1) + G(x-2,y) + G(x-2,y+1) + G(x-2,y+2) + G(x-1,y-2) + G(x-1,y) + G(x-1,y+2) + G(x,y-2) + G(x,y-1) + G(x,y) + G(x,y+1) + G(x,y+2) + G(x+1,y-2) + G(x+1,y-1) + G(x+1,y+1) + G(x+1,y+2) + G(x+2,y-2) + G(x+2,y-1) + G(x+2,y) + G(x+2,y+1) + G(x+2,y+2))/25.$$

It is also possible to have different weights in front of each term, such as $w1*G(x-2, y-2) + w2*G(x-2, y-2) + \ldots$ and divide by the sum of the weights $(w1+w2+ \ldots)$ instead of dividing by 25.

Another possibility is to use bilateral filtering of the values. In that case it may make sense to only use the neighbors directly above or below to keep complexity down.

After having obtained a smoothed value $G_{smooth}(x,y)$ for the green component, it is possible that using this new, smoothed value could change the pixel so much that it is no longer equivalent with the previous pixel, as seen by a human observer. However, we also know that if we make sure to set it to a value in the interval [Gmin(x,y), Gmax(x,y)] we are certain that we will not change it to a non-equivalent color. Therefore, instead of setting G(x,y)=Gsmooth(x,y), we set it to $$G(x,y) = \text{clamp}(G\text{ smooth}(x,y), G\min(x,y), G\max(x,y)), \quad (23)$$

where clamp (x,a,b) sets the value to a if x<a and to b if x>b and x otherwise.

In this manner we can be sure that we never change the color (R, G, B) of a pixel to something that is different enough to be seen.

However, since all the green values have changed, it is now possible that another round of smoothing will provide a new value. Hence we once again do $$G\text{ smooth}(x,y) = (G(x-1,y-1) + G(x-1,y) + G(x-1,y+1) + G(x,y-1) + G(x,y) + G(x,y+1) + G(x+1,y-1) + G(x+1,y) + G(x+1,y+1))/9; \quad (24)$$

followed by $$G(x,y) = \text{clamp}(G\text{ smooth}(x,y), G\min(x,y), G\max(x,y)); \quad (25)$$

It is now possible to continue doing averaging followed by clamping until convergence, i.e., until G(x,y) does not change between iterations. Another possibility is to continue until the biggest change in G(x,y) is smaller than a threshold value $\theta$, such as $\theta=0.00005$. It is also possible to continue until the biggest change in tf_inv(G(x,y)) is smaller than another threshold value $\varphi$, such as $\varphi=1/(940-64)$. In an embodiment we continue until the biggest change in G(x,y) is smaller than 0.00005 or until 10000 iterations have happened.

Note that Gmin(x,y) and Gmax(x,y) for a pixel is not updated during the iterations. This means that we can be sure that whatever number of iterations we do, the result will be a pixel that is indistinguishable from the original pixel.

Figure 11:
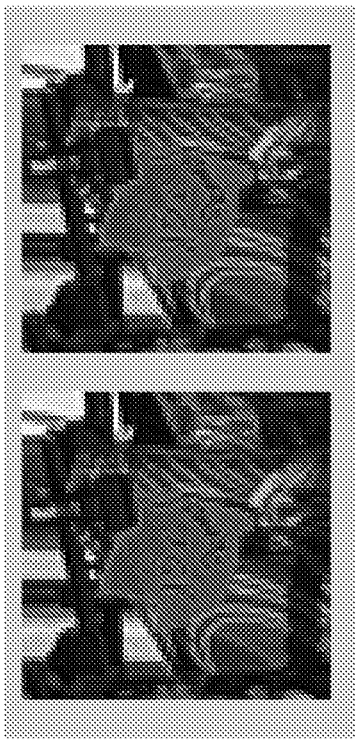
FIG. 11 illustrates two consecutive frames in a video sequence.

An example is shown in FIG. 11, which depicts two consecutive frames from a sequence. They are quite similar to each other, so one would assume it should be simple to use one frame to predict the other.

Figure 12:
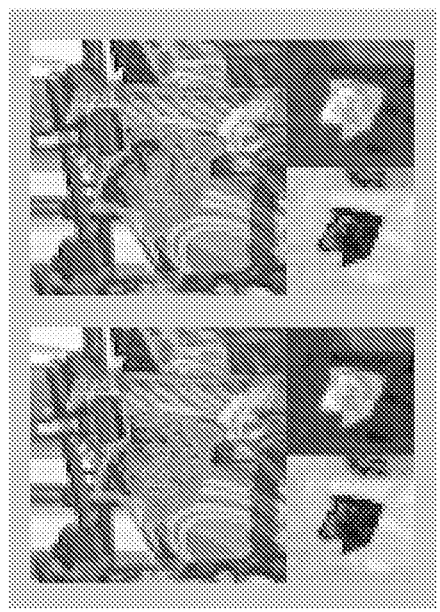
FIG. 12 illustrates a Y'CbCr 4:2:0 shot of detail of two consecutive frames.

However, their Y'CbCr representations are quite different, as is shown in FIG. 12. The top row shows the luma (Y') samples of the uncompressed material, and the bottom row shows the downsampled Cb and Cr samples. As can be seen in the top part of the price tag in the middle, there is a dark area that is very different between the two frames, and it is very possible that the prediction will fail between the two. Furthermore, the changes in the black area are very sharp, meaning it will cost a lot of bits to describe. It is this big variability in luma and chroma that gives the luminance artifacts that are adjusted for with luma adjustment.

If we apply luma adjustment (see [4]) on the luma component, the luma will become less random. This is shown in FIG. 13.

Figure 13:
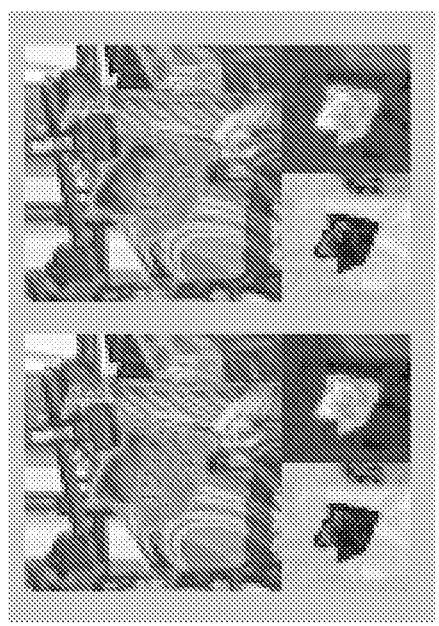
FIG. 13 illustrates a Y'CbCr 4:2:0 shot of detail of two consecutive frames after luma adjustment.

As can be seen in FIG. 13, the luma is smoother but still very different between the two frames. Furthermore, the chroma is unchanged by the luma adjustment process and is still very different between frames, making prediction difficult.

Figure 14:
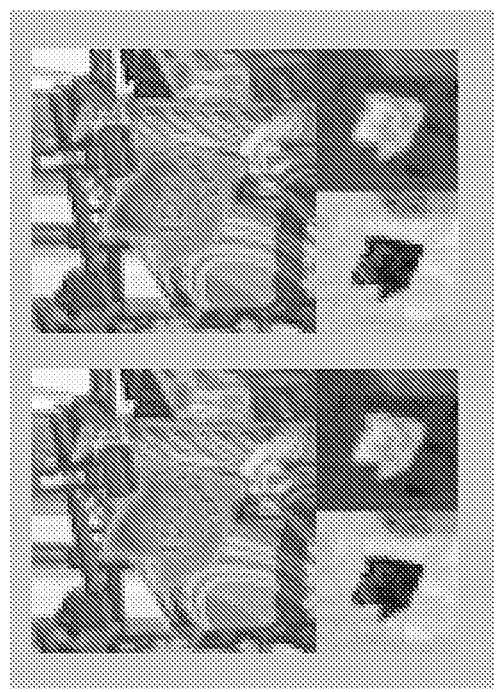
FIG. 14 illustrates a Y'CbCr 4:2:0 shot of detail of two consecutive frames after one iteration of chroma adjustment on a green color component, according to an embodiment of the present invention.

In FIG. 14 we show the result of applying the embodiment above where we have corrected the green component only, and used the similarity measure as described in Equation 19 with $\phi=0.5$. Only one iteration is performed.

As can be seen in the figure, the dark area at the top of the price tag is much smoother. This will make it easier to encode the content in an I-frame. Also, since the dark areas in the two frames have become smoother, they have also become much more similar to each other. This means that it will be easier to predict between them. Also the chroma components are less sharp and more similar to each other.

Figure 15:
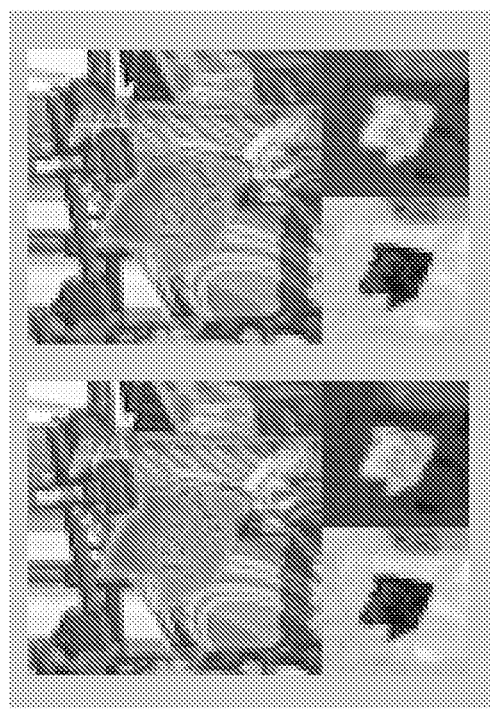
FIG. 15 illustrates a Y'CbCr 4:2:0 shot of detail of two consecutive frames after about twenty iterations of chroma adjustment on a green color component, according to an embodiment of the present invention.

If we continue iterating until the largest difference in linear green (G) is smaller than 0.00005, which will take 21 iterations in the left image and 22 iterations in the right image, we arrive at FIG. 15.

As can be seen in FIG. 15, the components are now very similar to each other and therefore easy to predict. Also, the change in the area that was previously black is now smooth and therefore simpler to compress in the I-frame. Note also that the chroma signals are very similar to each other.

The similarity measure from Equation 19 that we used guarantees that the image after processing is indistinguishable from the original if only the parameter $\phi$ is set to be small enough. However, in some circumstances it may be beneficial to allow some distortion of the color, and get an even smoother output after conversion to Y'CbCr. If the bit rate can go down substantially with a higher value for $\phi$, it may be worth it even if the color is somewhat distorted.

Figure 16:
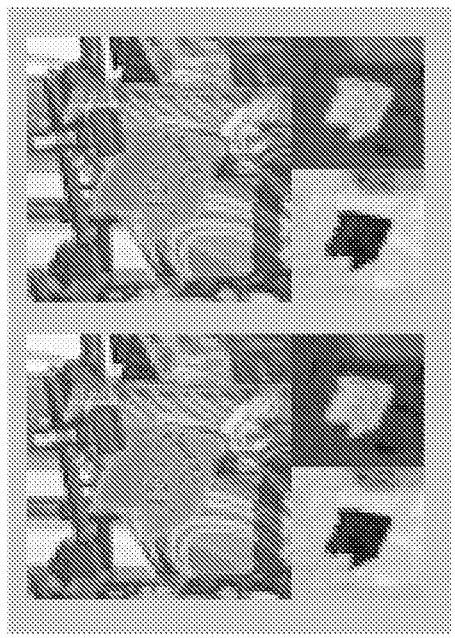
FIG. 16 illustrates a Y'CbCr 4:2:0 shot of detail of two consecutive frames after using Equation 20 and setting $\phi$ to 2.0.

One example is shown in FIG. 16, where we have used the definition of sm{ } from Equation 20, and a value for $\phi$ of $\phi=2.0$. As can be seen the interior of the price tag is even smoother and more similar to the other frame.

Figure 17:
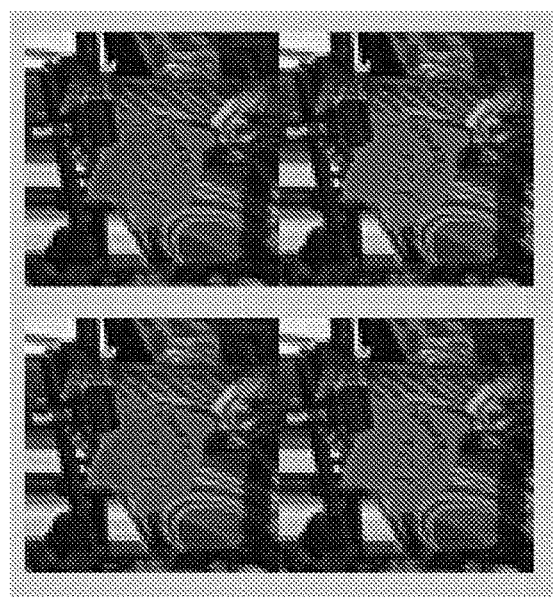
FIG. 17 shows an original image (top row) and the 4:4:4 image after processing, according to an embodiment of the present invention.

To see that we have indeed not changed the picture, see FIG. 17. On the top row, we have the original 444 images. On the bottom row, we have the 444 images after the processing. As can be seen in the figure, it is very difficult to see any difference whatsoever between the two frames, yet their Y'CbCr representations are very different; the top row produces difficult-to-compress Y'CbCr values, whereas the bottom row produces easy-to-compress Y'CbCr values.

One problem with using a larger $\phi$ value such as 2.0 is that the luminance may become compromised. This can be seen as a smoothing effect making the texture of the image appear less sharp. One way to avoid this can be to use a smaller multiplier than 1023 in the similarity measure in Equation (19) or (20). However, it may be faster to use the similarity measure from Equation (20.1) not involving the luminance than a similarity measure such as Equation (19), since this means that we do not need to calculate the bounds $Gmin_Y$ and $Gmax_Y$ at all. This may mean that we get luminance smoothing. However, we can compensate for this error in luminance after having performed the chroma adjustment steps. As an example it is possible to do the following:

1. Starting with the original RGB image "origRGB" in 4:4:4, calculate Gmin and Gmax for every pixel using the similarity measure in Equation (20.1).

2. Do a number of smoothing iterations (as few as one iteration). This will produce a new RGB image in 4:4:4 which we can call "CAgRGB" since it has been undergoing chroma adjustment on the green component.

3. The new image CAgRGB now has a chrominance that matches the one in the original image but the luminance may have become too smooth. We can now lift the luminance from the original. To do so we obtain the original luminance by converting origRGB to XYZ using $$\begin{bmatrix} X \\ Y \\ Z \end{bmatrix} = T \begin{bmatrix} R \\ G \\ B \end{bmatrix}.$$

In practice we are only interested in the luminance Y so the X and Z components do not need to be calculated. We also convert the image CAgRGB to XYZ using $$\begin{bmatrix} X_2 \\ Y_2 \\ Z_2 \end{bmatrix} = T \begin{bmatrix} R_2 \\ G_2 \\ B_2 \end{bmatrix}$$

for every pixel $(R_2, G_2, B_2)$ in CAgRGB and then further from $X_2Y_2Z_2$ to $x_2y_2$ using $$x_2 = \frac{X_2}{X_2 + Y_2 + Z_2} \text{ and}$$

$$y_2 = \frac{Y_2}{X_2 + Y_2 + Z_2}.$$

The $x_2$ and $y_2$ now contains the chromaticity information of CAgRGB and $Y_2$ the luminance. We now replace the luminance $Y_2$ with the luminance of the original pixel Y and convert back to RGB:

$$X_3 = \frac{Y}{y_2} x_2$$

$$Y_3 = Y$$

$$Z_3 = \frac{Y}{y_2}(1 - x_2 - y_2)$$

The pixel $(X_3 Y_3 Z_3)$ is then converted back to RGB using $$\begin{bmatrix} R_3 \\ G_3 \\ B_3 \end{bmatrix} = T^{-1} \begin{bmatrix} X_3 \\ Y_3 \\ Z_3 \end{bmatrix}.$$

The resulting pixels $(R_3 G_3 B_3)$ now constitute a picture which will effectively have the same smooth chrominance as the CAgRGB image, but the correct luminance. We can therefore call this image CAgRGB_corrY.

In practice it is most often the case that we will need to subsample the image to 4:2:2 or 4:2:0. In those cases we will often anyway perform luma adjustment as part of that conversion. Since luma adjustment has the ability to change the luminance in each pixel to any value we can put back the luminance at that stage instead. Therefore, instead of doing step 3 above, we can replace it with this alternative step or complement step 3 with step 3b:

3b. The new image CAgRGB is in 4:4:4. If we denote a pixel in CAgRGB with $(R_2, G_2, B_2)$, we first convert it to $(R_2', G_2', B_2')$ using $$R_2' = tf^{-1}(R_2)$$

$$G_2' = tf^{-1}(G_2)$$

$$B_2' = tf^{-1}(B_2)$$

We then convert from $(R_2', G_2', B_2')$ to Y'CbCr using $$\begin{bmatrix} Y_2' \\ Cb_2 \\ Cr_2 \end{bmatrix} = A \begin{bmatrix} R_2' \\ G_2' \\ B_2' \end{bmatrix},$$

where A is a transformation matrix that depends on what color space we are using. We then subsample the Cb and Cr components to half resolution. After that, we again upsample the Cb and Cr components so that we get one Cb value per pixel, and one Cr value per pixel. Since they would likely be different from $Cb_2$ and $Cr_2$, we call them $\widehat{Cb}_2$ and $\widehat{Cr}_2$.

Ordinary luma adjustment would then find the Y' that would bring back the same luminance that CAgRGB had, i.e., it would find $\hat{Y}'$=luma_adjustment($Y_2$, $\widehat{Cb}_2$, $\widehat{Cr}_2$) where $Y_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

However, we can instead use the luminance Y of the original image origRGB, obtained using $$\begin{bmatrix} X \\ Y \\ Z \end{bmatrix} = T \begin{bmatrix} R \\ G \\ B \end{bmatrix},$$

i.e., $\hat{Y}'$=luma_adjustment(Y, $\widehat{Cb}_2$, $\widehat{Cr}_2$).

This step would therefore avoid the computations needed for luminance transfer in step 3 above. Additionally, we avoid the possibility that the luminance transfer would lessen the effect of chroma adjustment, resulting in worse subsampled Cb and Cr values.

In yet another embodiment we may want to make the Cb and Cr channels even smoother. It is then possible to apply a smoothing filter after subsampling to Cb and Cr in step 3b above. Alternatively, and likely better, would be to use a different subsampling filter that is more lowpass, i.e., attenuates higher frequencies more. As an example, we have noticed that when moving from a subsampling filter of the form $\{1, 6, 1\}/8$ to $\{1, 2, 1\}4$ we get a better result in terms of reduction of luminance artifacts.

Instead of smoothing the Cb and Cr channels it is possible to do smoothing on the $(R_2, G_2, B_2)$ samples instead. Since the luminance is anyway transferred back, either using step 3 or step 3b, it is only the chrominance that will be smoothed; the luminance will stay intact.

In a preferred embodiment a different form of subsampling is used to obtain Cb and Cr. This type of subsampling is described in AJUSTC [10], but is differently used here since we are not putting back the luminance of the image, but rather the luminance of the original. Instead of step 3 or step 3b above, we instead use step 3c:

3c. The new image CAgRGB is in 4:4:4. If we denote a pixel in CAgRGB with $(R_2, G_2, B_2)$, we downsample each component in both the x- and y-dimension (if we want to go to 4:2:2, only one dimension is downsampled), preferably using a $\{1, 2, 1\}/4$ filter. The downsampling happens in the linear domain. We call the downsampled values $(R_3, G_3, B_3)$. We then convert these downsampled values to the nonlinear domain resulting in $(R_3', G_3', B_3')$ using $$R_3' = tf^{-1}(R_3)$$

$$G_3' = tf^{-1}(G_3)$$

$$B_3' = tf^{-1}(B_3)$$

We then convert from $(R_3', G_3', B_3')$ to Y'CbCr using $$\begin{bmatrix} Y_3' \\ Cb_3 \\ Cr_3 \end{bmatrix} = A \begin{bmatrix} R_3' \\ G_3' \\ B_3' \end{bmatrix},$$

where A is a transformation matrix that depends on what color space we are using. We then upsample the Cb and Cr components to the original resolution. We call the upsampled values $\widehat{Cb}_3$ and $\widehat{Cr}_3$.

Ordinary AJUSTC treatment [10] would then find the Y' that would bring back the same luminance that CAgRGB had, i.e., it would find $\hat{Y}$=luma_adjustment($Y_2$, $\widehat{Cb}_3$, $\widehat{Cr}_3$) where $Y_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

However, we can instead use the luminance Y of the original image origRGB, obtained using $$\begin{bmatrix} X \\ Y \\ Z \end{bmatrix} = T \begin{bmatrix} R \\ G \\ B \end{bmatrix},$$

i.e., $\hat{Y}'$=luma_adjustment(Y, $\widehat{Cb}_3$, $\widehat{Cr}_3$).

The processing as proposed in step 3c here will result in superior chrominance. Other ways of converting to Y'CbCr will sometimes have a propensity to make the colors overly saturated. This is due to the fact that dark colors will have an disproportionate effect on the subsampled values. With the method in 3c this is avoided, and the result is a better color reproduction. Also in the 3c case it is possible to smooth the image a bit to further soften the chroma channels. This can be done by convoluting the (R2, G2, B2) samples with a low pass filter such as {1 6 1}/8 or {1, 2, 1}/4 before the subsampling. Alternatively, it can be done as part of the subsampling (when going from (R2, G2, B2) to (R3, G3, B3)) by using a stronger low-pass filter than usual, for instance {1, 12, 38, 12, 1}/64 or {1, 4, 6, 4, 1}/16 or even {1, 2, 1}/4 rather than {1, 6, 1}/8. Alternatively, it can be done after the subsampling.

In this document the example images have been obtained using step 3c and a subsampling filter of {1, 2, 1}/4.

In another embodiment of the invention it is possible to have different values of $\phi$ for different pixels. The reason for this is that for a pixel with a very saturated color, it may be more difficult to see color shifts. Furthermore, it is pixels with saturated colors that experience the greatest problems with the variability seen in FIG. 12. Therefore, it may be a good idea to allow for a larger $\phi$ for those pixels. At the same time, for a completely white or gray pixel, i.e., a completely desaturated pixel, even a slight shift in chrominance towards, e.g., cyan or pink can be clearly visible. Therefore, it may be a good idea to use a smaller $\phi$ for those pixels.

One way can be to set the $\phi$ parameter automatically based on the original color of the pixel. First, the chromaticity u' v' is calculated for the pixel. Then the distance to the white point (u'=0.1978 v'=0.4683) is calculated as $$d = \sqrt{(u' - 0.1978)^2 + (v' - 0.4683)^2}.$$

Using Equation 19, we can now set the parameter $\phi$ using the value d:

If d=0, we use $\phi$=0.25. If d>0.3112, we use $\phi$=2. If we have a value of d between 0 and 0.3112, we may use $$\phi = \frac{d}{0.3112} 1.75 + 0.25. \quad (26)$$

This way, if we are on the edge of the color gamut, we will be far from the white point, and get a value close to 2. However, if we are close to the white point, d will be small and we will get a $\phi$ of 0.25. As an example, the blue primary is right on the gamut edge. It has coordinates u'=0.1754, v'=0.1579, and will therefore get $$d = \sqrt{(0.1755 - 0.1978)^2 + (0.1579 - 0.4683)^2} = 0.3112,$$

and it will therefore get $\phi$=2. The white point itself on the other hand has d=0 and gets $\phi$=0.25. It may also be possible to take the luminance of the pixel into account. For instance, it may be desirable to have a larger value of $\phi$ for dark colors, since it may anyway be difficult to see color shifts in dark colors, whereas it may be desirable to have a smaller value of $\phi$ for bright colors.

In another embodiment we base the value of it, not only on the color of pixel itself but also on the color of surrounding pixels. As an example, if the green (or blue, or red) component in the local area surrounding the pixel is very noisy, we may choose a larger value of $\phi$, whereas if the surrounding is very flat, we may choose a very small value of $\phi$. This way it is possible to preserve very saturated colors if the particular channel is very noise free, such as in the case of synthetically produced images.

One example could be to measure the variance in the green component G, or in another component such as R or B. If the variance is very low, a smaller value of $\phi$ is chosen. If the variance is very high, a larger value of $\phi$ is chosen. In another embodiment we look at the variance in $G'=tf^{-1}(G)$. We can also look the variance of the smallest component of R, G and B.

As an example, assume that for a certain pixel the green component is the smallest of R, G and B. We then measure the variance in the 3×3 or 5×5 neighborhood of the pixel. If we do it in the linear domain, a variance of 0.002 may be considered to be a small value, and a variance of 1000 may be considered to be a large value. Hence we may use a value of $\phi$ of $$\phi = \frac{\text{var}\{G\}}{(1000 - 0.02)} 1.95 + 0.05 \quad (26.1)$$

if the var{G} is between 0.02 and 1000. If the variance is smaller than 0.02, we use $\phi$=0.05, and if the variance is larger than 1000, we use $\phi$=2.0.

It we instead measure the variance on the primed coordinates, we could use a value for $\phi$ of $$\phi = \frac{\text{var}\{G'\}}{(0.02 - 0.0002)} 1.95 + 0.05. \quad (26.2)$$

if var{G'} is between 0.0002 and 0.02. If the variance is smaller than 0.0002, we can use $\phi$=0.05, and if the variance is larger than 0.02, we can use $\phi$=2.0. There are of course other ways to map the variance to the value $\phi$. For instance, it may be better to look at the standard deviation rather than the variance, or use an activity measure other than variance, or use other constants and cutoff values.

It is also possible to base $\phi$ both on the activity in surrounding pixels and on the chromaticity/luminance of the pixel. For instance, we could use $\phi=k\phi_c\phi_s$, where $\phi_c$ is the value obtained from the chromaticity analysis and $\phi_s$ is the value obtained from the analysis of the activity in the local surrounding of the pixel, and k is a constant.

In another embodiment we may want to correct more than one component. As an example, we may want to correct both the blue and the green channel. It is then possible to first do a correction in green, and then another correction in blue. One may then take the output of the green correction process and use it as the input to the blue correction process. One way is to use the output of the green correction process as a "new original" that is corrected using the blue correction process. The limits B min(x,y) and B max(x,y) can be calculated from this "new original". Alternatively, they can be calculated from the original image.

Let [Gmin, Gmax]=findGminAndGmax(image1, image2 phiG) be a function that finds for each pixel how much one can vary G in image2 before image2 is different from image1. In other words, for pixel (x,y), Gmin(x,y) will be the smallest value of Gm so that $$sm\{[R1(x,y),G1(x,y),B1(x,y)],[R2(x,y)Gm,B2(x,y)]\} \text{ is smaller than } phiG(x,y), \quad (27)$$

where R1(x,y) is the red component of pixel (x,y) in image1, G1(x,y) is the green component of pixel (x,y) in image1, and B1(x,y) is the blue component of pixel (x,y) in image1. Likewise, R2(x,y) is the red component of pixel (x,y) in image2, and B2(x,y) is the blue component of pixel (x,y) in image2. Similarly, Gmax(x,y) will be the largest value of Gm so that $$sm\{[R1(x,y),G1(x,y),B1(x,y)],[R2(x,y)Gm,B2(x,y)]\} \text{ is smaller than } phiG(x,y). \quad (28)$$

Furthermore, let doIterationsAndClampingGreen(image1, Gmin, Gmax) be a function that creates a new value $G_{smooth}$ for the green channel using some filtering, clamps this value using clamp (Gsmooth, Gmin, Gmax) and iterates until convergence. Here Gmin and Gmax are defined for every pixel in the image. Let doIterationsAndClampingBlue(image1, B min, B max) do the same for the blue channel, etc. We can now write different embodiments expressed using these functions:

One Embodiment:

```
origRGB; // this is the original image
[Gmin, Gmax] = findGminAndGmax(origRGB, origRGB, phiG);
CAgRGB = doIterationsAndClampingGreen(origRGB, Gmin, Gmax);
[Bmin, Bmax] = findBminAndBmax(CAgRGB, CAgRGB, phiB);
CAgbRGB = doIterationsAndClampingBlue(CAgRGB, Bmin, Bmax);
```

Note that even if it is not possible for the human eye to distinguish between the original origRGB and the output of the green correcting process CAgRGB, and it is not possible to distinguish between the output of the green correcting process CAgRGB and the output of the blue correcting process CAgbRGB, it may be possible that the error between origRGB and CAgbRGB is big enough to be discernable. Therefore one may use a value of φ that is so small that cumulative changes are not visible. For instance, it may be possible to set the φ value in the green process (phiG in the pseudo code above) to 0.25 and the φ value in the blue process (phiG in the pseudo code above) to 0.25. This means that the worst case is that the similarity measure between origRGB and CAgbRGB is smaller than 0.5: sm[origRGB, CAgbRGB]<sm[orig(RGB), CAgRGB]+sm[CAgRGB, CAgbRGB]<0.25+0.25=0.5, where the first inequality is due to the triangle inequality.

In an alternative embodiment we don't simply take the output from the previous step as input to the next step. Instead we always compare against the original image origRGB when calculating the bounds Gmin and Gmax:

```
origRGB; // this is the original image
[Gmin, Gmax] = findGminAndGmax(origRGB, origRGB, phiG);
CAgRGB = doIterationsAndClampingGreen(origRGB, Gmin, Gmax);
[Bmin, Bmax] = findBminAndBmax(origRGB, CAgRGB, phiB);
CAgbRGB = doIterationsAndClampingBlue(CAgRGB, Bmin, Bmax);
```

Note that in some circumstances it may be the case that we cannot change the second component B at all. As an example, consider the diagram in FIGS. 18A and 18B.

Figures 18A, 18B:
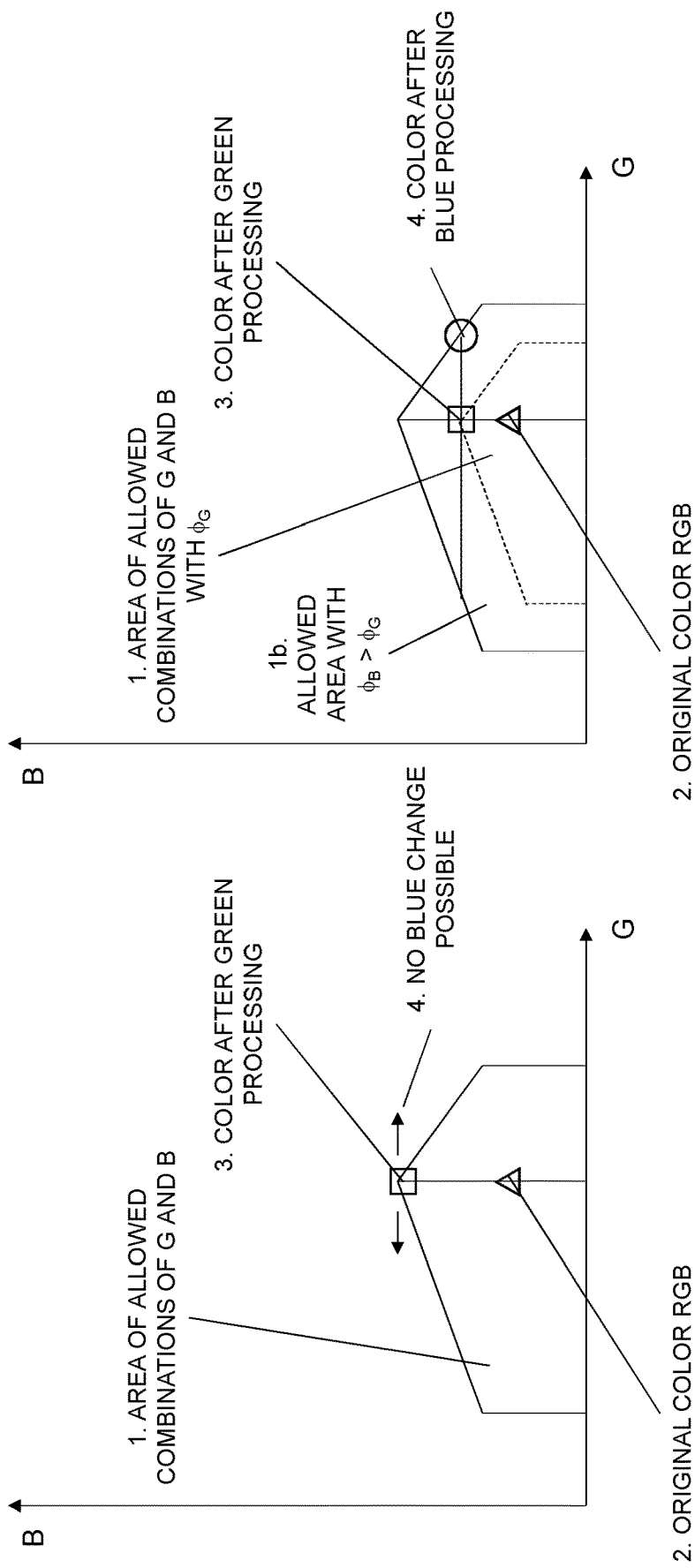
FIG. 18A illustrates how processing with the same value of $\phi$ may restrict the processing for one of the colors.
FIG. 18B shows how using a smaller $\phi$ in the first processing (green in this case) makes it possible to also allow changes in the second color channel (blue in this case)

In the diagram in FIG. 18A we have plotted the green component of a pixel on the x-coordinate axis and the blue component of the same pixel on the y-coordinate. If we use a certain value of φ, say φ=0.5, and plot all the values Gtry, Btry for which the similarity measure $$sm\{[R,G,B],[R,G \text{ try},B \text{ try}]\}<\phi \quad (29)$$

where R, G, and B are the original color components of the pixel, we get the region (1) shown in the left part of the figure. The original color R, G, B is marked with a triangle (2) in the middle of this region. Now if we correct the green component so to make it more similar to its neighbors, it may end up on the border of this region, as marked with a square (3). If we now want to change the blue component, we cannot move it at all without going outside the allowed area, as shown (4).

This can be solved by having different values of φ for the two stages. This is shown in the diagram of FIG. 18B. Here we use a smaller value $\phi_g$ for the first correction. This means that the allowed area is smaller, as marked with the dotted line in the diagram (1). Now, the green processing can only move the color to the edge of this area, and if it lands on the edge it may end up as marked with the square (3). Now if we use a larger value $\phi_b$ for the second correction, we can see that we can change the blue component so that the pixel ends up at the circle (4). It is hence possible to change both the green and the blue coordinate if $\phi_g<\phi_b$.

In yet another embodiment we may want to correct all three components R, G and B. For example, we can use the embodiment

```
origRGB; // this is the original image
[Gmin, Gmax] = findGminAndGmax(origRGB, origRGB, phiG);
CAgRGB = doIterationsAndClampingGreen(origRGB, Gmin, Gmax);
[Bmin, Bmax] = findBminAndBmax(origRGB, CAgRGB, phiB);
CAgbRGB = doIterationsAndClampingBlue(CAgRGB, Bmin, Bmax);
[Rmin, Rmax] = findRminAndRmax(origRGB, CAgbRGB, phiR);
CAgbrRGB = doIterationsAndClampingRed(CAgbRGB, Rmin, Rmax);
```

Again, it may be desirable to use phiR>phiB>phiG.

The order to do the processing can of course change. It may be desirable to have the most troublesome component either first or last. If it is first, one may be sure to have at least some room for maneuver, since we have not already moved the pixel away from its original position. On the other hand, it may also be desirable to have it last, if the φ of the last correcting stage is sufficiently larger than the φ or the first and second correcting stage. It may also be desirable to have it in the middle.

Likewise, when processing all three color components using the embodiment where we simply use the output of the previous stage as a new original, one may set all three φ values to 0.5/3.

Above we have iterated until our convergence criterion is fulfilled in doIterationsAndClampingX on the first color component before proceeding to the next color component. However, in another embodiment we only iterate one step, as illustrated by the following pseudo code:

```
origRGB; // this is the original image
bestSoFarRGB = origRGB;
notConverted = 1;
while notConverted
    [Gmin, Gmax = findGminAndGmax(origRGB, bestSoFarRGB, phiG);
    CAgRGB = doOneIterationAndClampGreen(bestSoFarRGB, Gmin, Gmax);
    [Bmin, Bmax] = findBminAndBmax(origRGB, CAgRGB, phiB);
    CAgbRGB = doOneIterationAndClampBlue(CAgRGB, Bmin, Bmax);
    [Rmin, Rmax] = findRminAndRmax(origRGB, CAgbRGB, phiR);
    CAgbrRGB = doOneIterationAndClampRed(CAgbRGB, Rmin, Rmax);
```

-continued

```
if( difference(bestSoFarRGB, CAgbrRGB) < threshold )
   notConverted = 0;
end;
bestSoFarRGB = CAgbrRGB
end;
```

In this case, we first change G, then B, then R and then G again etc. until convergence. This may make it less important which color component is processed first, since they are intertwined. It may also be advantageous to change phiG, phiB and phiR over time. In one embodiment they start being quite small and slowly grows. However, if speedy convergence is of interest it may be desirable to instead lower them gradually.

Analytic expressions for the similarity function when one of the colors is not the original In the above example we have used the function [Gmin, Gmax]=findGminAndGmaxGreen(RGB, $R_2G_2B_2$, phiG) to find out the allowed interval for $G_2$=[Gmin, Gmax], i.e., which values of green can we use without becoming too different from RGB. However, we have above only provided example implementations for the case when $R_2G_2B_2$=RGB.

Thankfully we can arrive at an analytic solution even for the general case when $R_2G_2B_2 \neq$ RGB, for example for the case when the similarity function is equal to Equation (20.1).

We want to solve the problem of what values of green $G_2$ will make the color $(R_2, G_2, B_2)$ similar enough to the original color $(R, G, B)$ in the sense that its $u_2'$ coordinate will not differ from that of the original $u'$ with more than $\Delta u'$, and its $v_2'$ coordinate will not differ from that of the original $v'$ with more than $\Delta v'$. Starting with the $u'$ coordinate, we can write the color $(R_2, G_2, B_2)$ as the original color $(R, G, B)$ plus a difference $(\delta R, \delta G, \delta B)$:

$$(R_2, G_2, B_2) = (R, G, B) + (\delta R, \delta G, \delta B). \tag{30}$$

We can convert the original color $(R, G, B)$ to XYZ using $$\begin{bmatrix} X \\ Y \\ Z \end{bmatrix} = T \begin{bmatrix} R \\ G \\ B \end{bmatrix}, \tag{30.1}$$

and the original $u'$ coordinate is thus $$u' = \frac{4X}{X + 15Y + 3Z}. \tag{31}$$

Likewise, the $u'$ coordinate for the color $(R_2, G_2, B_2)$, which we call $u'_2$, can be written as $u'_2 = u' + \Delta u$, and can be calculated using $$u'_2 = u' + \Delta u = \frac{4X_2}{X_2 + 15Y_2 + 3Z_2}. \tag{32}$$

Here $$\begin{bmatrix} X_2 \\ Y_2 \\ Z_2 \end{bmatrix} = T \begin{bmatrix} R_2 \\ G_2 \\ B_2 \end{bmatrix} = T \left( \begin{bmatrix} R \\ G \\ B \end{bmatrix} + \begin{bmatrix} \delta R \\ \delta G \\ \delta B \end{bmatrix} \right) = T \begin{bmatrix} R \\ G \\ B \end{bmatrix} + \tag{33}$$

$$T \begin{bmatrix} \delta R \\ \delta G \\ \delta B \end{bmatrix} = \begin{bmatrix} X \\ Y \\ Z \end{bmatrix} + T \begin{bmatrix} \delta R \\ \delta G \\ \delta B \end{bmatrix} = \begin{bmatrix} X + t_{11}\delta R + t_{12}\delta G + t_{13}\delta B \\ Y + t_{21}\delta R + t_{22}\delta G + t_{23}\delta B \\ Z + t_{31}\delta R + t_{32}\delta G + t_{33}\delta B \end{bmatrix}.$$

Hence we can write rewrite Equation (32) as $$u' + \Delta u = \tag{34}$$

$$\frac{4(X + t_{11}\delta R + t_{12}\delta G + t_{13}\delta B)}{X + t_{11}\delta R + t_{12}\delta G + t_{13}\delta B + 15(Y + t_{21}\delta R + t_{22} + \delta G + t_{23}\delta B) + 3(Z + t_{31}\delta R + t_{32}\delta G + t_{33}\delta B)}$$

which equals $$u' + \Delta u = \frac{4X + 4t_{11}\delta R + 4t_{12}\Delta G + 4t_{13}\delta B}{X + 15Y + 3Z + (t_{11} + 15t_{21} + 3t_{31})\delta R + (t_{12} + 15t_{22} + 3t_{32})\delta G + (t_{13} + 15t_{23} + 3t_{33})\delta B}. \tag{35}$$

Now if we set $$K_1 = t_{11} + 15t_{21} + 3t_{31} = [1\ 15\ 3]T\begin{bmatrix} 1 \\ 0 \\ 0 \end{bmatrix},$$

$$K_2 = t_{12} + 15t_{22} + 3t_{32} = [1\ 15\ 3]T\begin{bmatrix} 0 \\ 1 \\ 0 \end{bmatrix}$$

as previously, $$K_2 = t_{13} + 15t_{23} + 3t_{33} = [1\ 15\ 3]T\begin{bmatrix} 0 \\ 0 \\ 1 \end{bmatrix} \text{ and } D = X + 15Y = 3Z$$

as previously, we get $$u' + \Delta u = \frac{4X + 4t_{11}\delta R + 4t_{12}\delta G + 4t_{13}\delta B}{D + K_1\delta R + K_2\delta G + K_3\delta B}. \tag{36}$$

It is now possible to solve for $\delta G$, giving $$\delta G = \frac{4(X + t_{11}\delta R + t_{13}\delta B) - (u' + \Delta u')(D + K_1\delta R - K_3\delta B)}{(u' + \Delta u')K_2 - 4t_{12}}. \tag{37}$$

Note that this is a generalization of the formula in Equation (21.16), where $\delta R = \delta B = 0$ and $\delta G = \Delta G$. Just as in that special case, we can find the allowed values of green by calculating $\delta G$ for a positive and a negative deviation from $u'$:

$$\delta G_1 = \frac{4(X + t_{11}\delta R + t_{13}\delta B) - (u' - \Delta u')(D + K_1\delta R - K_3\delta B)}{(u' + \Delta u')K_2 - 4t_{12}} \tag{38}$$

-continued $$\delta G_2 = \frac{4(X + t_{11}\delta R + t_{13}\delta B) - (u' + \Delta u')(D + K_1\delta R - K_3\delta B)}{(u' + \Delta u')K_2 - 4t_{12}} \quad (39)$$

The value $$G\,min_{u'} = G + \min\{\delta G_1, \delta G_2\} \quad (39.1)$$

is now the smallest value of green that will make the u' coordinate in the allowed range, and $$G\,max_{u'} = G + \max\{\delta G_1, \delta G_2\} \quad (39.2)$$

is the largest value of green that will make the u' coordinate land in the allowed range. We can now do the same derivation for the v' component, and calculate $$\delta G_3 = \frac{9(X + t_{21}\delta R + t_{23}\delta B) - (v' - \Delta v')(D + K_1\delta R - K_3\delta B)}{(v' - \Delta v')K_2 - 9t_{22}} \quad (40)$$

$$\delta G_4 = \frac{9(X + t_{21}\delta R + t_{23}\delta B) - (v' + \Delta v')(D + K_1\delta R - K_3\delta B)}{(v' + \Delta v')K_2 - 9t_{22}} \quad (41)$$

The value $$G\,min_{v'} = G + \min\{\delta G_3, \delta G_4\} \quad (41.1)$$

is now the smallest value of green that will make the v' coordinate in the allowed range, and $$G\,max_{v'} = G + \max\{\delta G_3, \delta G_4\} \quad (41.2)$$

is the largest value of green that will make the v' coordinate land in the allowed range. When calculating Gmin and Gmax we must take the most conservative value, hence $$G\,min = \max\{G\,min_{u'}, G\,min_{v'}\},\ \text{and} \quad (42)$$

$$G\,max = \min\{G\,max_{u'}, G\,max_{v'}\}. \quad (43)$$

Note that in the simpler case of Equation (21.16) where $\delta R = \delta B = 0$, we were guaranteed that there would be at least one value that would satisfy both u' and v', namely the value $\delta G = 0$. In that case $(R_2, G_2, B_2)$ equals $(R, G, B)$ which makes their u' and v' coordinates the same. However, in the general case it is not certain that it is possible to find a solution. This can be the case if the color $(R_2, G_2, B_2)$ is already outside the similarity zone of $(R, G, B)$, and changing G may not always make it possible to reach the zone. In these cases one may therefore end up with the situation that the constraint from u' demands green to be higher than, say 10, but the constraint from v' demands the green to be lower than 8. This will result in a Gmin that is higher than Gmax, a negative interval.

Figure 19:
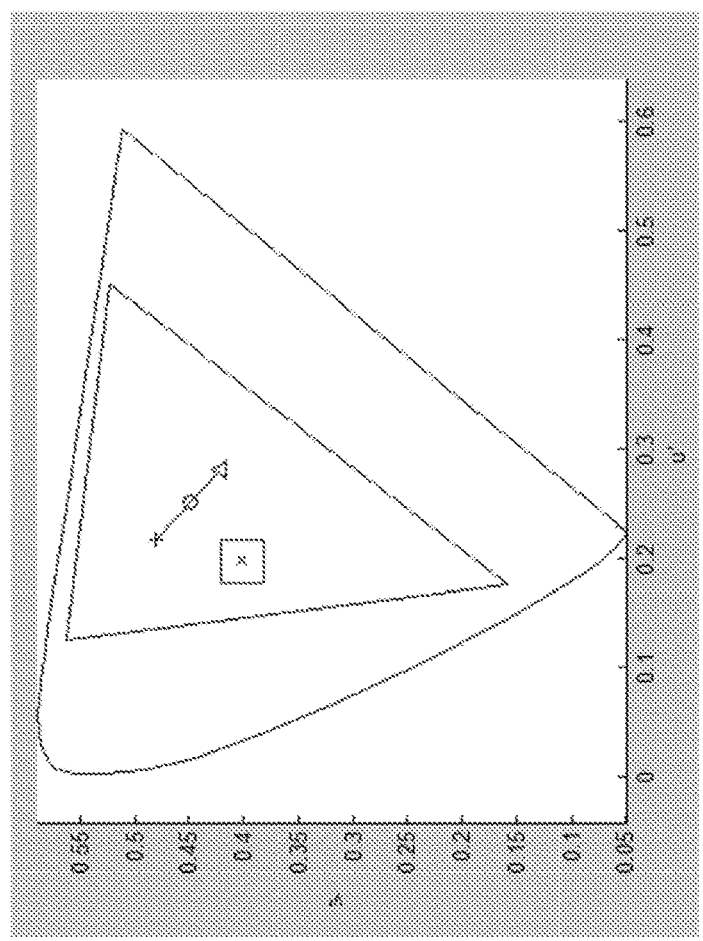
FIG. 19 shows how, if the colors (the cross and the circle) are too different from each other, there may be no way to set the green component so that the circle comes into the allowed range marked by the box. Adding green, i.e., moving towards the plus, makes the u' coordinate better, but worsens the v' coordinate, and vice versa.

Such a situation is shown in FIG. 19. In this case the original color RGB=(10, 9, 21) in BT.709. This gives the u'v' coordinates u'=0.197 v'=0.401, which is marked with a cross in the diagram. Assume we are OK to deviate 8/410 in either direction from u' and v', that means that any color within the box surrounding the cross is going to be regarded to be similar. This is typically a much higher tolerance that would be realistic but is used here for illustrational purposes.

Now assume we have (R2, G2, B2)=(19, 7 12). This will generate u'v' coordinates of u'=0.251 v'=0.448, marked with a circle in the diagram.

Now, by adding green to this second color, we can make its u' coordinate smaller. If we set the green component to 13.61, we will get a u' coordinate that is just in the accepted range. This color is marked with the plus in the figure. However, this moves us in the wrong direction with respect to the v' coordinate. Similarly, we can get the v' coordinate to the accepted range by setting the green component to 3.64. This color is marked with a triangle in the figure. However, that makes the u' coordinate move in the wrong direction. There is no value of green that satisfy both u' and v', and the method would find the allowed range of green to be [13.61, 3.64], i.e., a negative interval that does not contain a single point.

Ideally such a situation should never occur, since we should always start with a value inside the allowed range (circle being inside the box), but if it does occur it may be a good idea to set the interval to a single value, for instance the current green color: [7.0, 7.0].

Thus, one way to implement findGminAndGmax(RGB, R2G2B2, phiG) is to perform the following steps:

Calculate $\delta R$ and $\delta B$ using $(\delta R, \delta G, \delta B) = (R2, G2, B2) - (R, G, B)$. The result for the green pixel is not needed.

Calculate (X Y Z) from RGB using Equation (30.1).

Calculate u' from (X,Y,Z) using Equation (21.6) and v' using Equation (21.7).

Set $\Delta u'$=phiG and calculate $\delta G_1$ and $\delta G_2$ using Equation (38) and (39).

Set $\Delta v'$=phiG and calculate $\delta G_3$ and $8G_4$ using Equation (38) and (39).

Calculate $Gmin_{u'}$ using Equation (39.1) and $Gmin_{u'}$ using Equation (39.2).

Calculate $Gmin_{v'}$ using Equation (41.1) and $Gmax_{v'}$ using Equation (41.2).

Calculate Gmin and Gmax using Equation (42) and (43). Now if Gmin≤Gmax, the interval is [Gmin, Gmax] and we return this. Otherwise we set Gmin=Gmax=$G_2$ and return this.

In the same way as we generalized the similarity measure for the chromaticity u'v', we can generalize the similarity measure for the luminance. Assume we want to find the limits for the green component of the color $(R_2, G_2, B_2)$ when compared to an original color $(R, G, B)$.

The tfi_inv(Y) for the original is again $$tf^{-1}(Y) = tf^{-1}(w_R R + w_G G + w_B B). \quad (43.1)$$

We can write $(R_2, G_2, B_2) = (R, G, B) + (\delta R, \delta G, \delta B)$. This means that we can write the tf_inv(Y) for the changed color as $$tf^{-1}(Y_2) = tf^{-1}(w_R(R+\delta R) + w_G(G+\delta G) + w_B(B+\delta B)), \quad (44)$$

which we can write as $$tf^{-1}(Y_2) = tf^{-1}(w_R(R+\delta R) + w_G G + w_B(B+\delta B) + w_G \delta G). \quad (44a)$$

We now introduce the helper variable $Y_h = w_R(R+\delta R) + w_G G + w_R(B+\delta B)$ which helps us rewrite the equation as $$tf^{-1}(Y_2) = tf^{-1}(Y_h + w_G \delta G). \quad (45)$$

The constraint in Equation (19) is that $1023|tf^{-1}(Y) - tf^{-1}(Y_2)| < \phi$. We can change the order inside the absolute value $|\cdot|$ giving $1023|tf^{-1}(Y_2) - tf^{-1}(Y)| < \phi$. If we first consider the case when $Y_h > Y$ and where $\delta G$ is positive, $Y_2$ must be larger than Y and since $tf^{-1}(\cdot)$ is monotonously increasing this means that $tf^{-1}(Y_2)$ is larger than $tf^{-1}(Y)$ and we can remove the absolute value. Replacing $\phi$ with $\phi_2 = \phi/1023$ we can rewrite the condition as $$tf^{-1}(Y_2) - tf^{-1}(Y) < \phi_2. \quad (46)$$

We are interested in the place where we are exactly on the border of this condition, so we are more interested in the equality than in the inequality. This can be written $$tf^{-1}(Y_2) = tf^{-1}(Y) + \phi_2. \quad (47)$$

Taking tf (·) of both sides gives $$Y_2 = tf(tf^{-1}(Y) + \phi_2), \qquad (48)$$

which equals $$Y_h + w_G \delta G = tf(tf^{-1})(Y) + \phi_2), \qquad (49)$$

which can be written as $$w_G \delta G = tf(tf^{-1}(Y) + \phi_2) - Y_h. \qquad (50)$$

We can therefore solve for $\delta G$:

$$\delta G max_{Y1} = \frac{tf(tf^{-1}(Y) + \phi_2) - Y_h}{w_G}. \qquad (51)$$

A similar formula can be derived when $Y_h < Y$ and when $\Delta G$ is negative:

$$\delta G min_Y = \frac{tf(tf^{-1}(Y) - \phi_2) - Y_h}{w_G}. \qquad (52)$$

The case when $Y_h < Y$ but at the same time $dG > 0$ is a bit trickier. Here it should be noted that since the helper luminance $Y_h = w_R(R + \delta R) + w_G G + w_B(B + \delta B) =$ is too low, increasing $\delta G$, i.e., moving $G_2$ away from the original value of the green channel $G$, actually helps making the luminances get closer. This is true up to the point where we have added a value of $\delta G$ that makes the luminances equal, namely where $Y_h + w_G \delta G = Y$. Let us call the value of $\delta G$ where this happens $\delta G_1$. We can thus calculate this value as $$\delta G_1 = \frac{Y - Y_h}{w_G}. \qquad (53)$$

For $\delta G = \delta G_1$ we thus get the luminance $Y$. For higher values of $\delta G$ we get a luminance of $Y + w_G(\delta G - \delta G_1)$. Setting $dG2 = dG - dG1$ we get a luminance of $Y + w_G \delta G_2$. We can thus reuse Equation (49) with $Y_h$ replaced by $Y$ and $\delta G$ replaced by $\delta G_2$. This means that we can write $$\delta G_2 = \frac{tf(tf^{-1}(Y) + \phi_2) - Y}{w_G}, \qquad (54)$$

and hence $$\delta G = \delta G_1 + \frac{tf(tf^{-1}(Y) + \phi_2) - Y}{w_G}. \qquad (55)$$

Thus if $Y_h < Y$, the way to calculate $\delta G max_{Y1}$ is $$\delta G = \frac{Y - Y_h}{w_G} + \frac{tf(tf^{-1}(Y) + \phi_2) - Y}{w_G}. \qquad (56)$$

But the observant reader notices that this can be rewritten as $$\delta G = \frac{tf(tf^{-1}(Y) + \phi_2) - Y_h}{w_G}. \qquad (57)$$

Therefore, no special care needs to be taken whether $Y_h < Y$ or not when calculating $\delta G max_{Y1}$. The same applies for $\delta G min_{Y1}$. We can therefore calculate $Gmin_Y$ and $Gmin_Y$ as $$Gmax_Y = G + \frac{tf(tf^{-1}(Y) + \phi_2) - Y_h}{w_G} \qquad (58)$$

$$Gmin_Y = G + \frac{tf(tf^{-1}(Y) - \phi_2) - Y_h}{w_G}. \qquad (59)$$

We can now change Equations (42) and (43) to also take these values into consideration:

$$G\,min = \max\{G\,min_u, G\,min_v, G\,min_Y\}, \text{ and} \qquad (60)$$

$$G\,max = \min\{G\,max_u, G\,max_v, G\,max_Y\}. \qquad (61)$$

Embodiment Operating in CIELUV u'v'

In another embodiment we do not do the processing in RGB. Instead, the processing is performed in u'v'-space. This has the advantage of making it unnecessary to calculate Gmin and Gmax, since u'min will always be the original u'-value for the pixel minus the tolerance of, say, 0.5/410, and u'max will always be the original u'-value for the pixel plus 0.5/410. Alternatively a smaller or bigger value can be used, and can be made dependent on, e.g., the color of the pixel and/or the activity of its surrounding.

Such an implementation is illustrated using the following pseudo code:

```
origRGB; // This is the original image in linear RGB
orig_up_vp_Y = convertFromRGBToupvpY(origRGB); // This is the original image in linear u'v'Y
orig_up_vp = orig_up_vp_Y(:,:,1:2); // This is only the chromaticity u' v' of the original
best_so_far_up_vp = orig_up_vp;
notConverted = 1;
while notConverted
   smoothed_up_vp = doSmothingr(best_so_far_up_vp);
   clamped_up_vp(:,:,)      =      clamp(smoothed_up_vp(:,:,1:2),       orig_up_vp(:,:,1:2)-α,
orig_up_vp(:,:,1:2)+α);
   if( difference(best_so_far_up_vp, clamped_up_vp) < threshold)
      notConverted = 0;
   end;
   best_so_far_up_vp = clamped_up_vp;
end;
copy_up_vp_Y(:,:,1:2) = best_so_far_up_vp;
copy_up_vp_Y(:,:,3) = orig_up_vp_Y(:,:,3);
copyRGB = convertFromupvpYtoRGB(copy_up_vp_Y);
```

Here we have used Matlab notation where origRGB(:,:,1) is the first (red) component of the image origRGB, origRGB(:,:,2) is the second (green) component etc. The function clamp (X,A,B) operates on u'v'-images, which means that the X(i,j,1) is the u' component of the pixel in position i,j, and X(i,j,2) is the v' component. C=clamp (X, A, B) returns a u' value u' C(i,j,1) in every position (i,j) that is the clamped value of X(i,j,1) against A(i,j,1) and B(i,j,1), and a v' value C(i,j,2) in every position (i,j) that is the clamped value of X(i,j,2) against A(i,j,2) and B(i,j,2).

Advantages with this solution is that no calculation of Gmin and Gmax is necessary, saving computational complexity. Also, we do not have to choose between processing, say, green first, blue second and, say, red last, and red first, green second and blue last. This is due to the fact that u' and v' are processed together. However, it is our experience that processing in u' v' in the manner described above will not always produce as perfectly smooth a result as when processing in RGB.

Figure 20B:
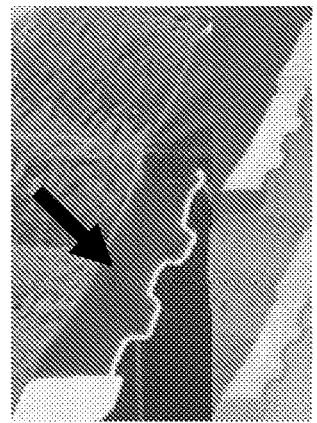
FIG. 20B shows Y' (top) and Cb and Cr (bottom) components with u'v' processing.
Figure 20A:
FIG. 20A shows Y' (top) and Cb and Cr (bottom) components with RGB processing.

As an example, see FIGS. 20A and 20B, where the picture in FIG. 20A, processed using RGB, provides a completely smooth surface on the side of the tent, whereas the picture in FIG. 20B, which shows the Y'CbCr that is the result of processing using uv, has some dark spots, such as the one marked with an arrow.

It should be noted, that if we can process the original image in a way so that when we convert it to YCbCr, subsample Cb and Cr and upsample Cb and Cr we get the same image back, then we are going to be having no luminance artifacts at all. The reason the luminance artifacts come up during subsampling is that they change the chroma so that it no longer fits with the luma. If we can come up with an image that doesn't change its chroma during subsampling and upsampling, the chroma cannot become out of synch with the luma.

Therefore, in an alternative embodiment, we perform the following steps:

1. We start with the original RGB image origRGB, which have samples (R, G, B).

2. We convert it to (R', G', B') using $$R' = tf^{-1}(R)$$

$$G' = tf^{-1}(G)$$

$$B' = tf^{-1}(B).$$

We then convert from (R', G', B') to Y'CbCr using $$\begin{bmatrix} Y' \\ Cb \\ Cr \end{bmatrix} = A \begin{bmatrix} R' \\ G' \\ B' \end{bmatrix},$$

where A is a transformation matrix that depends on what color space we are using. We then subsample the Cb and Cr components to half resolution. After that, we again upsample the Cb and Cr components so that we get one Cb value per pixel, and one Cr value per pixel. Since they would likely be different from Cb and Cr, we call them $\widetilde{Cb}$ and $\widetilde{Cr}$.

3. Note that both Cb, Cr as well as $\widetilde{Cb}$ and $\widetilde{Cr}$ are in full resolution. From $$\begin{bmatrix} Y' \\ Cb \\ Cr \end{bmatrix}$$

it is possible to go back to the original pixel color, but if we replace Cb and Cr with $\widetilde{Cb}$ and $\widetilde{Cr}$ we will get another pixel. What we now do is to see if replacing Cb and Cr will give a pixel that is similar enough to the original pixel, i.e., if the pixel $$\begin{bmatrix} Y' \\ \widetilde{Cb} \\ \widetilde{Cr} \end{bmatrix}$$

is so close to $$\begin{bmatrix} Y' \\ Cb \\ Cr \end{bmatrix}$$

so that a human observer would not be able to tell the difference. However, since we have change Cb and Cr, we may now have an erroneous luminance in the pixel. We must therefore first select a Y', which we denote $\hat{Y}'$, so that the pixel $$\begin{bmatrix} \hat{Y}' \\ \widetilde{Cb} \\ \widetilde{Cr} \end{bmatrix}$$

has the correct luminance. We can do that with luma adjustment as $\hat{Y}'$=luma_adjustment(Y, $\widetilde{Cb}$, $\widetilde{Cr}$), where Y is the original luminance obtained using $$\begin{bmatrix} X \\ Y \\ Z \end{bmatrix} = T \begin{bmatrix} R \\ G \\ B \end{bmatrix}.$$

Now, if the similarity measure determines that $$\begin{bmatrix} \hat{Y}' \\ \widetilde{Cb} \\ \widetilde{Cr} \end{bmatrix}$$

is sufficiently close to $$\begin{bmatrix} Y' \\ Cb \\ Cr \end{bmatrix},$$

we replace Y', Cb and Cr with $\widetilde{Cb}$, and $\widetilde{Cr}$. (Note that we may have to convert back to RGB to evaluate the similarity measure.) However, if the similarity measure determines that the colors are not similar, we try a value that lies halfway between Cb and $\widetilde{Cb}$:

$$\widetilde{Cb}_{k+1} = \frac{1}{2}(Cb + \widetilde{Cb}_k),$$

where $\widetilde{Cb}_1 = \widetilde{Cb}$. We do likewise for Cr, and recalculate Y' using luma adjustment. The new $$\begin{bmatrix} \hat{Y}'_{k+1} \\ \widetilde{Cb}_{k+1} \\ \widetilde{Cr}_{k+1} \end{bmatrix}$$

is again tried against $$\begin{bmatrix} Y' \\ Cb \\ Cr \end{bmatrix},$$

using the similarity measure. If it passes the test, we replace Y', Cb and Cr with $\widetilde{Cb}_{k+1}$ and $\widetilde{Cr}_{k+1}$. Otherwise we halve the distance again. After a fixed number of iterations, for instance 10, we give up and just use $$\begin{bmatrix} Y' \\ Cb \\ Cr \end{bmatrix}$$

for that pixel. But in many cases we have moved Cb and Cr closer to their subsampled and then upsampled variants.

4. We now subsample the new Y'CbCr image again and upsample it, creating new $\widetilde{Cb}$ and $\widetilde{Cr}$ values in every pixel. We now perform step 3 again. However, we always compare against the $$\begin{bmatrix} Y' \\ Cb \\ Cr \end{bmatrix} \text{-values}$$

obtained in step 2. We iterate until convergence or until we have executed step 3 a fixed number of steps, for instance 64 steps.

In yet an alternate embodiment, we do the same but perform the subsampling not in the Cb Cr domain but in the RGB domain:

1. We denote a pixel in the original image origRGB with $(R_2, G_2, B_2)$.

2. We then downsample each component in both the x- and y-dimension (if we want to go to 4:2:2, only one dimension is downsampled), preferrably using a $\{1, 2, 1\}/4$ filter. The downsampling happens in the linear domain. We call the downsampled values $(R_3, G_3, B_3)$. We then convert these downsampled values to the nonlinear domain resulting in $(R_3', G_3', B_3')$ using $$R_3' = tf^{-1}(R_3)$$

$$G_3' = tf^{-1}(G_3)$$

$$B_3' = tf^{-1}(B_3)$$

2. We then convert from $(R_3', G_3', B_3')$ to Y'CbCr using $$\begin{bmatrix} Y' \\ Cb_3 \\ Cr_3 \end{bmatrix} = A \begin{bmatrix} R_3' \\ G_3' \\ B_3' \end{bmatrix},$$

where A is a transformation matrix that depends on what color space we are using. We then upsample the $Cb_3$ and $Cr_3$ components to the original resolution. We call the upsampled values $\widetilde{Cb}$ and $\widetilde{Cr}$. We then find the Y' that brings back the same luminance that the origRGB image had, i.e., it we find $\hat{Y}'$=luma_adjustment($Y_2$, $\widetilde{Cb}$, $\widetilde{Cr}$) where $Y_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

We also calculate Y'CbCr the regular way, i.e., the same way as in step 2 in the previous section. This means we take the RGB of the original color, convert to R'G'B' and then to Y'CbCr. It is this Y'CbCr that will be used as a reference in the next step.

3. Note that both Cb, Cr as well as $\widetilde{Cb}$ and $\widetilde{Cr}$ are in full resolution. From $$\begin{bmatrix} Y' \\ Cb \\ Cr \end{bmatrix}$$

it is possible to go back to the original pixel color, but if we replace Cb and Cr with $\widetilde{Cb}$ and $\widetilde{Cr}$ we will get another pixel color. What we now do is to see if replacing Cb and Cr will give a pixel color that is similar enough to the original pixel, i.e., if the pixel color $$\begin{bmatrix} \hat{Y}' \\ \widetilde{Cb} \\ \widetilde{Cr} \end{bmatrix}$$

is so close to $$\begin{bmatrix} Y' \\ Cb \\ Cr \end{bmatrix}$$

so that a human observer would not be able to tell the difference. Now, if the similarity measure determines that $$\begin{bmatrix} \hat{Y}' \\ \widetilde{Cb} \\ \widetilde{Cr} \end{bmatrix}$$

is sufficiently close to $$\begin{bmatrix} Y' \\ Cb \\ Cr \end{bmatrix},$$

we replace Y', Cb and Cr with $\hat{Y}'$, $\widetilde{Cb}$ and $\widetilde{Cr}$. (Note that we may have to convert back to RGB to evaluate the similarity measure.) However, if the similarity measure determines that the colors are not similar, we try a Cb value that lies halfway between Cb and $\widetilde{Cb}$:

$$\widetilde{Cb}_{k+1} = \frac{1}{2}(Cb + \widetilde{Cb}_k),$$

where $\widetilde{Cb}_1 = \widetilde{Cb}$. We do likewise for Cr, and recalculate Y' using luma adjustment. The new $$\begin{bmatrix} \hat{Y}'_{k+1} \\ \widetilde{Cb}_{k+1} \\ \widetilde{Cr}_{k+1} \end{bmatrix}$$

is again tried against $$\begin{bmatrix} Y' \\ Cb \\ Cr \end{bmatrix},$$

using the similarity measure. If it passes the test, we replace Y', Cb and Cr with $\hat{Y}'_{k+1}$, $\widetilde{Cb}_{k+1}$ and $\widetilde{Cr}_{k+1}$. Otherwise we halve the distance again. After a fixed number of iterations, for instance 10, we give up and just use $$\begin{bmatrix} Y' \\ Cb \\ Cr \end{bmatrix}$$

for that pixel. But in many cases we have moved Cb and Cr closer to $\widetilde{Cb}$ and $\widetilde{Cr}$.

4. We now subsample the new Y'CbCr image again by converting back to linear RGB and subsampling the RGB values, converting to Y'CbCr and upsample the chroma, creating new $\widetilde{Cb}$ and $\widetilde{Cr}$ values in every pixel. We now perform step 3 again. However, we always compare against the $$\begin{bmatrix} Y' \\ Cb \\ Cr \end{bmatrix}$$

values obtained in step 2. We iterate until convergence or until we have executed step 3 a fixed number of steps, for instance 32 steps.

In another embodiment we use chroma adjustment followed by conversion to a color space other than non-constant luminance Y'CbCr. One example is constant-luminance YCbCr, as described in the MPEG contribution document m36256 [11], where it is denoted CL. Another example is ICtCp, as described in the MPEG contribution document m38148 [12].

In another embodiment it is possible to use xyY instead of u'v'Y in the similarity measure. For instance, it is possible to use a similarity measure between two colors RGB1 and RGB2 where both colors are converted to XYZ using $$\begin{bmatrix} X_1 \\ Y_1 \\ Z_1 \end{bmatrix} = T \begin{bmatrix} R_1 \\ G_1 \\ B_1 \end{bmatrix} \text{ and } \begin{bmatrix} X_2 \\ Y_2 \\ Z_2 \end{bmatrix} = T \begin{bmatrix} R_2 \\ G_2 \\ B_2 \end{bmatrix},$$

and x and y coordinates are calculated using $$x_1 = \frac{X_1}{X_1 + Y_1 + Z_1}, \text{ and } y_1 = \frac{Y_1}{X_1 + Y_1 + Z_1},$$

and ditto for $x_2$, $y_2$. The colors can now be deemed similar if $|x_2-x_1|<\phi_1$ and $|y_2-y_1|<\phi_2$ and $|tf\_inv(Y_2)-tf\_inv(Y_1)|<\phi_3$.

In another embodiment the threshold function f is additionally made dependent on the coding. One approach is to also make the threshold function dependent on the quantization parameter (QP) used for coding the transform coefficients of the intra and/or inter prediction error. The threshold can be larger when coarse quantization of transform coefficients is used and goes towards the visual perceptually threshold (threshold used in other embodiments) for very fine quantization. If relatively coarse quantization is used as part of the coding, the threshold can be more relaxed than if the quantization is very fine grained. This can be viewed as having the threshold function additively dependent on the quantization parameter as fnew=f+f(QP). f(QP) can be computed or looked up from a table. The values in the table can for example be constructed to relate the smallest change of a sample in the spatial domain for respective QP.

A further aspect of the embodiments relates to a device for processing a first pixel in a picture. The first pixel having a color that is represented in a first color space. The device is configured to obtain a lower limit of a first color component of the first pixel in the first color space based on a distance between the color and a first distorted version of the color in a second color space. The device is also configured to obtain an upper limit of the first color component of the first pixel in the first color space based on a distance between the color and a second distorted version of the color in the second color space. The device is further configured to obtain a filtered value of the first color component for the first pixel which is larger than or equal to the obtained lower limit and lower than or equal to the obtained upper limit.

In an embodiment, the device is configured to obtain the lower limit of the first color component of the first pixel in the first color space based on a distance between chromaticity values of the color and the first distorted version of the color in a luminance and chromaticity color space. The device is also configured to obtain the upper limit of the first color component of the first pixel in the first color space based on a distance between chromaticity values of the color and the second distorted version of the color in the luminance and chromaticity color space.

In an embodiment, the device is configured to obtain the lower limit of the first color component as a smallest value of the first color component that results in a perceptual similarity measure that is below a first threshold value. The perceptual similarity measure is based on the distance between the color and the first distorted version of the color in the second color space. The device is configured to obtain the upper limit of the first color component as a largest value of the first color component that results in a perceptual similarity measure that is below a second threshold value. The perceptual similarity measure is based on the distance between the color and the second distorted version of the color in the second color space.

In an embodiment, the device is configured to calculate at least one of the first threshold value and the second threshold value based on the color of the first pixel.

In an embodiment, the device is configured to obtain a lower limit of a green (red or blue) component of the first pixel in a red, green and blue color space based on the distance between the color and the first distorted version of the color in a luminance and chromaticity color space. The device is also configured to obtain an upper limit of the green (red or blue) component of the first pixel in the red, green and blue color space based on the distance between the color and the second distorted version of the color in the luminance and chromaticity color space. The device is further configured to obtain a filtered value of the green (red or blue) component for the first pixel which is larger than or equal to the obtained lower limit and lower than or equal to the obtained upper limit.

In an embodiment, the device is configured to calculate the lower limit of the green component as a maximum of $Gmin_{u'}$, $Gmin_{v'}$, and $Gmin_Y$. $Gmin_{u'}$ represents a smallest green component value that results in a change in a chromaticity component u' that is smaller than a u' threshold, $Gmin_{v'}$ represents a smallest green component value that results in a change in a chromaticity component v' that is smaller than a v' threshold and $Gmin_Y$ represents a smallest green component value that results in a change in a luminance component Y that is smaller than a Y threshold. The device is also configured to calculate the upper limit of the green component as a minimum of $Gmax_{u'}$, $Gmax_Y$ and $Gmax_{Y'}$. $Gmax_{u'}$ represents a largest green component value that results in a change in a chromaticity component u' that is smaller than the u' threshold, $Gmax_{v'}$ represents a largest green component value that results in a change in a chromaticity component v' that is smaller than the v' threshold and $Gmax_Y$ represents a largest green component value that results in a change in a luminance component Y that is smaller than the Y threshold.

In an embodiment, the device is configured to calculate $Gmin_{u'}=G+$minimum of $\delta G_1$ and $\delta G_2$. The device is also configured to calculate $Gmin_{v'}=G+$minimum of $\delta G_3$ and $\delta G_4$. The device is further configured to calculate $Gmin_Y=G+(tf(tf^{-1}(Y)-\phi_2)-Y_h)/w_G$. The device is further configured to calculate $Gmax_{u'}=G+$maximum of $\delta G_1$ and $\delta G_2$. The device is additionally configured to calculate $Gmax_{v'}=G+$maximum of $\delta G_3$ and $\delta G_4$. The device is also configured to calculate $Gmax_Y=G+(tf(tf^{-1}(Y)+\phi_2)-Y_h)/w_G$.

In an embodiment, the device is configured to calculate a filtered value of the first color component for the first pixel based on respective values of the first color component for the first pixel and neighboring pixels in the picture. The device is also configured to clamp the filtered value between the obtained lower limit and the obtained upper limit so that the filtered value is larger than or equal to the obtained lower limit and lower than or equal to the obtained upper limit.

In an embodiment, the device is configured to calculate the filtered value of the first color component for the first pixel as an average of respective values of the first color component for the pixel and neighboring pixels directly above, below, to the right and to the left of the first pixel in the picture.

In an embodiment, the device is configured to obtain, for each pixel of the first pixel and the neighboring pixels in the picture, a respective lower limit of the first color component in the first color space based on a respective distance between a respective color of the pixel and a respective first distorted version of the respective color in the second color space. The device is also configured to obtain, for each pixel of the first pixel and the neighboring pixels in the picture, a respective upper limit of the first color component in the first color space based on a respective distance between the respective color and a respective second distorted version of the respective color in the second color space. The device is further configured to calculate, for each pixel of the first pixel and the neighboring pixels in the picture, a respective filtered value of the first color component based on respective values of the first color component for the first pixel and the neighboring pixels in the picture. The device is additionally configured to clamp, for each pixel of the first pixel and the neighboring pixels in the picture, the respective filtered value between the respective obtained lower limit and the respective obtained upper limit so that the respective filtered value is larger than or equal to the respective obtained lower limit and lower than or equal to the respective obtained upper limit.

In an embodiment, the device is configured to repeat calculating the respective filtered value and clamping the respective filtered value for each pixel of the first pixel and the neighboring pixel using a respective clamped filtered value of the first color component from iteration n-1 of calculating the respective filtered value and clamping the respective filtered value as input to calculating the respective filtered value for iteration n of calculating the respective filtered value and clamping the respective filtered value until N iterations have been reached.

In an embodiment, the device is configured to calculate chroma or chromaticity component values for the first pixel based on a smoothed value of the color in the first color space equal to the color in the first color space but with a respective value of each color component in the color in the first color space replaced by a respective filtered value of the color component. The device is also configured to obtain a luminance corrected color based on the calculated chroma or chromaticity component values for the first pixel and a luminance component value obtained based on the color in the first color space.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 21:
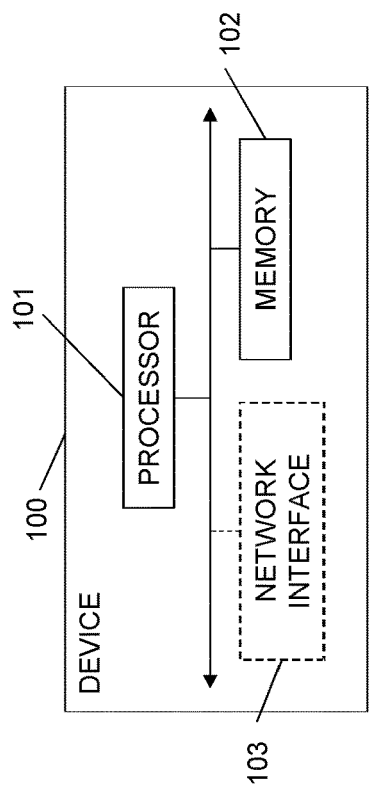
FIG. 21 is a schematic block diagram of a device for filtering according to an embodiment.

FIG. 21 is a schematic block diagram illustrating an example of a device 100 for processing a first pixel in a picture based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to obtain the lower limit of the first color component and to obtain the upper limit of the first color component. The processor 101 is also operative to obtain the filtered value of the first color component.

In another embodiment, FIG. 21 shows a device 100 for encoding a first pixel having a color in a first color space in a picture. The device 100 comprises a processor 101 and a memory 102 comprising instructions executable by the processor 101. The processor 101 is operative to obtain a lower limit of a first color component of the first pixel in the first color space based on a distance between the color and a first distorted version of the color in a second color space. The processor 101 is also operative to obtain an upper limit of the first color component of the first pixel in the first color space based on a distance between the color and a second distorted version of the color in the second color space. The processor 101 is further operative to obtain a filtered value of the first color component for the first pixel which is larger than or equal to the obtained lower limit and lower than or equal to the obtained upper limit. The processor 101 is additionally operative to calculate a luma component value and chroma component values for the first pixel based on a smoothed value of the color in the first color space comprising a value of the first color component in the color in the first color space replaced by the filtered value of the first color component. The processor 101 is also operative to encode the luma component value and subsampled chroma component values.

Optionally, the device 100 may also include a communication circuit, represented by a network interface 103 in FIG. 21. The network interface 103 may include functions for wired and/or wireless communication with other devices and/or network nodes in a wired or wireless communication network. In a particular example, the network interface 103 may be based on radio circuitry for communication with one or more other network devices or user equipment, including transmitting and/or receiving information. The network interface 103 may be interconnected to the processor 101 and/or memory 102. By way of example, the network interface 103 may include any of the following: a receiver, a transmitter, a transceiver, input/output (I/O) circuitry, input port(s) and/or output port(s).

Figure 22:
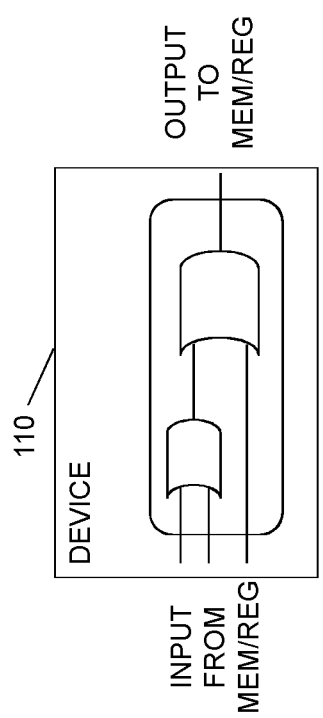
FIG. 22 is a schematic block diagram of a device for processing according to another embodiment.

FIG. 22 is a schematic block diagram illustrating another example of a device 110 for processing a first pixel in a picture based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 23:
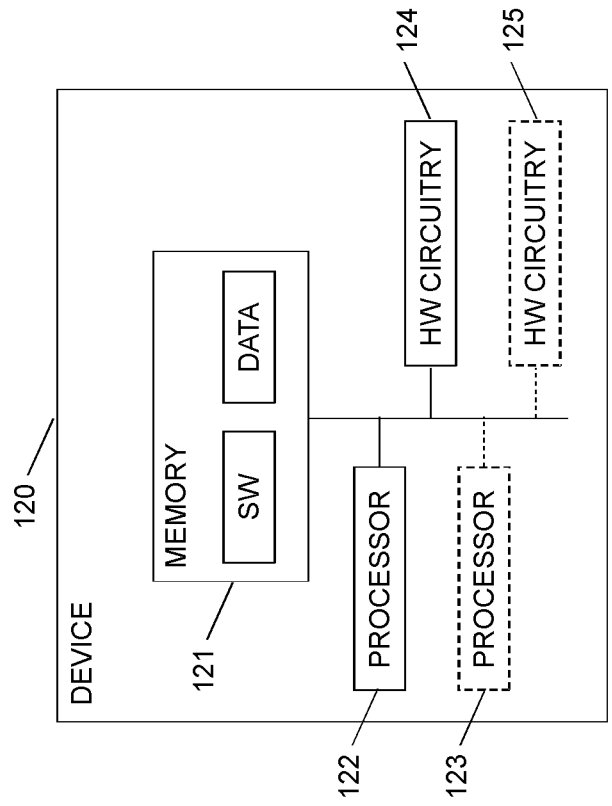
FIG. 23 is a schematic block diagram of a device for processing according to a further embodiment.

FIG. 23 is a schematic block diagram illustrating yet another example of a device 120 for processing a first pixel in a picture based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 24:
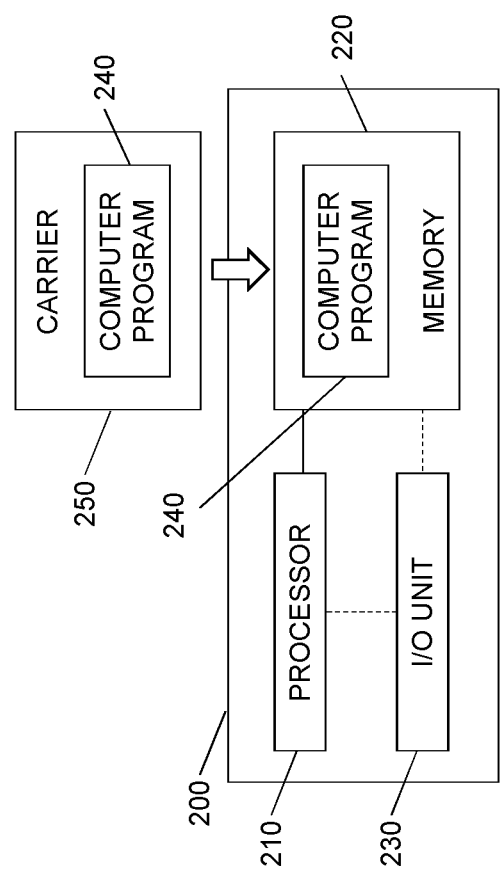
FIG. 24 is a schematic block diagram of a computer program based implementation of an embodiment.

FIG. 24 is a schematic diagram illustrating an example of a device 200 for processing a first pixel in a picture according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as reconstructed or decoded pictures of a video sequence.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to obtain a lower limit of a first color component of a first pixel in a first color space in a picture based on a distance between the color and a first distorted version of the color in a second color space. The at least one processor 210 is also caused to obtain an upper limit of the first color component of the first pixel in the first color space based on a distance between the color and a second distorted version of the color in the second color space. The at least one processor 210 is further caused to obtain a filtered value of the first color component for the first pixel which is larger than or equal to the obtained lower limit and lower than or equal to the obtained upper limit.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a deblocking filtering control device 200 for execution by the processing circuitry 210 thereof.

The flow diagram or diagrams presented herein may be regarded as a computer flow diagram or diagrams, when performed by one or more processors. A corresponding device for processing a first pixel in a picture may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 25:
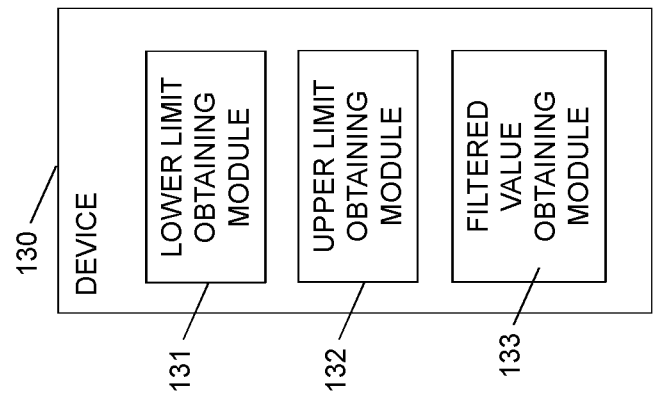
FIG. 25 is a schematic block diagram of a device for processing according to yet another embodiment.

FIG. 25 is a schematic block diagram of a device 130 for processing a first pixel in a picture according to yet another embodiment. The first pixel having a color that is represented in a first color space. The device 130 comprises a lower limit obtaining module 131 for obtaining a lower limit of a first color component of the first pixel in the first color space based on a distance between the color and a first distorted version of the color in a second color space. The device 130 also comprises an upper limit obtaining module 132 for obtaining an upper limit of the first color component of the first pixel in the first color space based on a distance between the color and a second distorted version of the color in the second color space. The device 130 further comprises a filtered value obtaining module 133 for obtaining a filtered value of the first color component for the first pixel which is larger than or equal to the obtained lower limit and lower than or equal to the obtained upper limit.

Figure 26:
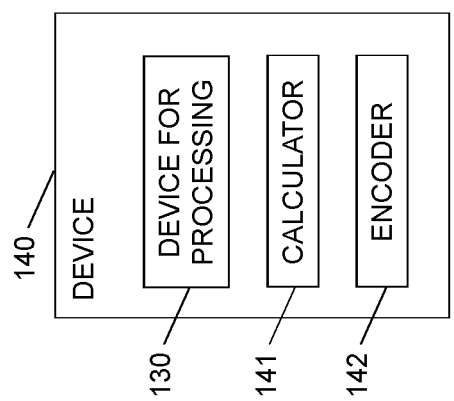
FIG. 26 is a schematic block diagram of a device for encoding according to an embodiment.

FIG. 26 is a schematic block diagram of a device 140 for encoding a first pixel having a color in a first color space in a picture according to an embodiment. The device 140 comprises a device 130 for processing the first pixel according to the embodiments to obtain a filtered value a first color component of the color in the first color space. The device 140 also comprises a calculator 141 for calculating a luma component value and chroma component values for the first pixel based on a smoothed value of the color in the first color space equal to the color in the first color space but with a value of the first color component in the color in the first color space replaced by the filtered value of the first color component. The device 140 further comprises an encoder 142 for encoding the luma component value and subsampled chroma component values.

Another aspect of the embodiments defines a processing device, for processing a first pixel in a picture. The first pixel having a color that is represented in a first color space. The processing device is configured to obtain a lower limit to a first color component of the first pixel in the first color space, based on a distance between the color and a distorted version of the color in a second color space, wherein the distorted version of the color is equal to the color in the first color space except in the first color component. The processing device is also configured to obtain an upper limit to the first color component of the first pixel in the first color space, based on a distance between the color and a distorted version of the color in the second color space, wherein the distorted version of the color is equal to the color in the first color space except in the first color component. The processing device is further configured to obtain a filtered value of the first color component for the pixel which is larger than or equal to the obtained lower limit and lower than or equal to the obtained upper limit.

Figure 27:
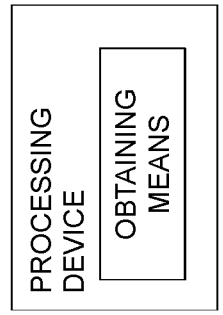
FIG. 27 illustrates a processing device according to embodiments of the present invention.

Another aspect of the embodiments defines a processing device for processing a first pixel in a picture, see FIG. 27. The first pixel having a color that is represented in a first color space. The processing device comprising an obtaining module for obtaining a lower limit to a first color component of the first pixel in the first color space, based on a distance between the color and a distorted version of the color in a second color space, wherein the distorted version of the color is equal to the color in the first color space except in the first color component. The obtaining module is also for obtaining an upper limit to the first color component of the first pixel in the first color space, based on a distance between the color and a distorted version of the color in the second color space, wherein the distorted version of the color is equal to the color in the first color space except in the first color component. The obtaining module is further for obtaining a filtered value of the first color component for the pixel which is larger than or equal to the obtained lower limit and lower than or equal to the obtained upper limit.

The processing device could also comprise an obtaining means configured to obtain a lower limit to a first color component of the first pixel in the first color space, based on a distance between the color and a distorted version of the color in a second color space, wherein the distorted version of the color is equal to the color in the first color space except in the first color component. The obtaining means is also configured to obtain an upper limit to the first color component of the first pixel in the first color space, based on a distance between the color and a distorted version of the color in the second color space, wherein the distorted version of the color is equal to the color in the first color space except in the first color component. The processing device is further configured to obtain a filtered value of the first color component for the pixel which is larger than or equal to the obtained lower limit and lower than or equal to the obtained upper limit.

The processing device may be implemented in a video encoder and a video decoder. It may be implemented in hardware, in software or a combination of hardware and software. The processing device may be implemented in, e.g. comprised in, user equipment, such as a mobile telephone, tablet, desktop, netbook, multimedia player, video streaming server, set-top box or computer.

Further, a data processing system, as illustrated in FIG. 21, can be used to implement the processing device. The data processing system includes at least one processor 101 that is further coupled to a network interface 103 via an interconnect. The at least one processor 101 is also coupled to a memory 102 via the interconnect. The memory 102 can be implemented by a hard disk drive, flash memory, or read-only memory and stores computer-readable instructions. The at least one processor 101 executes the computer-readable instructions and implements the functionality described above. The network interface 103 enables the data processing system to communicate with other nodes in a network. Alternative embodiments of the present invention may include additional components responsible for providing additional functionality, including any functionality described above and/or any functionality necessary to support the solution described herein.

A further aspect of the embodiments defines a computer program for a processing device comprising a computer program code which, when executed, causes the processing device to obtain a lower limit to a first color component of the first pixel in the first color space, based on a distance between the color and a distorted version of the color in a second color space, wherein the distorted version of the color is equal to the color in the first color space except in the first color component. The processing device is also caused to obtain an upper limit to the first color component of the first pixel in the first color space, based on a distance between the color and a distorted version of the color in the second color space, wherein the distorted version of the color is equal to the color in the first color space except in the first color component. The processing device is further caused to obtain a filtered value of the first color component for the pixel which is larger than or equal to the obtained lower limit and lower than or equal to the obtained upper limit.

A further aspect of the embodiments defines a computer program product comprising a computer program for a processing device and a computer readable means on which the computer program for a processing device is stored.

A further embodiment relates to a user equipment comprising a device for processing a first pixel in a picture or a device for encoding a first pixel having a color in a first color space in a picture according to the embodiments. In a particular embodiment, the user equipment is selected from a group consisting of a mobile telephone, a tablet, a desktop, a notebook, a multimedia player, a video streaming server, a set-top box and a computer.

The device for processing a first pixel in a picture and/or the device for encoding a first pixel having a color in a first color space in a picture according to the embodiments may alternatively be implemented in a network device or equipment being or belonging to a network node in a communication network. Such a network equipment may be a device for converting video according to one video coding standard to another video coding standard, i.e., transcoding. The network equipment can be in the form of or comprised in a radio base station, a Node-B or any other network node in a communication network, such as a radio-based network.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 28:
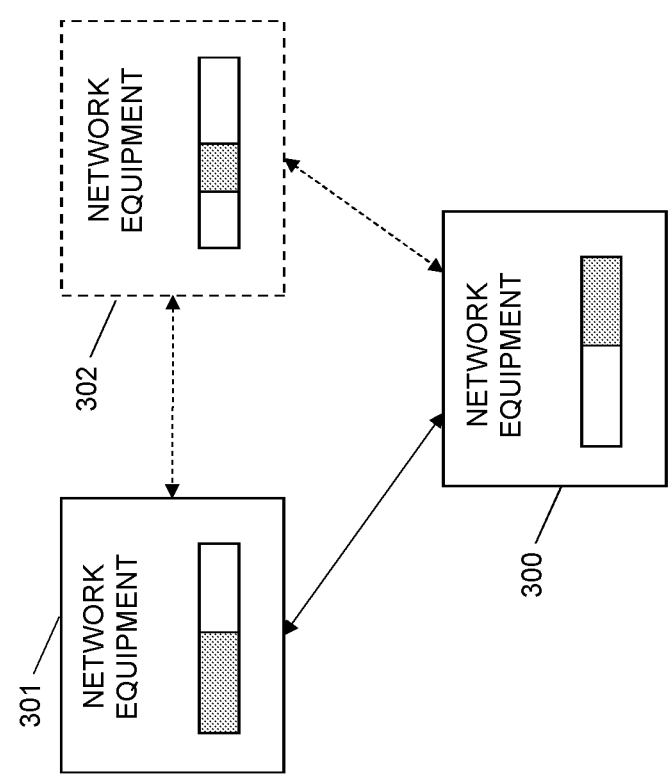
FIG. 28 a schematic diagram of a distributed implementation in network equipment according to an embodiment.

FIG. 28 is a schematic diagram illustrating an example of how functionality can be distributed or partitioned between different network equipment in a general case. In this example, there are at least two individual, but interconnected network equipment 300, 301, which may have different functionalities, or parts of the same functionality, partitioned between the network equipment 300, 301. There may be additional network devices 302 being part of such a distributed implementation. The network equipment 300, 301, 302 may be part of the same wireless or wired communication system, or one or more of the network devices may be so-called cloud-based network devices located outside of the wireless or wired communication system.

Figure 29:
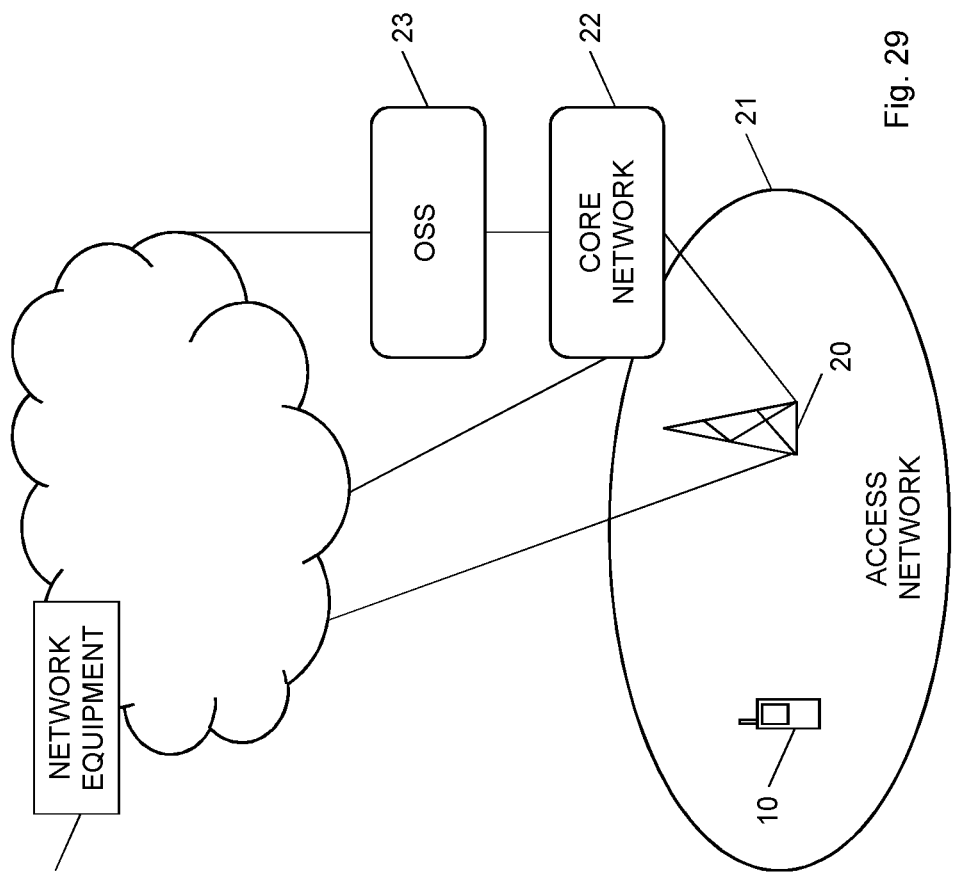
FIG. 29 is a schematic diagram of a wireless communication system according to an embodiment.

FIG. 29 is a schematic diagram illustrating an example of a wireless communication network or system, including an access network 21 and a core network 22 and optionally an operations and support system (OSS) 23 in cooperation with one or more cloud-based network equipment 300. The figure also illustrates a user equipment 10 connected to the access network 21 and capable of conducting wireless communication with a base station representing an embodiment of a network node 20.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] J. Ström, "Investigation of HDR Color Subsampling", ISO/IEC JTC1/SC29/WG11 MPEG2014/M35841, February 2015, Geneva, Switzerland
[2] Society of Motion Picture and Television Engineers (SMPTE) ST 2084:2014, High Dynamic Range Electro-Optical Transfer Function of Mastering Reference Displays
[3] CEA Standard, HDR Static Metadata Extensions, CEA-861.3, January 2015
[4] WO 2016/130066 A1
[5] ITU-R, Radiocommunication Sector of ITU, Recommendation ITU-R BT.1886, Reference electro-optical transfer function for flat panel displays used in HDTB studio production (March 2011)
[6] ITU-R, Radiocommunication Sector of ITU, Recommendation ITU-R BT.709-6, Parameter values for the HDTV standards for production and international programme exchange (June 2015)
[7] ITU-R, Radiocommunication Sector of ITU, Recommendation ITU-R BT.2020, Parameter values for ultra-high definition television systems for production and international programme exchange (August 2012)
[8] Society of Motion Picture and Television Engineers (SMPTE) EG 432-1:2010, Digital Source Processing—Color Processing For D-Cinema
[9] Society of Motion Picture and Television Engineers (SMPTE) EG 432.2:2006, Digital Source Processing—D-cinema Low Frequency Effects (Ife) Channel Audio Characteristics
[10] WO 2016/186547 A1
[11] J. Pytlarz: "Overview of ICtCp", ISO/IEC JTC1/SC29/WG11/M38148, February 2016, San Diego, USA.
[12] D. Rusanovskyy et al: "Single layer non-normative (category 3a) NCL and CL responses to the Call for Evidence on HDR/WCG", ISO/IEC JTC1/SC29/WG11/M36256, June 2015, Warsaw, Poland.

The invention claimed is:
1. A method for processing a first pixel in a picture, the first pixel having a color that is represented in a first color space, the method comprising:

obtaining a lower limit of a first color component of the first pixel in the first color space based on a distance between the color and a first distorted version of the color in a second color space;

obtaining an upper limit of the first color component of the first pixel in the first color space based on a distance between the color and a second distorted version of the color in the second color space; and obtaining a filtered value of the first color component for the first pixel which is larger than or equal to the obtained lower limit and lower than or equal to the obtained upper limit.

2. The method of claim 1:

wherein the first distorted version of the color is equal to the color in the first color space except in the first color component; and wherein the second distorted version of the color is equal to the color in the first color space except in the first color component.

3. The method of claim 1:

wherein the obtaining the lower limit of the first color component comprises obtaining the lower limit of the first color component of the first pixel in the first color space based on a distance between chromaticity values of the color and the first distorted version of the color in a luminance and chromaticity color space; and wherein the obtaining the upper limit of the first color component comprises obtaining the upper limit of the first color component of the first pixel in the first color space based on a distance between chromaticity values of the color and the second distorted version of the color in the luminance and chromaticity color space.

4. The method of claim 1:

wherein the obtaining the lower limit of the first color component comprises obtaining the lower limit of the first color component as a smallest value of the first color component that results in a perceptual similarity measure that is below a first threshold value, the perceptual similarity measure based on the distance between the color and the first distorted version of the color in the second color space; and wherein the obtaining the upper limit of the first color component comprises obtaining the upper limit of the first color component as a largest value of the first color component that results in a perceptual similarity measure that is below a second threshold value, the perceptual similarity measure based on the distance between the color and the second distorted version of the color in the second color space.

5. The method of claim 4, further comprising calculating at least one of the first threshold value and the second threshold value based on the color of the first pixel.

6. The method of claim 1:

wherein the obtaining the lower limit of the first color component comprises obtaining a lower limit of a green component of the first pixel in a red, green, and blue color space based on the distance between the color and the first distorted version of the color in a luminance and chromaticity color space;

wherein the obtaining the upper limit of the first color component comprises obtaining an upper limit of the green component of the first pixel in the red, green, and blue color space based on the distance between the color and the second distorted version of the color in the luminance and chromaticity color space; and wherein the obtaining the filtered value of the first color component comprises obtaining a filtered value of the green component for the first pixel which is larger than or equal to the obtained lower limit and lower than or equal to the obtained upper limit.

7. The method of claim 6:

wherein the obtaining the lower limit of the green component comprises calculating the lower limit of the green component as a maximum of $Gmin_{u'}$, $Gmin_{v'}$ and $Gmin_Y$; wherein $Gmin_{u'}$ represents a smallest green component value that results in a change in a chromaticity component u' that is smaller than a u' threshold, $Gmin_{v'}$ represents a smallest green component value that results in a change in a chromaticity component v' that is smaller than a v' threshold, and $Gmin_Y$ represents a smallest green component value that results in a change in a luminance component Y that is smaller than a Y threshold; and wherein the obtaining the upper limit of the green component comprises calculating the upper limit of the green component as a minimum of $Gmax_{u'}$, $Gmax_{v'}$ and $Gmax_Y$; wherein $Gmax_{u'}$ represents a largest green component value that results in a change in a chromaticity component u' that is smaller than the u' threshold, $Gmax_{v'}$ represents a largest green component value that results in a change in a chromaticity component v' that is smaller than the v' threshold and $Gmax_Y$ represents a largest green component value that results in a change in a luminance component Y that is smaller than the Y threshold.

8. The method of claim 7, further comprising:

calculating $Gmin_{u'}$=G+minimum of $\delta G_1$ and $\delta G_2$, where:

$\delta G_1 = (4(X+t11\delta R+t13\delta B))-(u'-\Delta u')(D+K_1\delta R-K_3\delta B))/((u'-\Delta u')K_2-4t_{12})$;

$\delta G_2 = (4(X+t_{11}\delta R+t_{13}\ \delta B)-(u'+\Delta u')(D+K_1\delta R-K_3\delta B))/((u'+\Delta u')K_2-4t_{12})$;

$\delta R$ is zero or represents a difference between an original value of a red component of the first pixel and a filtered value of the red component;

$\delta B$ is zero or represents a difference between an original value of a blue component of the first pixel and a filtered value of the blue component, X, Y, Z represent a value of an X component, a value of an Y component and a value of a Z component of the first pixel in an XYZ color space, u' represents a value of a u' chromaticity component of the first pixel, $\Delta u'$ represents a distance between a chromaticity component u' of the first pixel and a chromaticity component u' of the first distorted version and the second distorted version of the first pixel, $D=X+15Y+3Z$, $K_1=t_{11}+15t_{21}+3t_{31}$, $K_2=t_{12}+15t_{22}+3t_{32}$, $K_3=t_{13}+15t_{23}+3t_{33}$, and $$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R \\ G \\ B \end{bmatrix};$$

calculating $Gmin_{v'}$=G+minimum of $\delta G_3$ and $\delta G_4$, where $\delta G_3 = (9(X+t_{21}\delta R+t_{23}\delta B)-(v'-vu')(D+K_1\delta R-K_3\delta B))/((v'-\Delta v')K_2-9t_{22})$;

$\delta G_4 = (9(X+t_{21}\delta R+t_{23}\delta B)-(v'+\Delta v')(D+K_1\delta R-K_3\delta B))/((v'+\Delta v')K_2-9t_{22})$;

v' represents a value of a v' chromaticity component of the first pixel;

$\Delta v'$ represents a distance between a chromaticity component v' of the first pixel and a chromaticity component v' of the first distorted version and the second distorted version of the first pixel;

calculating $Gmin_Y = G + (tf(tf^{-1}(Y) - \phi_2) - Y_h)/w_G$, where tf( ) represents a transfer function and $tf^{-1}($ ) represents an inverse of the transfer function;

$\phi_2$ is a threshold value, $Y_h = w_R(R + \delta R) + w_G G + w_B(B + \delta B)$;

$w_R$, $w_G$, $w_B$ represent color weights;

calculating $Gmax_u = G + $ maximum of $\delta G_1$ and $\delta G_2$;

calculating $Gmax_v = G + $ maximum of $\delta G_3$ and $\delta G_4$;

calculating $Gmax_Y = G + (tf(tf^{-1}(Y) + \phi_2) - Y_h)/w_G$.

9. The method of claim 1, wherein the obtaining the filtered value of the first color component comprises:
calculating a filtered value of the first color component for the first pixel based on respective values of the first color component for the first pixel and neighboring pixels in the picture; and
clamping the filtered value between the obtained lower limit and the obtained upper limit so that the filtered value is larger than or equal to the obtained lower limit and lower than or equal to the obtained upper limit.

10. The method of claim 9, wherein the calculating the filtered value comprises calculating the filtered value of the first color component for the first pixel as an average of respective values of the first color component for the pixel and neighboring pixels directly above, below, to the right, and to the left of the first pixel in the picture.

11. The method of claim 1:
wherein the obtaining the lower limit of the first color component comprises obtaining, for each pixel of the first pixel and the neighboring pixels in the picture, a respective lower limit of the first color component in the first color space based on a respective distance between a respective color of the pixel and a respective first distorted version of the respective color in the second color space;
wherein the obtaining the upper limit of the first color component comprises obtaining, for each pixel of the first pixel and the neighboring pixels in the picture, a respective upper limit of the first color component in the first color space based on a respective distance between the respective color and a respective second distorted version of the respective color in the second color space; and
wherein the obtaining the filtered value comprises:
calculating, for each pixel of the first pixel and the neighboring pixels in the picture, a respective filtered value of the first color component based on respective values of the first color component for the first pixel and the neighboring pixels in the picture; and
clamping, for each pixel of the first pixel and the neighboring pixels in the picture, the respective filtered value between the respective obtained lower limit and the respective obtained upper limit so that the respective filtered value is larger than or equal to the respective obtained lower limit and lower than or equal to the respective obtained upper limit.

12. The method of claim 11, further comprising:
repeating the calculating the respective filtered value and the clamping the respective filtered value for each pixel of the first pixel and the neighboring pixel using a respective clamped filtered value of the first color component from iteration n-1 of calculating the respective filtered value and clamping the respective filtered value as input to calculating the respective filtered value for iteration n of calculating the respective filtered value and clamping the respective filtered value until N iterations have been reached.

13. The method of claim 1, further comprising:
calculating chroma or chromaticity component values for the first pixel based on a smoothed value of the color in the first color space equal to the color in the first color space but with a respective value of each color component in the color in the first color space replaced by a respective filtered value of the color component; and
obtaining a luminance corrected color based on the calculated chroma or chromaticity component values for the first pixel and a luminance component value obtained based on the color in the first color space.

14. A method for encoding a first pixel first pixel in a picture, the first pixel having a color in a first color space, the method comprising:
obtaining a lower limit of a first color component of the first pixel in the first color space based on a distance between the color and a first distorted version of the color in a second color space;
obtaining an upper limit of the first color component of the first pixel in the first color space based on a distance between the color and a second distorted version of the color in the second color space; and
obtaining a filtered value of the first color component for the first pixel which is larger than or equal to the obtained lower limit and lower than or equal to the obtained upper limit;
calculating a luma component value and chroma component values for the first pixel based on a smoothed value of the color in the first color space comprising a value of the first color component in the color in the first color space replaced by the filtered value of the first color component; and
encoding the luma component value and subsampled chroma component values.

15. A device for processing a first pixel in a picture, the first pixel having a color that is represented in a first color space, the device comprising:
processing circuitry;
memory containing instructions executable by the processing circuitry whereby the device is operative to:
obtain a lower limit of a first color component of the first pixel in the first color space based on a distance between the color and a first distorted version of the color in a second color space;
obtain an upper limit of the first color component of the first pixel in the first color space based on a distance between the color and a second distorted version of the color in the second color space; and
obtain a filtered value of the first color component for the first pixel which is larger than or equal to the obtained lower limit and lower than or equal to the obtained upper limit.

16. The device of claim 15, wherein the instructions are such that the device is operative to:
obtain the lower limit of the first color component of the first pixel in the first color space based on a distance between chromaticity values of the color and the first distorted version of the color in a luminance and chromaticity color space; and
obtain the upper limit of the first color component of the first pixel in the first color space based on a distance between chromaticity values of the color and the second distorted version of the color in the luminance and chromaticity color space.

17. The device of claim 15, wherein the instructions are such that the device is operative to:
  obtain the lower limit of the first color component as a smallest value of the first color component that results in a perceptual similarity measure that is below a first threshold value, the perceptual similarity measure is based on the distance between the color and the first distorted version of the color in the second color space; and
  obtain the upper limit of the first color component as a largest value of the first color component that results in a perceptual similarity measure that is below a second threshold value, the perceptual similarity measure is based on the distance between the color and the second distorted version of the color in the second color space.

18. The device of claim 17, wherein the instructions are such that the device is operative to calculate at least one of the first threshold value and the second threshold value based on the color of the first pixel.

19. The device of claim 15, wherein the instructions are such that the device is operative to:
  obtain a lower limit of a green component of the first pixel in a red, green and blue color space based on the distance between the color and the first distorted version of the color in a luminance and chromaticity color space;
  obtain an upper limit of the green component of the first pixel in the red, green and blue color space based on the distance between the color and the second distorted version of the color in the luminance and chromaticity color space; and
  obtain a filtered value of the green component for the first pixel which is larger than or equal to the obtained lower limit and lower than or equal to the obtained upper limit.

20. The device of claim 19, wherein the instructions are such that the device is operative to:
  calculate the lower limit of the green component as a maximum of $Gmin_{u'}$, $Gmin_{v'}$, and $Gmin_Y$; wherein $Gmin_{u'}$ represents a smallest green component value that results in a change in a chromaticity component u' that is smaller than a u' threshold, $Gmin_{v'}$ represents a smallest green component value that results in a change in a chromaticity component v' that is smaller than a v' threshold, and $Gmin_Y$ represents a smallest green component value that results in a change in a luminance component Y that is smaller than a Y threshold; and
  calculate the upper limit of the green component as a minimum of $Gmax_{u'}$, $Gmax_{v'}$, and $Gmax_Y$; wherein $Gmax_{u'}$ represents a largest green component value that results in a change in a chromaticity component u' that is smaller than the u' threshold, $Gmax_{v'}$ represents a largest green component value that results in a change in a chromaticity component v' that is smaller than the v' threshold and $Gmax_Y$ represents a largest green component value that results in a change in a luminance component Y that is smaller than the Y threshold.

21. The device of claim 20, wherein the instructions are such that the device is operative to:
  calculate $Gmin_{u'}$=G+minimum of $\delta G_1$ and $\delta G_2$, where:
  $\delta G_1 = (4(X+t11\delta R+t13\delta B))-(u'-\Delta u')(D+K_1\delta R-K_3\delta B))/((u'-\Delta u')K_2-4t_{12})$;
  $\delta G_2 = (4(X+t_{11}\delta R+t_{13}\delta B)-(u'+\Delta u')(D+K_1\delta R-K_3\delta B))/((u'+\Delta u')K_2-4t_{12})$;
  $\delta R$ is zero or represents a difference between an original value of a red component of the first pixel and a filtered value of the red component;
  $\delta B$ is zero or represents a difference between an original value of a blue component of the first pixel and a filtered value of the blue component,
  X, Y, Z represent a value of an X component, a value of an Y component and a value of a Z component of the first pixel in an XYZ color space,
  u' represents a value of a u' chromaticity component of the first pixel,
  $\Delta u'$ represents a distance between a chromaticity component u' of the first pixel and a chromaticity component u' of the first distorted version and the second distorted version of the first pixel,
  $D=X+15Y+3Z$, $K_1=t_{11}+15t_{21}+3t_{31}$, $K_2=t_{12}+15t_{22}+3t_{32}$, $K_3=t_{13}+15t_{23}+3t_{33}$, and $$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R \\ G \\ B \end{bmatrix};$$

calculate $Gmin_{v'}$=G+minimum of $\delta G_3$ and $\delta G_4$, where
  $\delta G_3 = (9(X+t_{21}\delta R+t_{23}\delta B)-(v'-vu')(D+K_1\delta R-K_3\delta B))/((v'-\Delta v')K_2-9t_{22})$;
  $\delta G_4 = (9(X+t_{21}\delta R+t_{23}\delta B)-(v'+\Delta v')(D+K_1\delta R-K_3\delta B))/((v'+\Delta v')K_2-9t_{22})$;
  v' represents a value of a v' chromaticity component of the first pixel;
  $\Delta v'$ represents a distance between a chromaticity component v' of the first pixel and a chromaticity component v' of the first distorted version and the second distorted version of the first pixel;
  calculating $Gmin_Y$=G+(tf(tf$^{-1}$(Y)-$\phi_2$)-$Y_h$)/$w_G$, where
    tf( ) represents a transfer function and tf$^{-1}$( ) represents an inverse of the transfer function;
  $\phi_2$ is a threshold value,
  $Y_h = w_R(R+\delta R)+w_G G+w_B(B+\delta B)$;
  $w_R$, $w_G$, $w_B$ represent color weights;
  calculating $Gmax_{u'}$=G+maximum of $\delta G_1$ and $\delta G_2$;
  calculating $Gmax_{v'}$=G+maximum of $\delta G_3$ and $\delta G_4$;
  calculating $Gmax_Y$=G+(tf(tf$^{-1}$(Y)+$\phi_2$)-$Y_h$)/$w_G$.

22. The device of claim 15, wherein the instructions are such that the device is operative to:
  calculate a filtered value of the first color component for the first pixel based on respective values of the first color component for the first pixel and neighboring pixels in the picture; and
  clamp the filtered value between the obtained lower limit and the obtained upper limit so that the filtered value is larger than or equal to the obtained lower limit and lower than or equal to the obtained upper limit.

23. The device of claim 22, wherein the instructions are such that the device is operative to calculate the filtered value of the first color component for the first pixel as an average of respective values of the first color component for the pixel and neighboring pixels directly above, below, to the right and to the left of the first pixel in the picture.

24. The device of claim 15, wherein the instructions are such that the device is operative to:
  obtain, for each pixel of the first pixel and the neighboring pixels in the picture, a respective lower limit of the first color component in the first color space based on a respective distance between a respective color of the pixel and a respective first distorted version of the respective color in the second color space;
  obtain, for each pixel of the first pixel and the neighboring pixels in the picture, a respective upper limit of the first color component in the first color space based on a respective distance between the respective color and a respective second distorted version of the respective color in the second color space;

calculate, for each pixel of the first pixel and the neighboring pixels in the picture, a respective filtered value of the first color component based on respective values of the first color component for the first pixel and the neighboring pixels in the picture; and clamp, for each pixel of the first pixel and the neighboring pixels in the picture, the respective filtered value between the respective obtained lower limit and the respective obtained upper limit so that the respective filtered value is larger than or equal to the respective obtained lower limit and lower than or equal to the respective obtained upper limit.

25. The device of claim 24, wherein the instructions are such that the device is operative to repeat the calculating the respective filtered value and the clamping the respective filtered value for each pixel of the first pixel and the neighboring pixel using a respective clamped filtered value of the first color component from iteration n-1 of calculating the respective filtered value and clamping the respective filtered value as input to calculating the respective filtered value for iteration n of calculating the respective filtered value and clamping the respective filtered value until N iterations have been reached.

26. The device of claim 15, wherein the instructions are such that the device is operative to:

calculate chroma or chromaticity component values for the first pixel based on a smoothed value of the color in the first color space equal to the color in the first color space but with a respective value of each color component in the color in the first color space replaced by a respective filtered value of the color component; and obtain a luminance corrected color based on the calculated chroma or chromaticity component values for the first pixel and a luminance component value obtained based on the color in the first color space.

27. The device of claim 15, wherein the first distorted version of the color is equal to the color in the first color space except in the first color component; and the second distorted version of the color is equal to the color in the first color space except in the first color component.

28. A device for encoding first pixel in a picture, the first pixel having a color in a first color space in a picture, the device comprising:

processing circuitry;

memory containing instructions executable by the processing circuitry whereby the device is operative to:

obtain a lower limit of a first color component of the first pixel in the first color space based on a distance between the color and a first distorted version of the color in a second color space;

obtain an upper limit of the first color component of the first pixel in the first color space based on a distance between the color and a second distorted version of the color in the second color space; and obtain a filtered value of the first color component of the color in the first color space for the first pixel which is larger than or equal to the obtained lower limit and lower than or equal to the obtained upper limit;

calculate a luma component value and chroma component values for the first pixel based on a smoothed value of the color in the first color space equal to the color in the first color space but with a value of the first color component in the color in the first color space replaced by the filtered value of the first color component; and encode the luma component value and subsampled chroma component values.

* * * * *